United States Patent
Löffler et al.

(10) Patent No.: US 9,976,301 B2
(45) Date of Patent: May 22, 2018

(54) CONSTRUCTION KIT CONSISTING OF WALL ELEMENTS AND CONNECTORS TO BE INSERTED THEREBETWEEN IN ORDER TO ERECT ROOM DIVIDERS

(71) Applicant: Vitra Patente AG, Muttenz (CH)

(72) Inventors: Jurgen Loffler, Ballrechten-Dottingen (DE); Klaus Meyer, Rheinfelden (DE)

(73) Assignee: Vitra Patente AG, Muttenz (CH)

( * ) Notice: Subject to any disclaimer, the term of this patent is extended or adjusted under 35 U.S.C. 154(b) by 0 days. days.

(21) Appl. No.: 14/437,949

(22) PCT Filed: Oct. 22, 2013

(86) PCT No.: PCT/CH2013/000182
§ 371 (c)(1),
(2) Date: Apr. 23, 2015

(87) PCT Pub. No.: WO2014/063263
PCT Pub. Date: May 1, 2014

(65) Prior Publication Data
US 2015/0300010 A1    Oct. 22, 2015

(30) Foreign Application Priority Data
Oct. 23, 2012 (CH) ........................................ 2075/12

(51) Int. Cl.
*E04B 2/74* (2006.01)
*A47B 83/00* (2006.01)
(Continued)

(52) U.S. Cl.
CPC .......... *E04B 2/7437* (2013.01); *A47B 83/001* (2013.01); *E04B 1/6158* (2013.01);
(Continued)

(58) Field of Classification Search
CPC ............. E04B 2/7437; E04B 2002/749; E04B 2002/7487; E04B 2002/7483
(Continued)

(56) References Cited

U.S. PATENT DOCUMENTS 3,394,526 A * 7/1968 Engelbrecht .......... E04B 1/6112
52/18
3,423,892 A * 1/1969 Rimington ................ E04B 2/78
52/241
(Continued)

FOREIGN PATENT DOCUMENTS

DE        909 036 C    4/1954
EP      449414 A2 * 10/1991
(Continued)

OTHER PUBLICATIONS

International Search Report of the International Searching Authority dated Feb. 3, 2014, issued in connection with International Application No. PCT/CH2013/000182 (4 pages).

*Primary Examiner* — Adriana Figueroa
(74) *Attorney, Agent, or Firm* — McCarter & English, LLP

(57) ABSTRACT

The construction kit consisting of wall elements and connectors to be inserted therebetween is designed in order to erect room dividers. The wall elements are produced by compressing fiber material and have at least one connecting flank which is systematically provided with contours. The connectors are designed as a profiled rail on which there is at least one connection which has systematically arranged mating contours. The contours on the wall elements can be brought into form-fitting engagement with the mating contours on the connectors. The fiber material used for producing the wall elements is a compressed polyester nonwoven fabric or a mixture of natural and synthetic fibers. The connector is an extruded profile, preferably made of alumi-
(Continued)

Figure 1A:
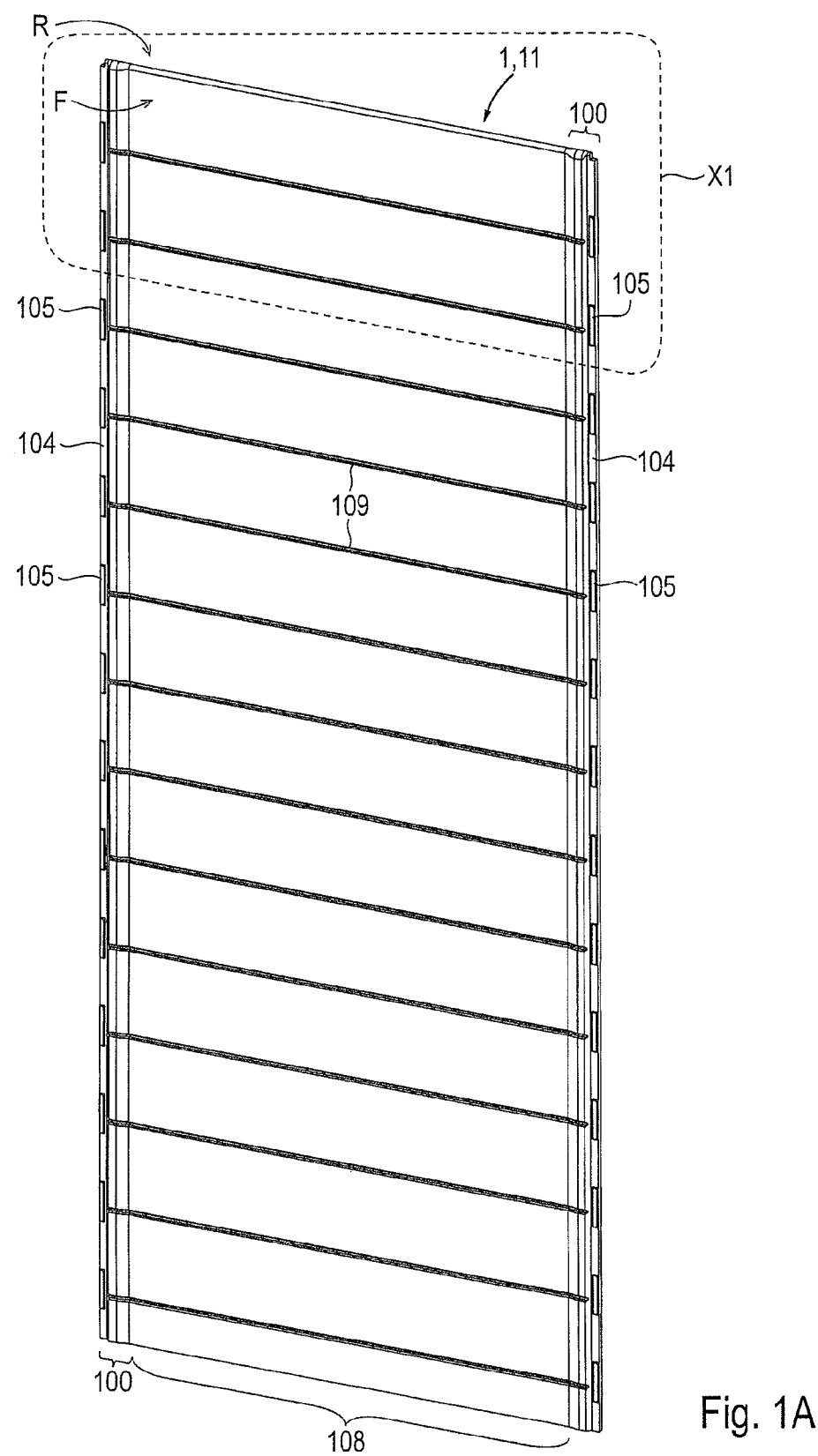

num. The construction kit essentially comprises rectilinear wall elements, differently curved wall elements and a three-winged wall element with three connecting flanks.

14 Claims, 66 Drawing Sheets

(51) Int. Cl.
 *E04B 1/61* (2006.01)
 *E04H 1/12* (2006.01)
 *F16B 5/00* (2006.01)

(52) U.S. Cl.
 CPC . *E04B 2002/749* (2013.01); *E04B 2002/7461* (2013.01); *E04B 2002/7483* (2013.01); *E04B 2002/7487* (2013.01); *E04H 1/1272* (2013.01); *F16B 5/0036* (2013.01)

(58) Field of Classification Search
 USPC .................................................. 52/36.1, 36.5
 See application file for complete search history.

(56) References Cited

U.S. PATENT DOCUMENTS

| | | | | |
|---|---|---|---|---|
| 3,463,218 | A * | 8/1969 | Byrens | A47G 5/00 160/135 |
| 3,528,559 | A * | 9/1970 | Miller | E04B 2/7433 211/180 |
| 3,565,152 | A * | 2/1971 | Cohn, Jr. | A47G 5/00 160/135 |
| 4,005,559 | A * | 2/1977 | Mathou | F16B 12/44 52/282.4 |
| 4,254,600 | A * | 3/1981 | Zwissler | E04B 1/6112 52/281 |
| 4,434,900 | A * | 3/1984 | Cook | E04B 2/7437 160/189 |
| 4,867,320 | A * | 9/1989 | Jonker | A47B 96/1416 211/189 |
| 4,928,465 | A | 5/1990 | Del Castillo Von Haucke | |
| 5,004,198 | A * | 4/1991 | Jager | A47F 5/106 248/224.8 |
| 5,272,000 | A * | 12/1993 | Chenoweth | D04H 1/60 442/35 |
| 5,471,800 | A * | 12/1995 | Hill | E04H 1/1272 108/50.12 |
| 6,287,678 | B1 * | 9/2001 | Spengler | B29C 44/569 156/228 |
| 6,474,025 | B1 * | 11/2002 | Faiks | A47B 21/00 52/239 |
| 6,490,828 | B1 * | 12/2002 | Fuller | B32B 3/266 156/471 |
| 9,217,450 | B2 * | 12/2015 | Pettigrew | A47B 47/042 |
| 2003/0221798 | A1 * | 12/2003 | Hunt | E04B 2/7431 160/135 |
| 2004/0126550 | A1 * | 7/2004 | Grafenauer | E04F 15/02 428/212 |
| 2007/0294953 | A1 * | 12/2007 | Guillen | A47B 57/40 52/36.1 |
| 2010/0064619 | A1 * | 3/2010 | Huang | E04B 2/7437 52/582.2 |
| 2010/0146874 | A1 * | 6/2010 | Brown | E04B 2/7453 52/145 |
| 2011/0302865 | A1 * | 12/2011 | Kliegle | E04F 13/0835 52/483.1 |

FOREIGN PATENT DOCUMENTS

| | | | | |
|---|---|---|---|---|
| FR | 2558219 | A1 * | 7/1985 | ........... E04B 1/6162 |
| NL | 1001983 | C1 * | 6/1997 | ............... A47G 5/00 |
| WO | WO 98/34032 | A1 | 8/1998 | |

* cited by examiner

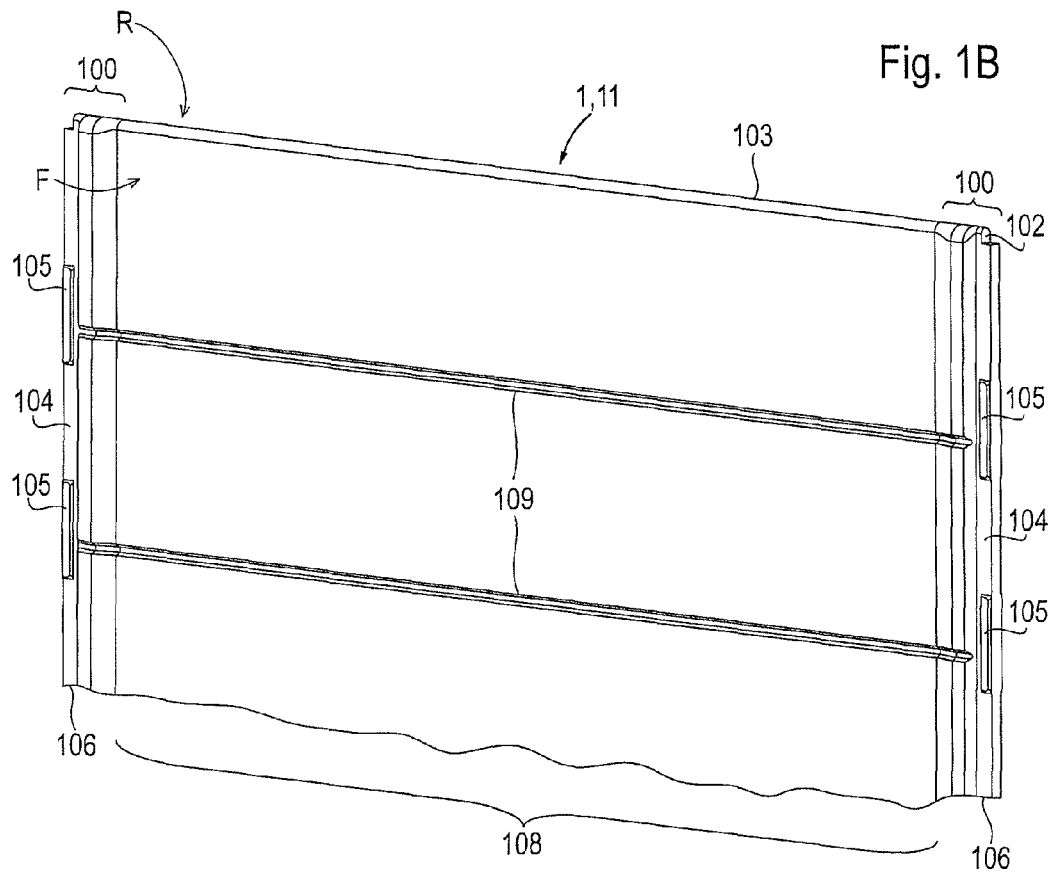
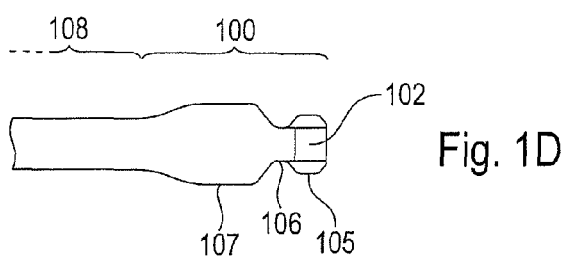
Fig. 1D
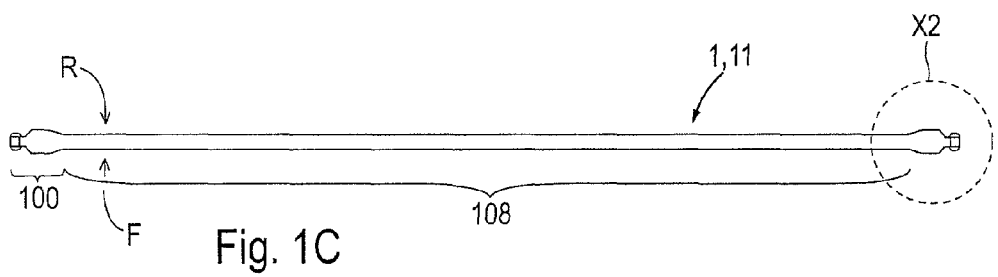
Fig. 1C

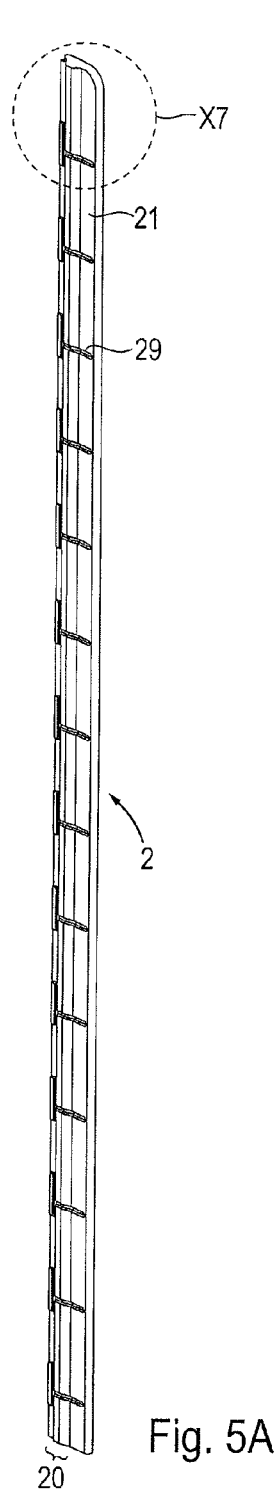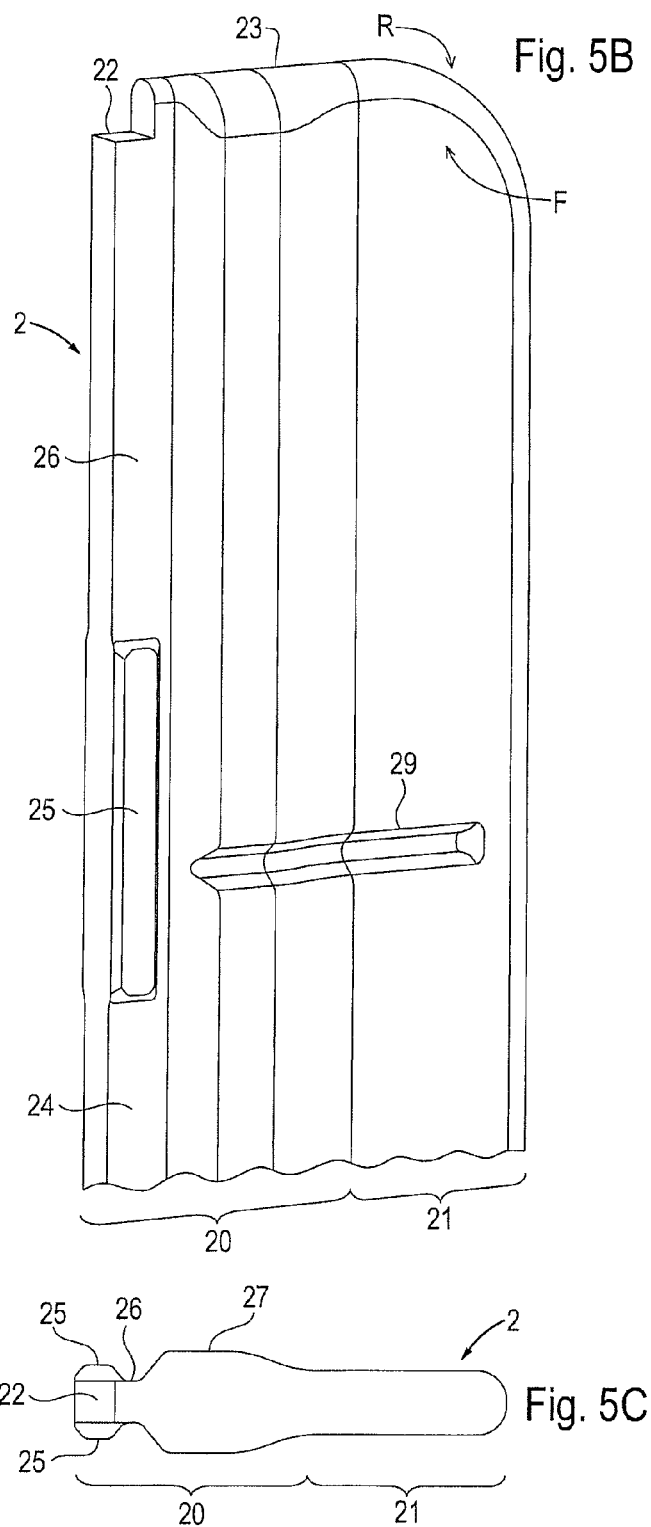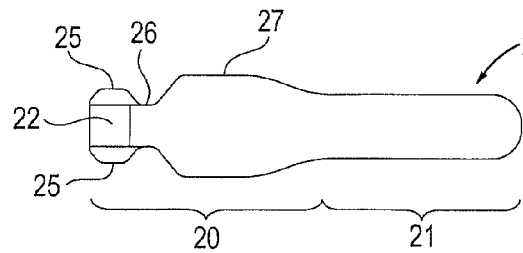

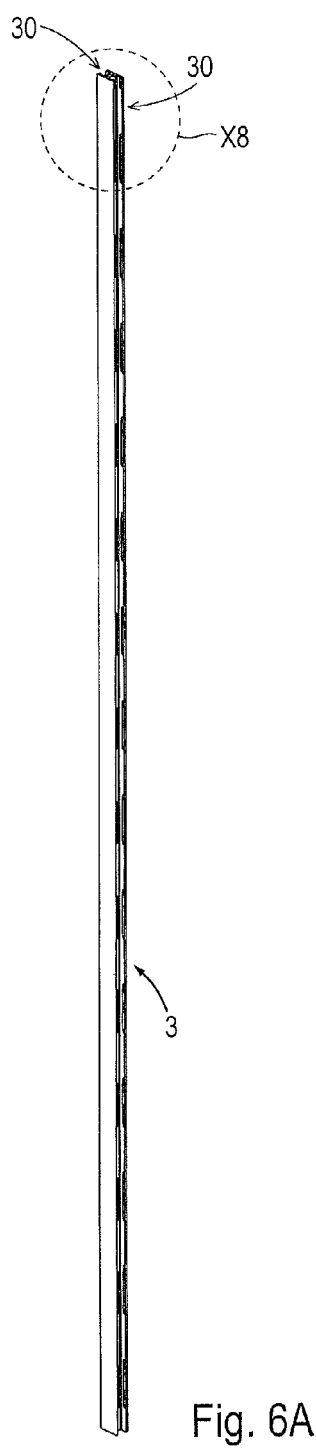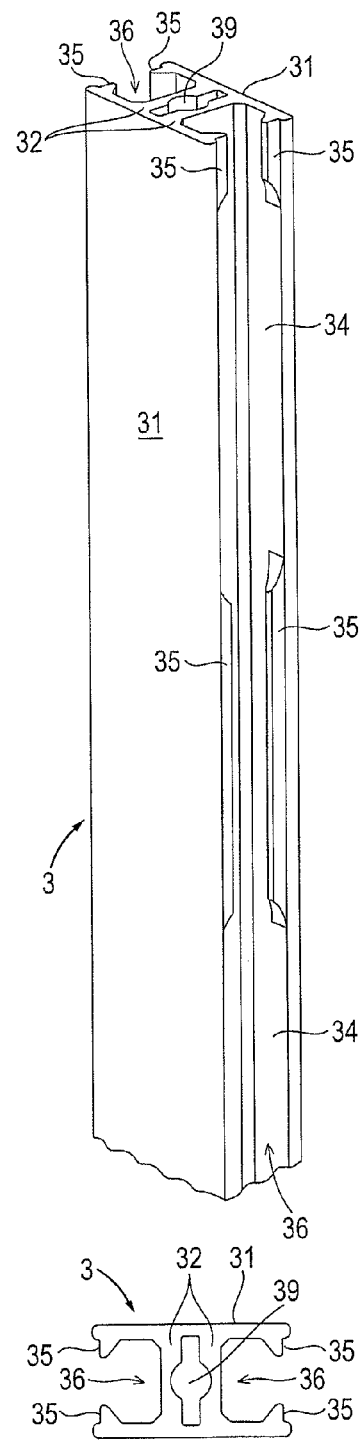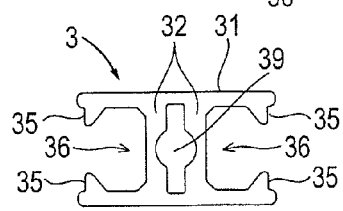
Fig. 6A
Fig. 6B
Fig. 6C

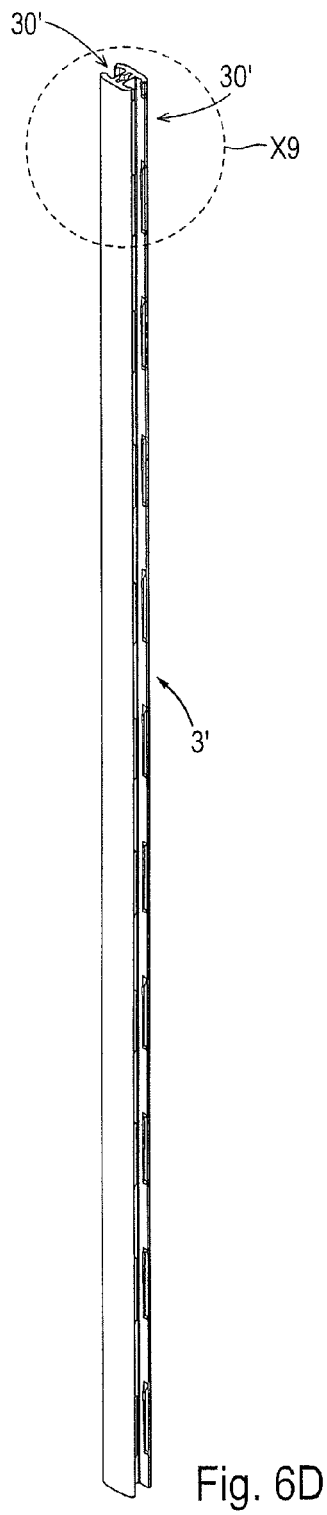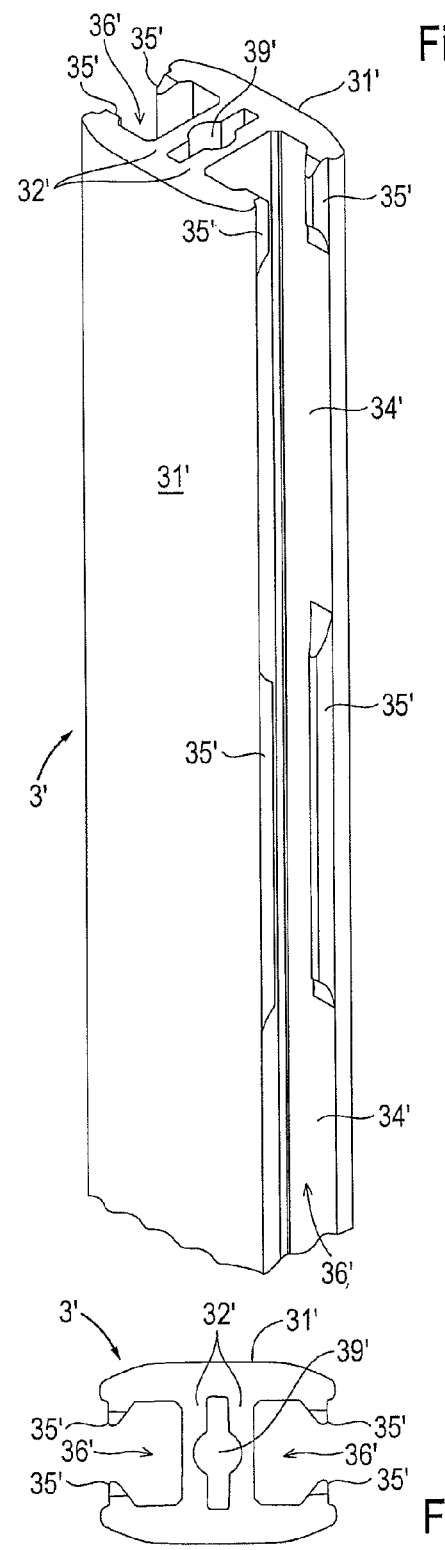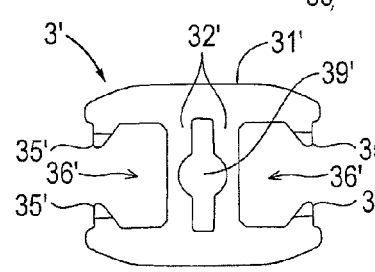
Fig. 6D
Fig. 6E
Fig. 6F

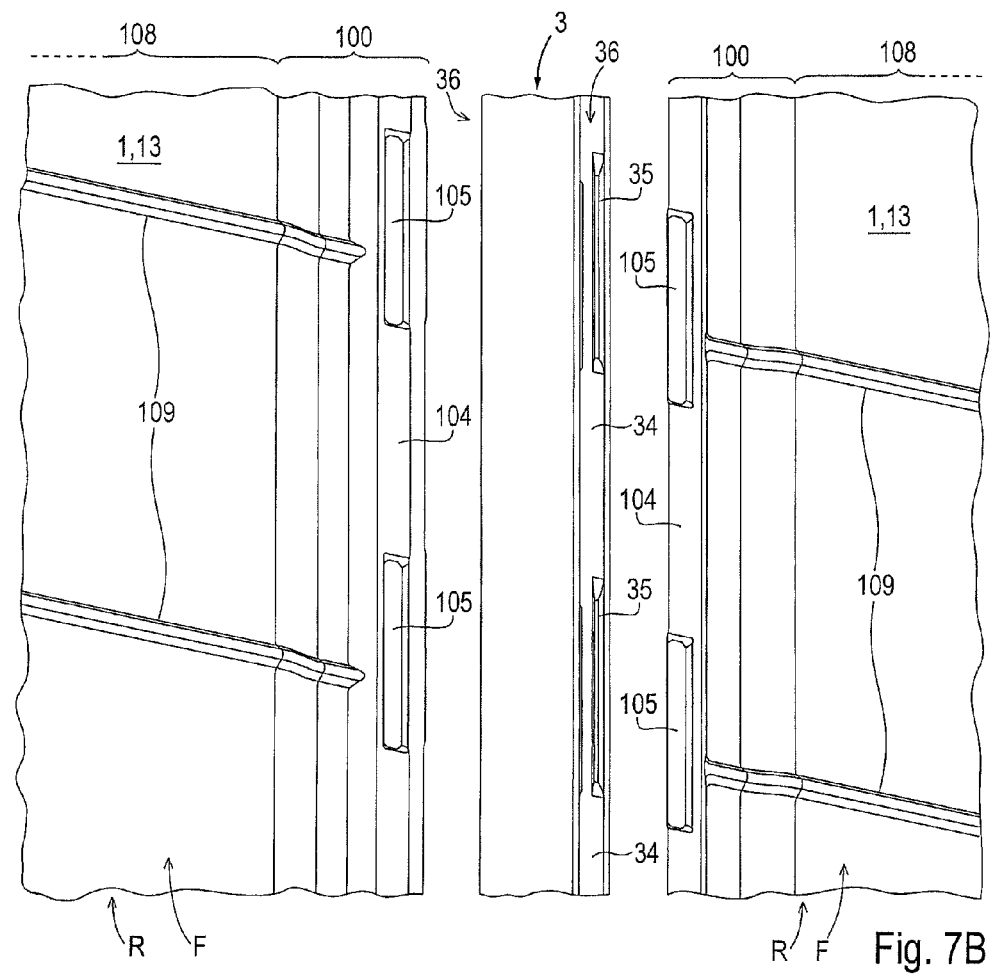
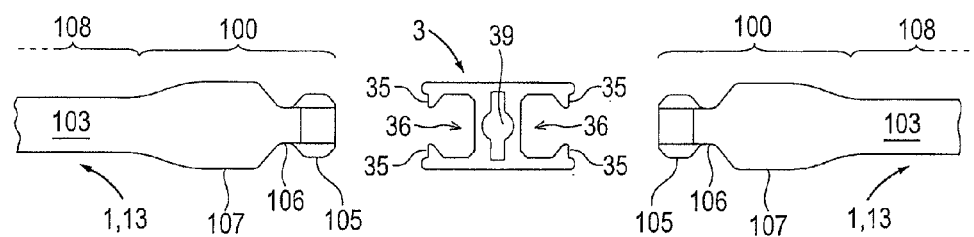
Fig. 7C

Fig. 8A
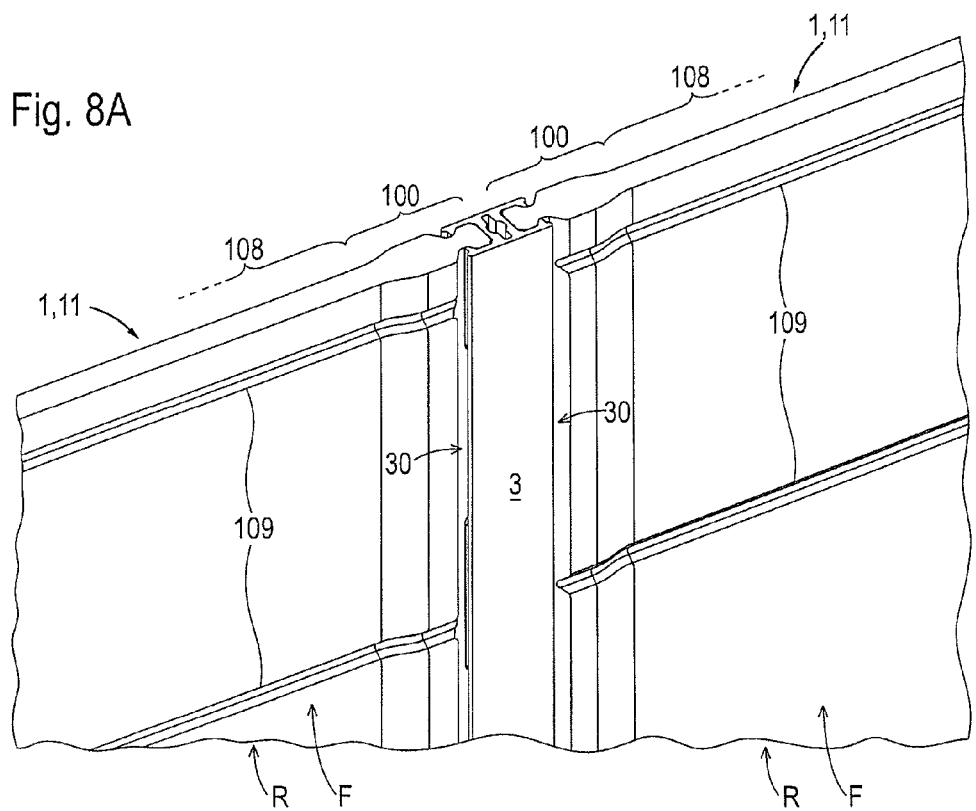
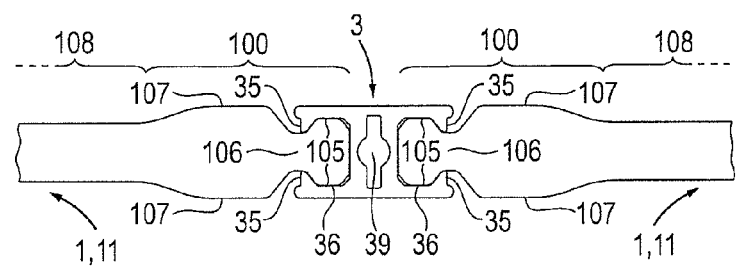
Fig. 8B
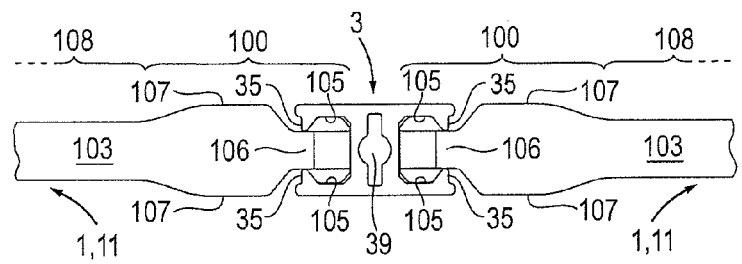
Fig. 8C

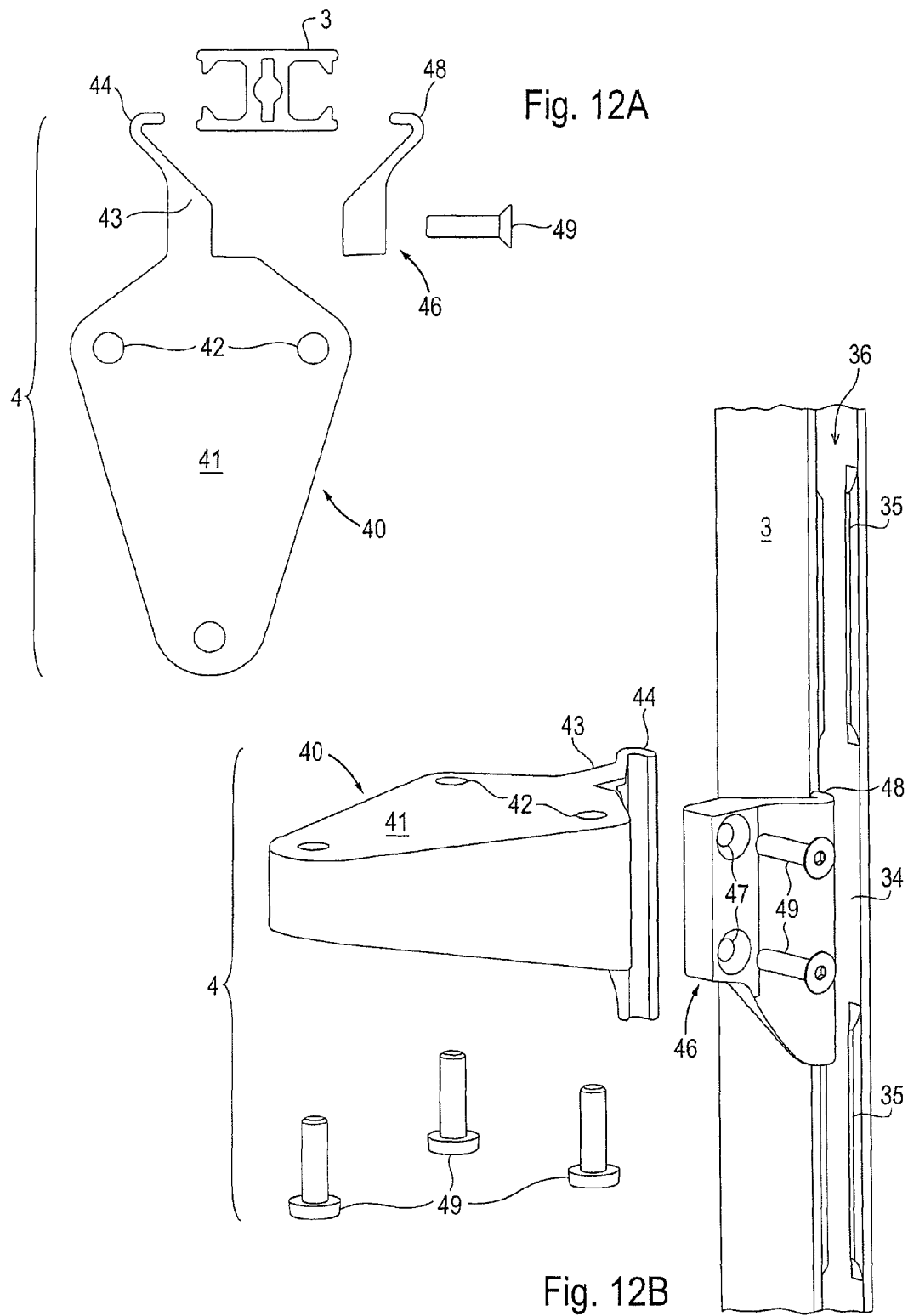

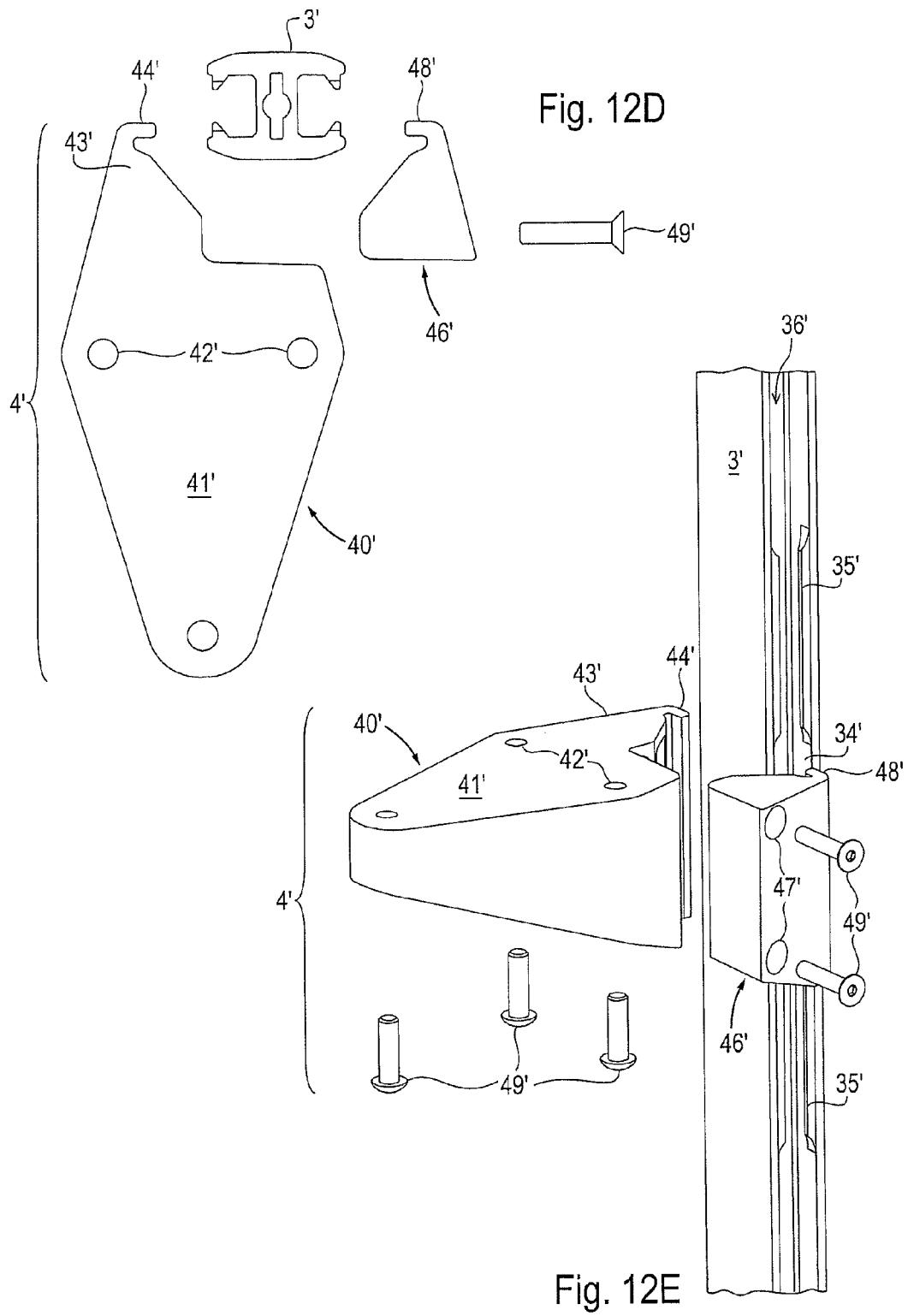

CONSTRUCTION KIT CONSISTING OF WALL ELEMENTS AND CONNECTORS TO BE INSERTED THEREBETWEEN IN ORDER TO ERECT ROOM DIVIDERS

FIELD OF USE OF THE INVENTION

The present invention relates to a construction kit consisting of wall elements and connectors to be inserted therebetween in order to erect differently dimensioned and configured room dividers.

PRIOR ART

Assembleable wall elements for exhibition and store construction and also as room dividers, for example, in offices, are known in many cases.

Object of the Invention

Starting from the prior art previously known to this extent, the invention is based on the object of providing a system of wall elements with associated connectors, with which, under the aspects of efficient use of material, productive assembly and enabling esthetic design, highly individually adapted room dividers and work booths can be erected.

Overview of the Invention

The construction kit consisting of wall elements and connectors to be inserted therebetween is designed in order to erect room dividers. The wall elements are produced by compressing fiber material and have at least one connecting flank which is systematically provided with contours. The connectors are designed as a profiled rail on which there is at least one connection which has systematically arranged mating contours. The contours on the wall elements can be brought into form-fitting engagement with the mating contours on the connectors.

Special embodiments of the invention are defined below. The fiber material used for producing the wall elements is a compressed polyester nonwoven fabric or a mixture of natural and synthetic fibers. The connector is an extruded profile, preferably made of aluminum.

In the case of the wall elements which serve for installing within a room divider, all of the vertical outer edges are designed as connecting flanks with the systematic contours, wherein an inner wall extends between the connecting flanks.

A separate type of wall elements is determined for the outer termination on room dividers, said termination being formed only on an outer edge as the connecting flank with the systematic contours, wherein the one connecting flank is adjoined by a wing section which ends freely laterally. The fiber material used can be penetrated by dye.

The contours on the connecting flanks of the wall elements are arranged congruently on the front side and rear side thereof and are designed as raised webs which run on a vertical line with alternating intermediate spaces. The connectors each have a connection to the systematic mating contours on two opposite outer edges. The mating contours are designed as raised webs in pairs which run on a vertical line with alternating intermediate spaces and constrict the lateral mouth of a vertical groove. The contours rise from a lip which extends from the connecting flank, wherein the width of the lip finds space in the mouth gap of the mating contours. The dimensioning of the contours permits the latter to be inserted through the intermediate spaces on the connector.

The construction kit comprises by way of wall elements at least:
a) a first wall element with a rectilinear extent with respect to the vertical plane;
b) a second wall element with a first curvature with respect to the vertical plane;
c) a third wall element with a second curvature with respect to the vertical plane; and
d) a fourth, basically three-winged wall element with three connecting flanks, wherein the first to third wall element ends with an upper edge.

The fourth wall element consists of three partial elements which are fitted on one another, which result from the theoretical vertical bisection of the thickness of the remaining wall elements and terminate at the top with a partial edge. On the three wings of said wall element, there is in each case a complete terminating flank with the contours on both sides and a complete inner wall section extending to the element center. A contoured, complete upper edge results along the inner wall section, and a basically triangular free space is produced in the element center.

The upper edges on the first to third wall elements and the upper edge joined together from two partial edges on the fourth wall element are produced in a manner free from finishing during the pressing operation.

On the fourth wall element, a wing which is formed by the associated connecting flank and the inner wall section continuing therefrom, in each case together with an adjacent wing, spans a first angle of identical size while the two adjacent wings together span a differently dimensioned, second angle.

The first to third wall elements and the partial element contain reinforcing means acting in particular in the horizontal plane. The reinforcing means are produced by material-compressing pressing in, with the result of grooves running linearly and horizontally over the inner wall or partial wall. The reinforcing means on the first to third wall elements are fitted congruently to one another on the front side and on the rear side and in the same grid as the contours. By contrast, the reinforcing means on the partial element are provided only on one side and in the same grid as the partial contours.

With the wall elements and connectors, the following can be erected:
a) room dividers which are rectilinear, or are curved once or more than once; and/or
b) individual booths; and/or
c) interconnecting booths; and
d) combinations of room dividers and booths.

Fixable adapters which serve for bearing supporting surfaces and/or seats can be arranged on the connectors.

An adapter consists of a base part with a first hook contour and a separate counterpart with a second hook contour. In the mounted state, base part and counterpart are connected to each other, wherein the first hook contour and second hook contour thereof are determined for engaging in the intermediate space on the connector.

The construction kit furthermore comprises supports which are placed ahead of the wall elements from which the room divider can be erected, preferably into the interior of the room divider, wherein the individual support has:
a) a profiled tube section with a rear side and a front side, which sides are connected to each other by a central web;

b) a double-row slot grid on the rear side, wherein in each case the two slots of a pair are located at the same height;
c) in the central web a screw channel which runs through the support, and can be used for fastening a floor assembly; and wherein
d) a floor assembly comprises a floor element which can be leveled in height on a bolt, and a cuboidal joining part which is placed onto the lower end of the support, wherein a threaded part of the bolt is determined for engaging in the screw channel.

The adapter is connectable to a bridge strut, and a longitudinal strut can be inserted between two bridge struts, thus producing a framework which serves for bearing supporting surfaces and/or seats. The two hook contours of an adapter are determined for engaging in the two slots of a pair, which are selected for the desired height, on the slot grid of the support and, in the mounted state, grip therein in the form of claws. The adapters which are docked on the supports serve for holding supporting surfaces, wherein said supporting surfaces can be used as a working surface and/or as a tray or for the attachment of cupboard units.

BRIEF DESCRIPTION OF THE ATTACHED DRAWINGS

Figure 2A:
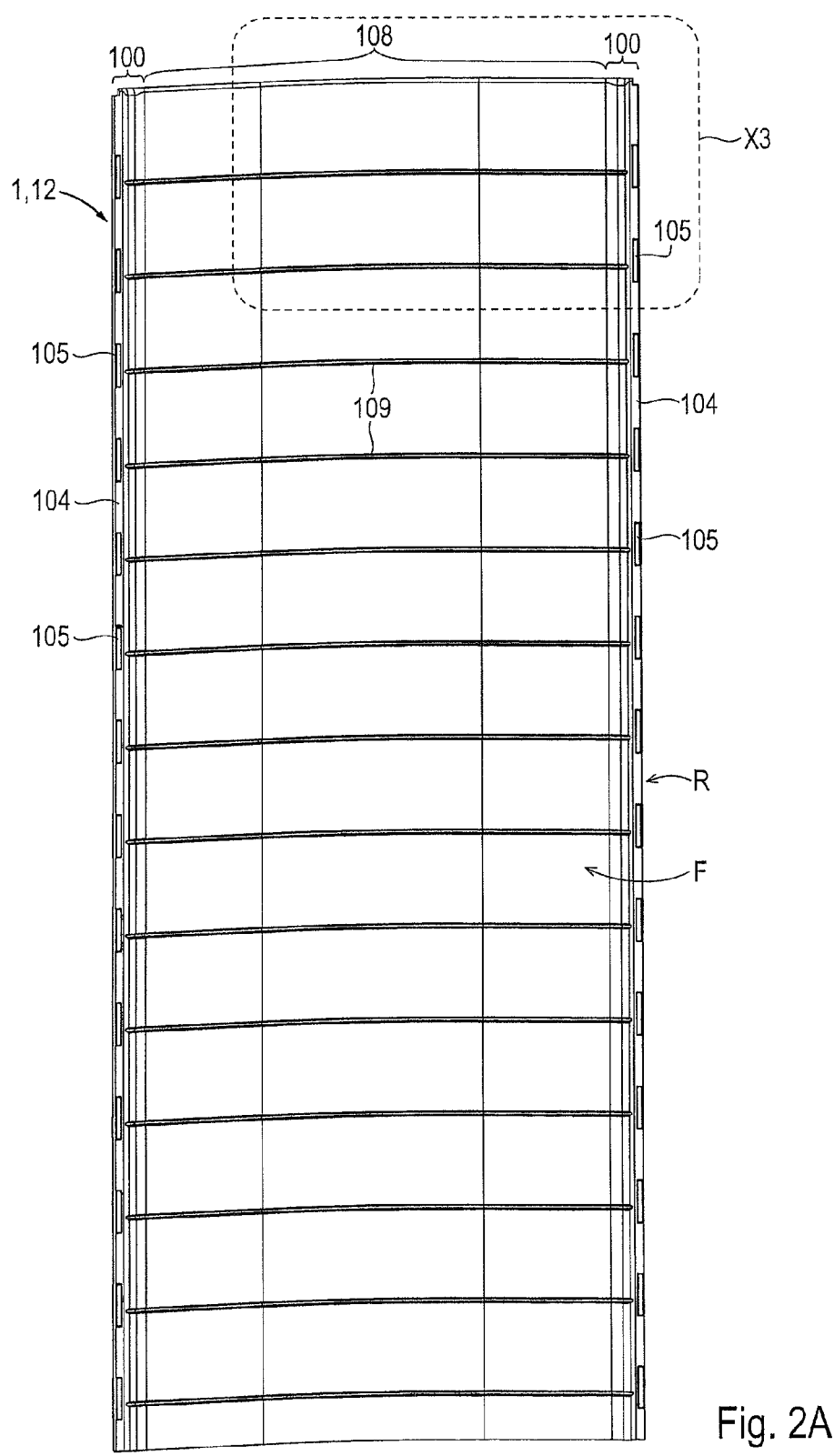
Figure 2B:
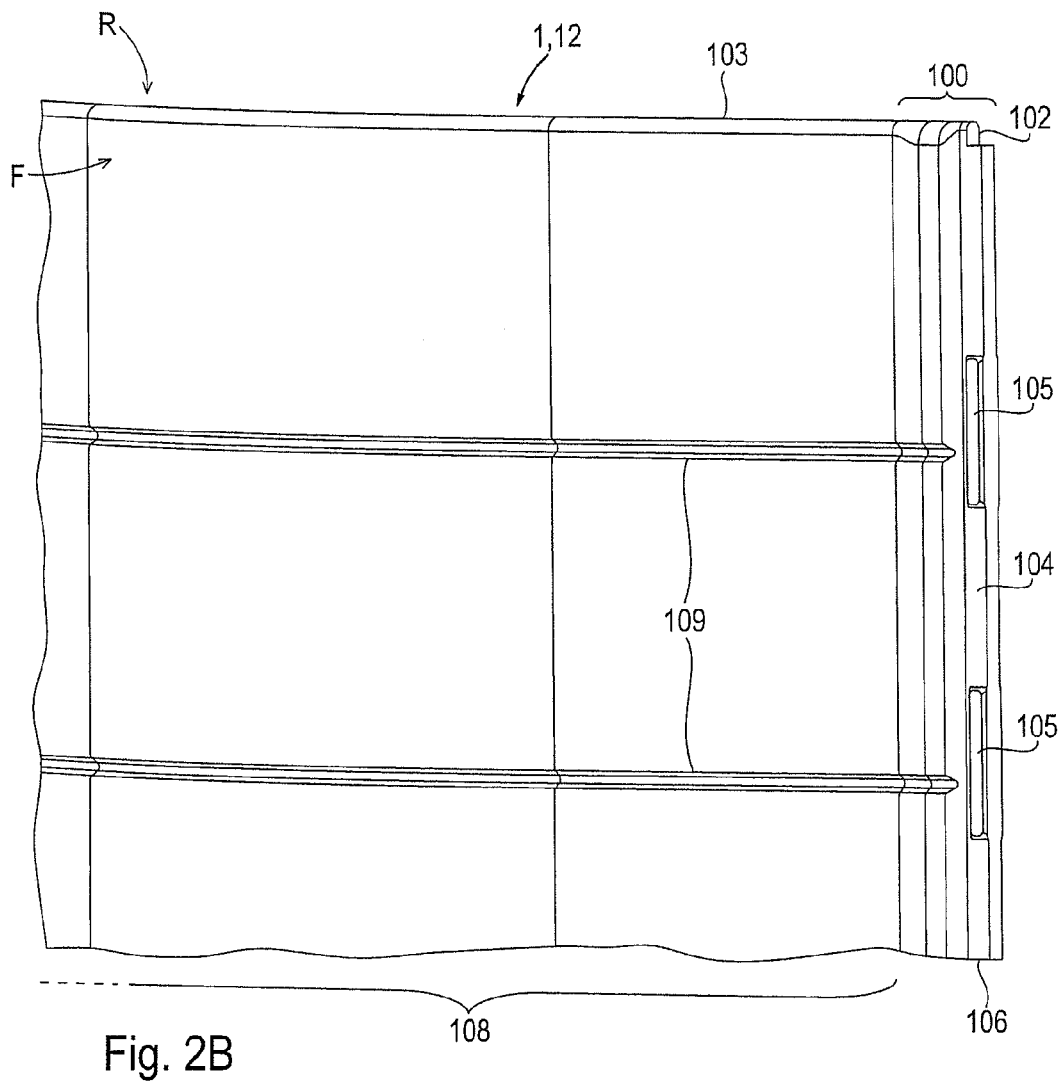
Figure 2C:
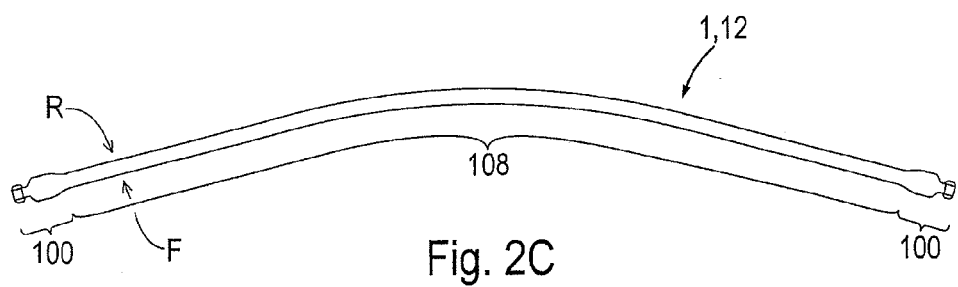
Figure 3A:
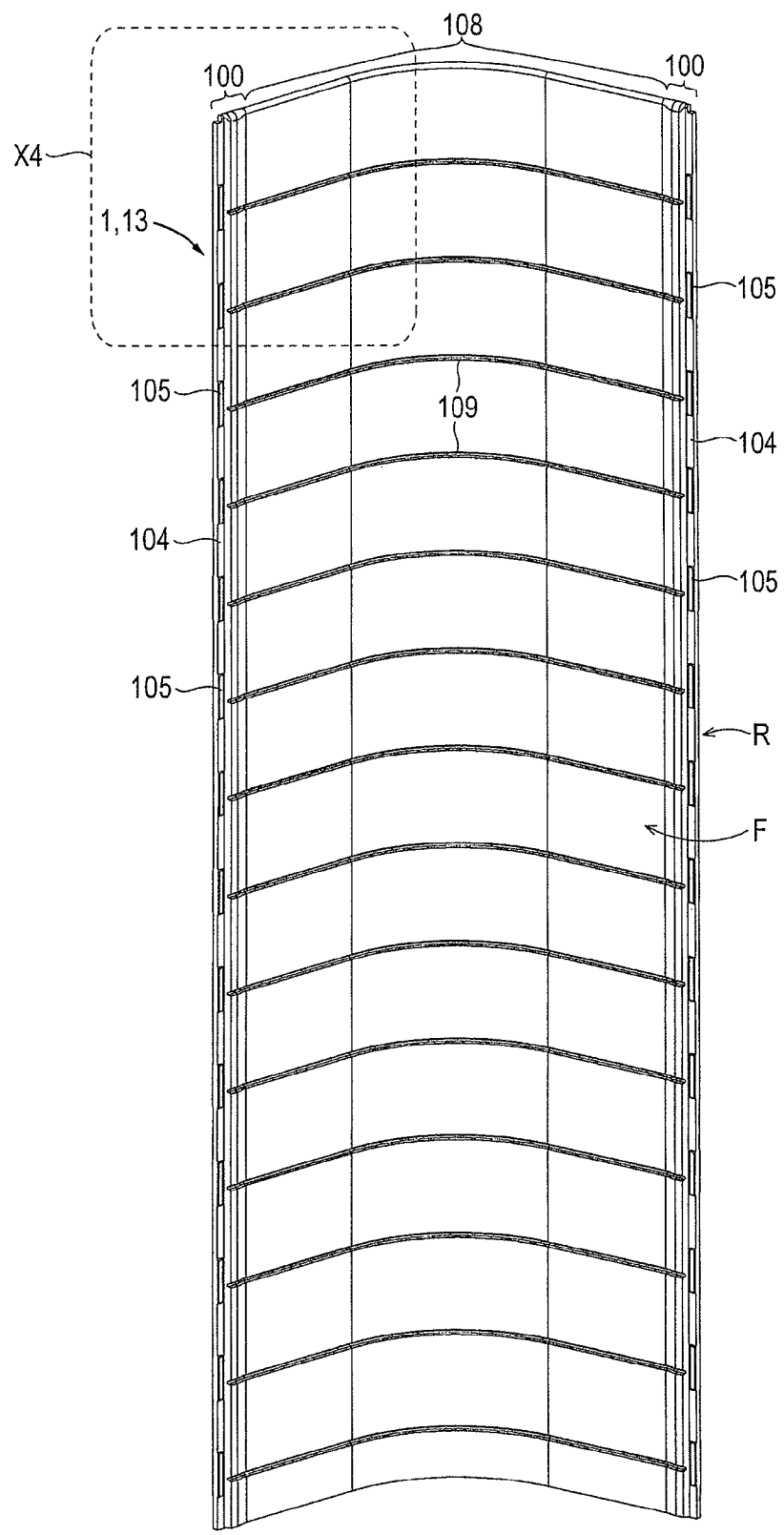
Figure 3B:
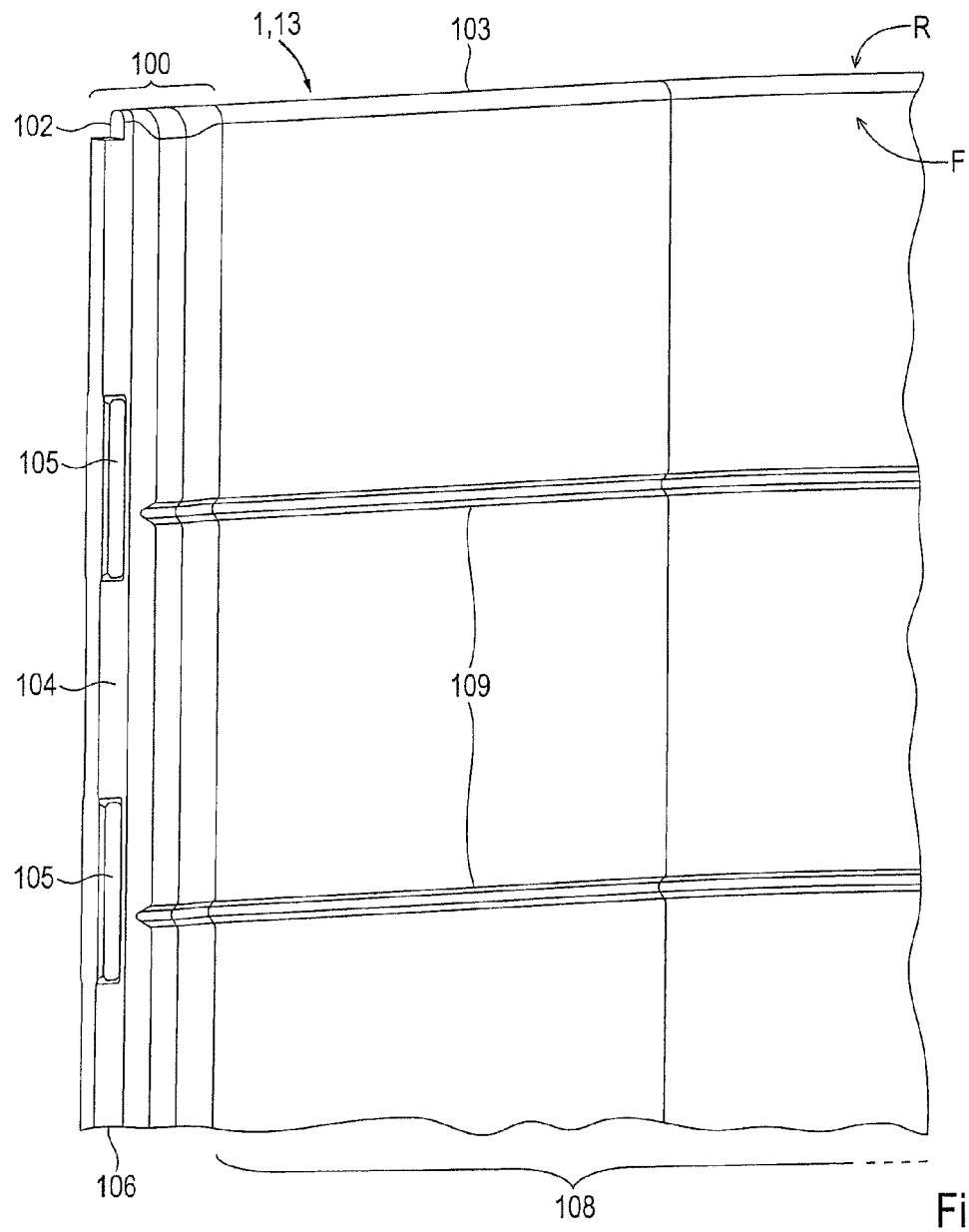
Figure 3C:
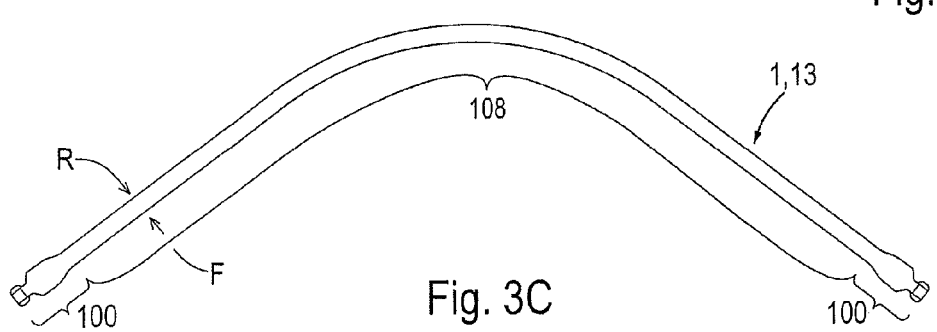
Figure 4A:
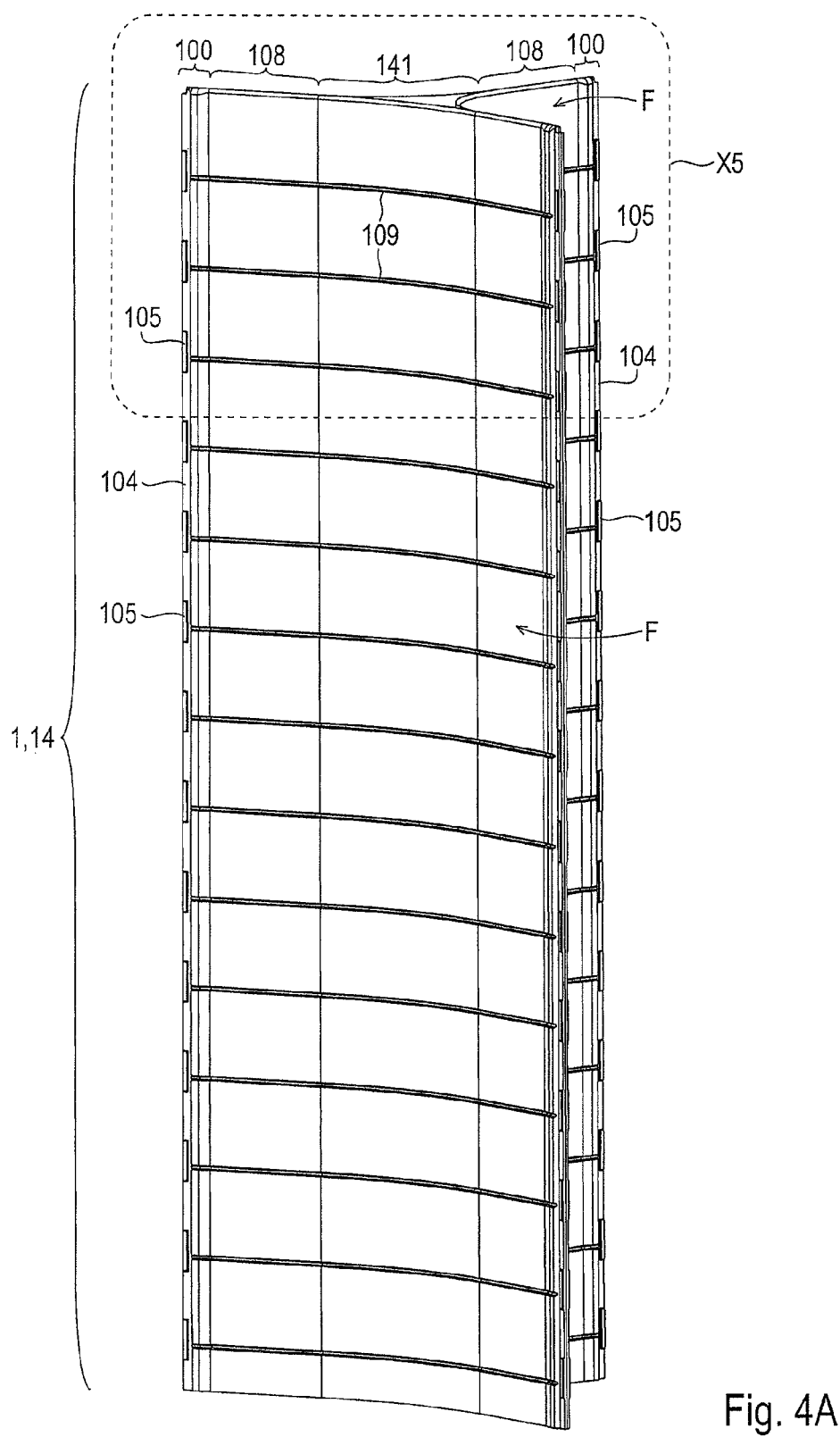
Figure 4B:
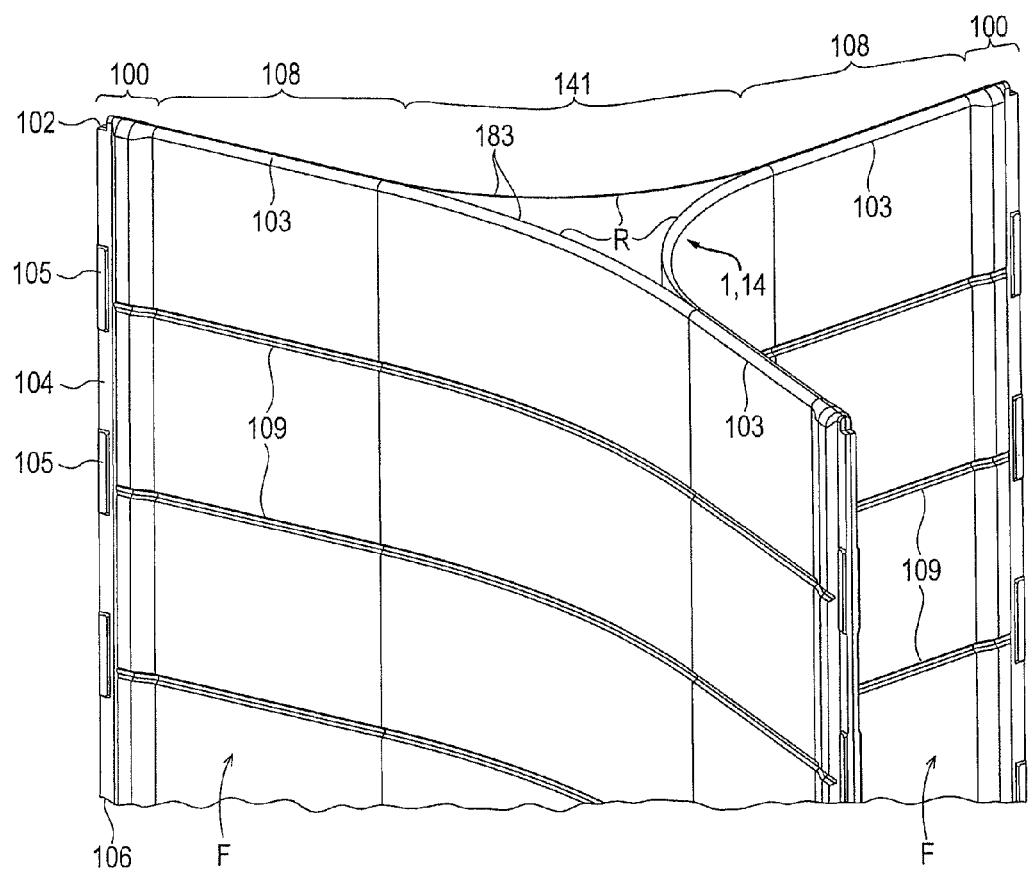
Figure 4C:
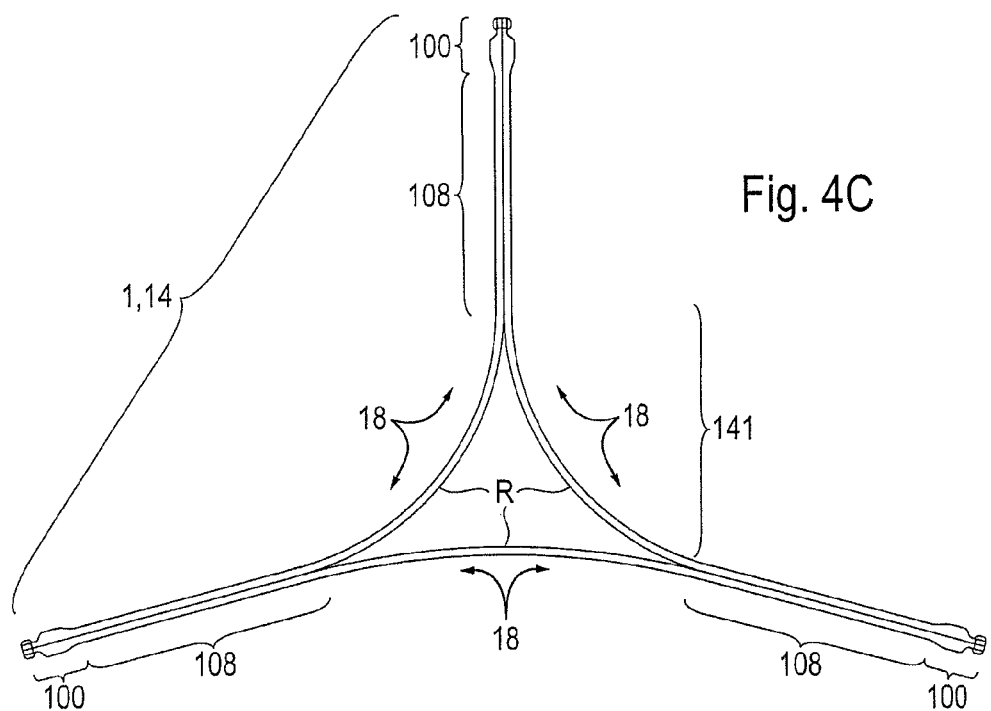
Figure 4E:
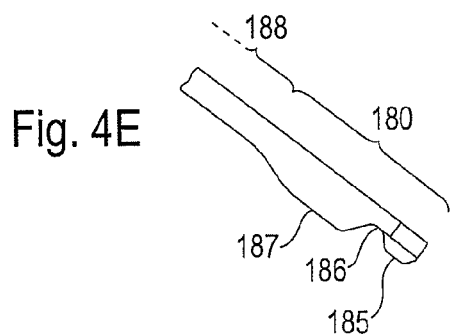
Figure 4D:
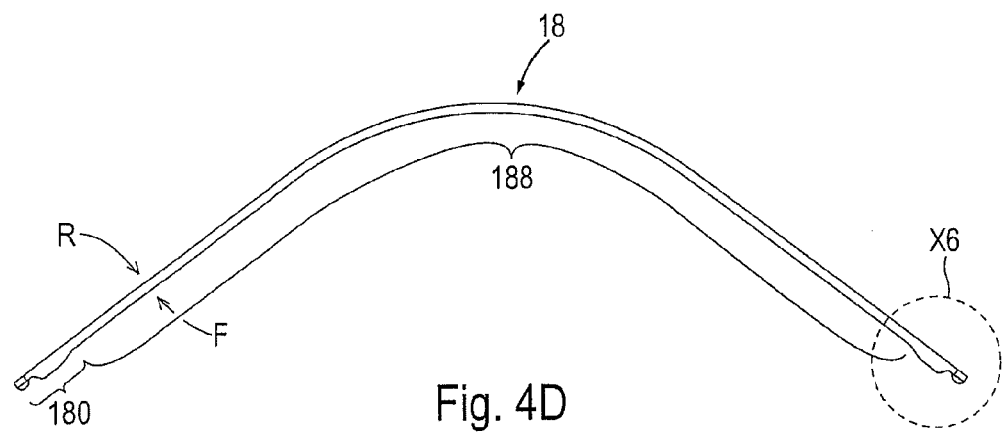
Figure 7A:
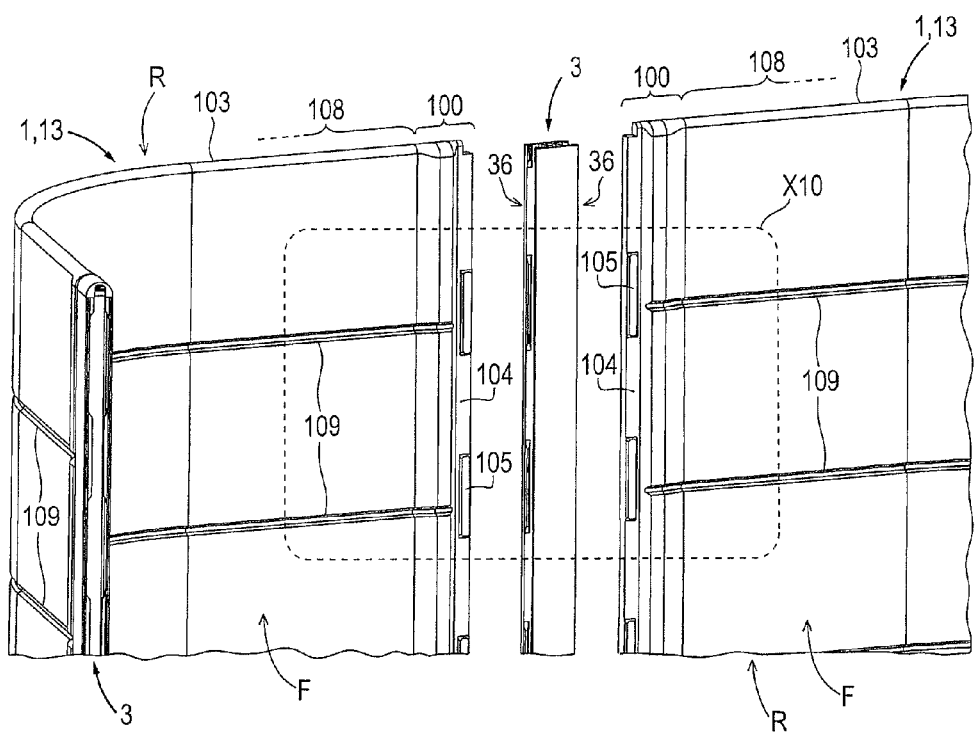
Figure 9A:
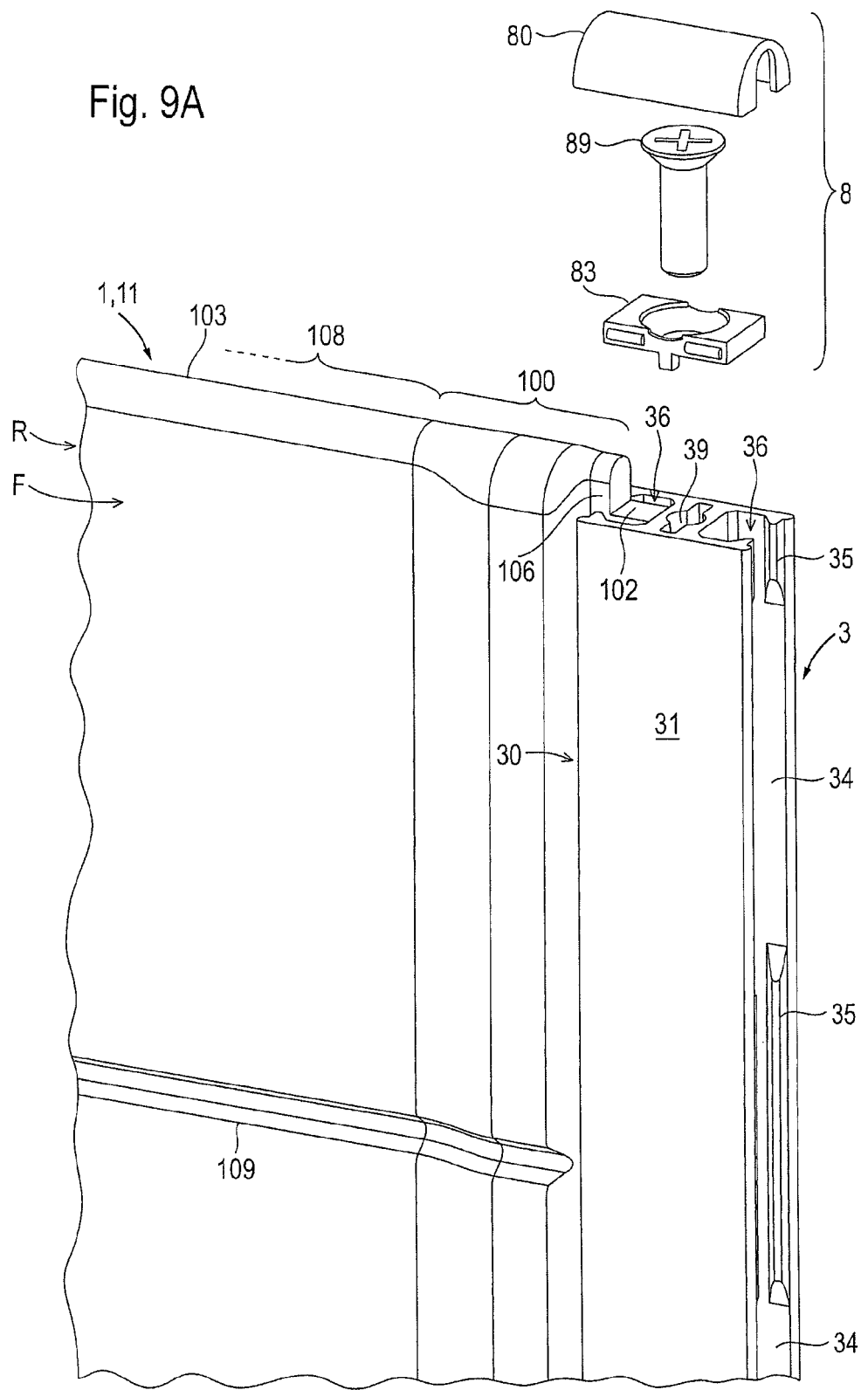
Figure 9B:
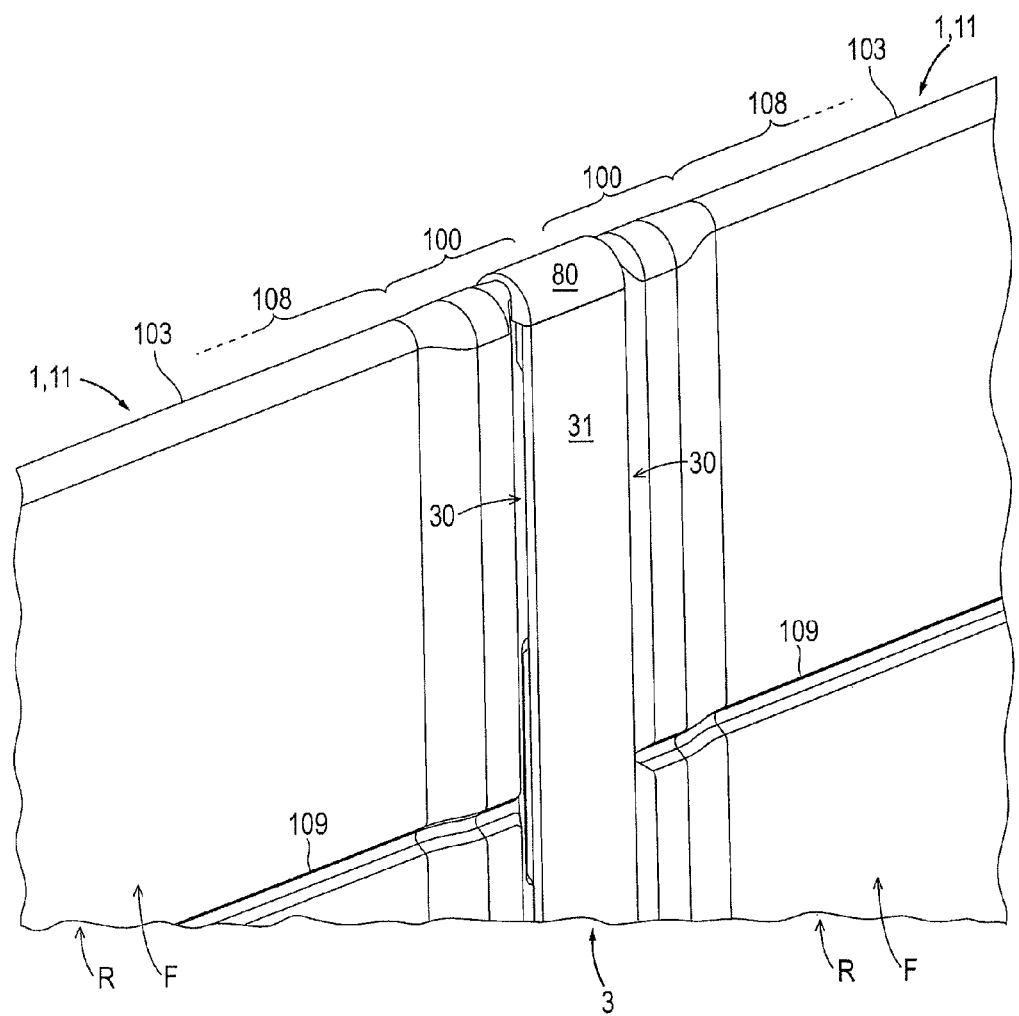
Figure 9C:
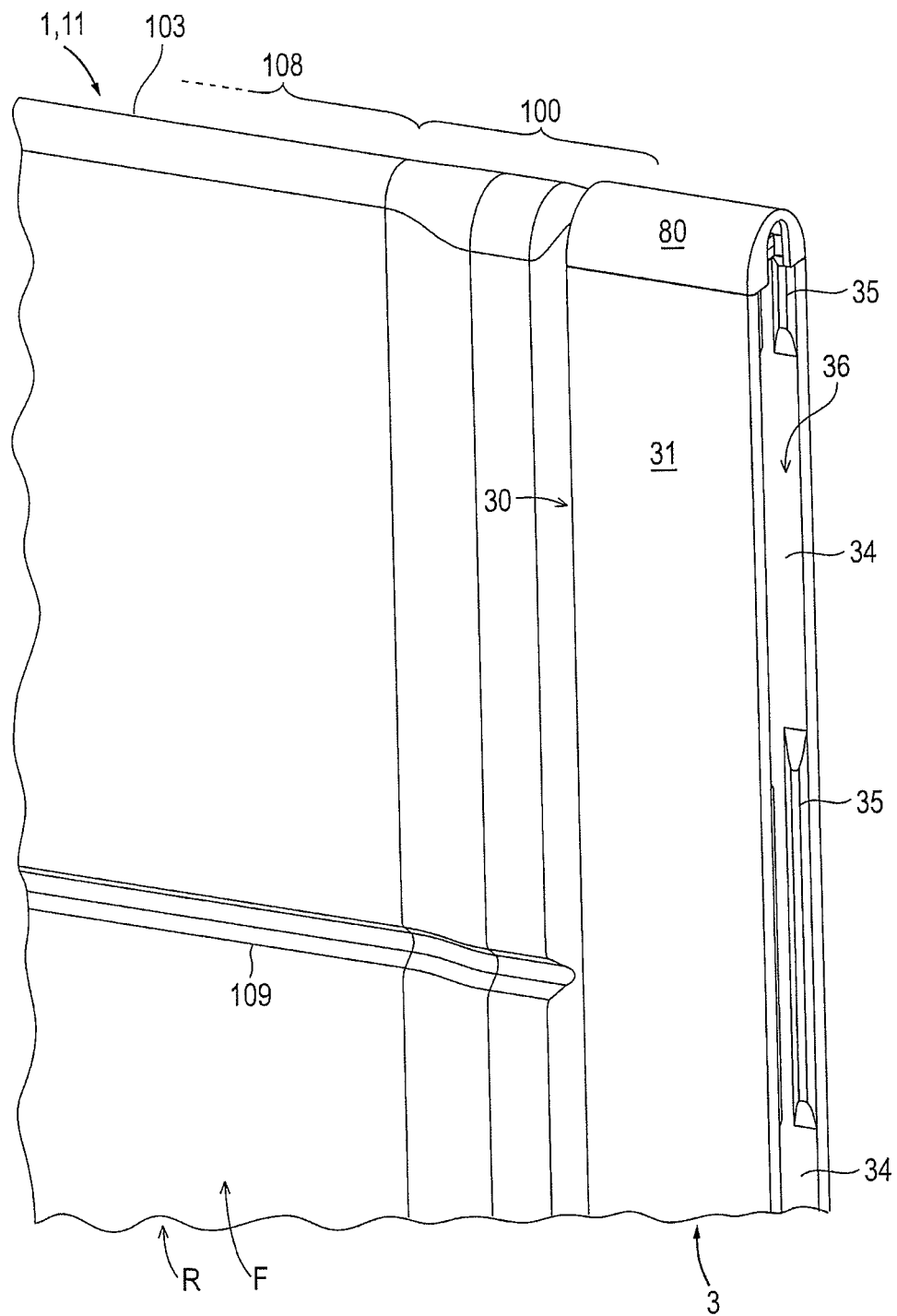
Figure 9D:
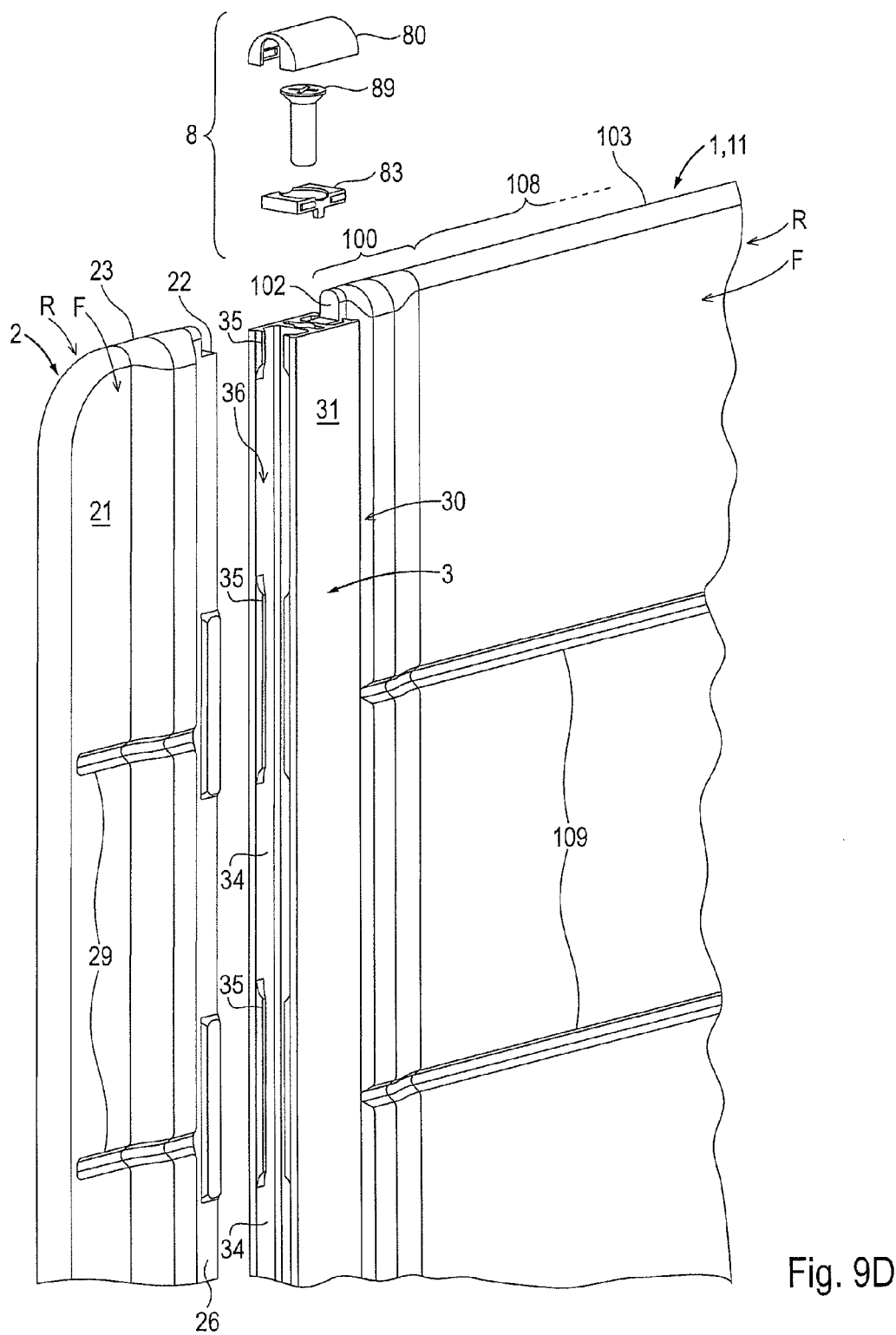
Figure 9E:
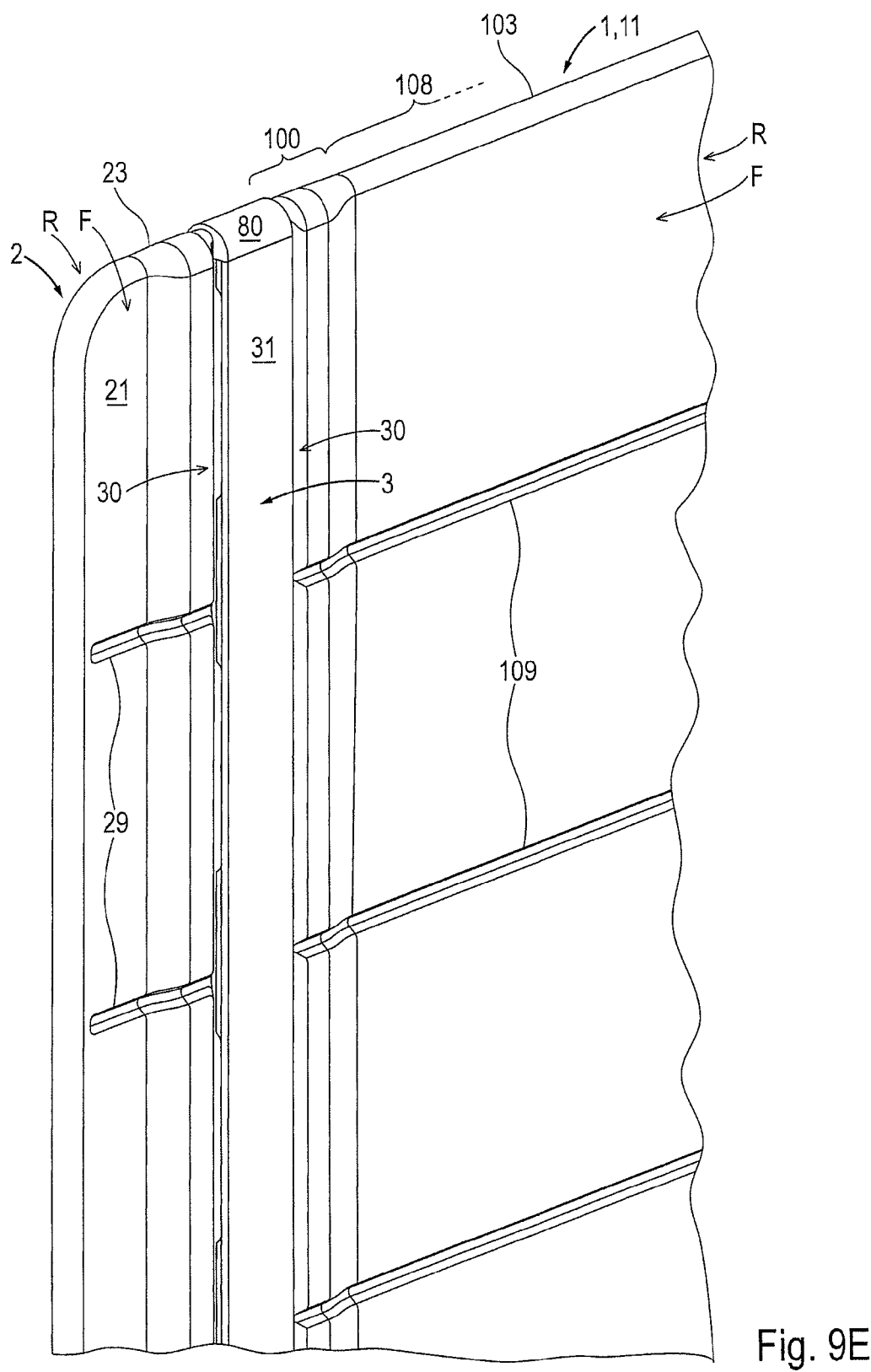
Figure 9F:
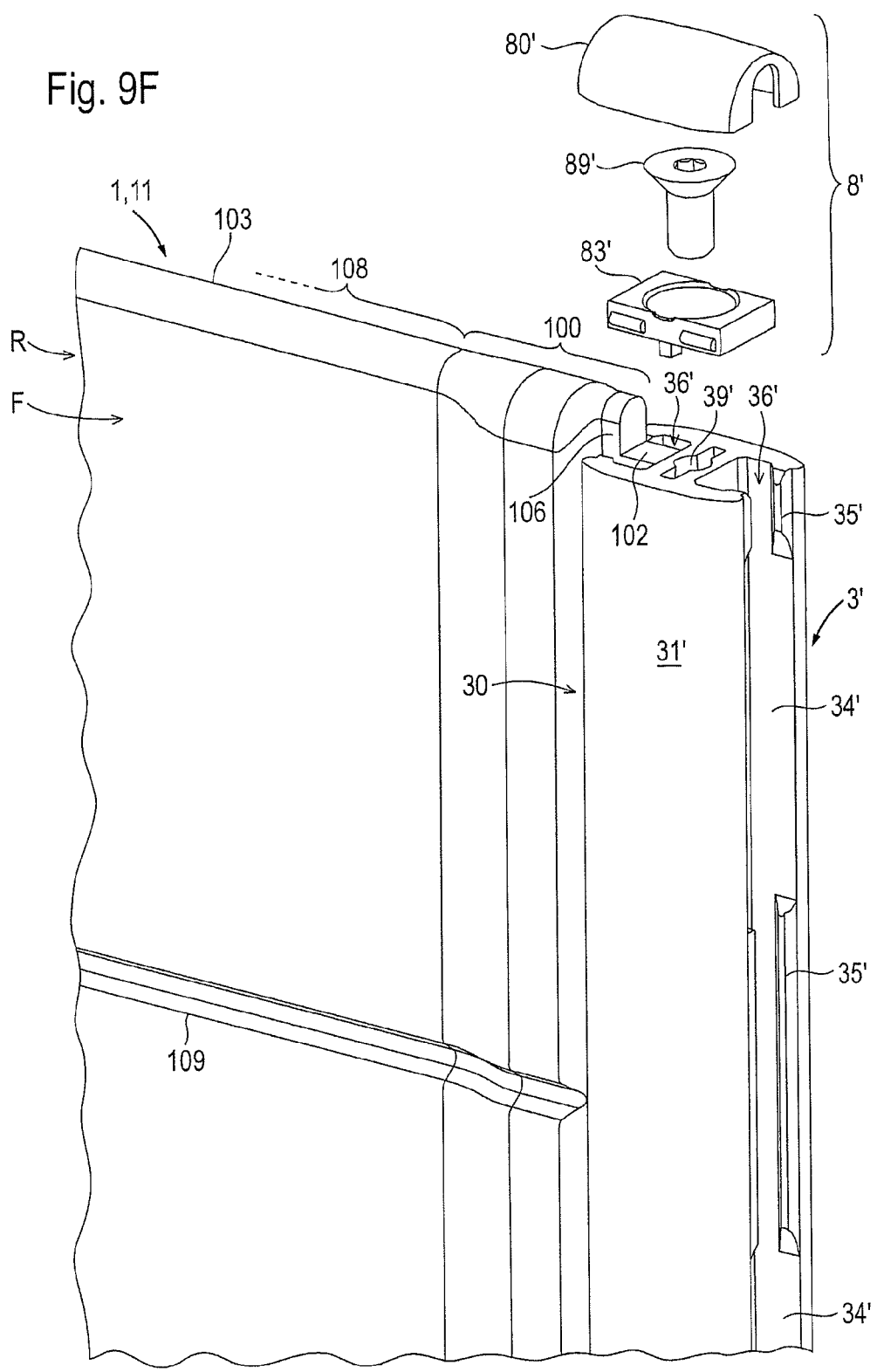
Figure 9G:
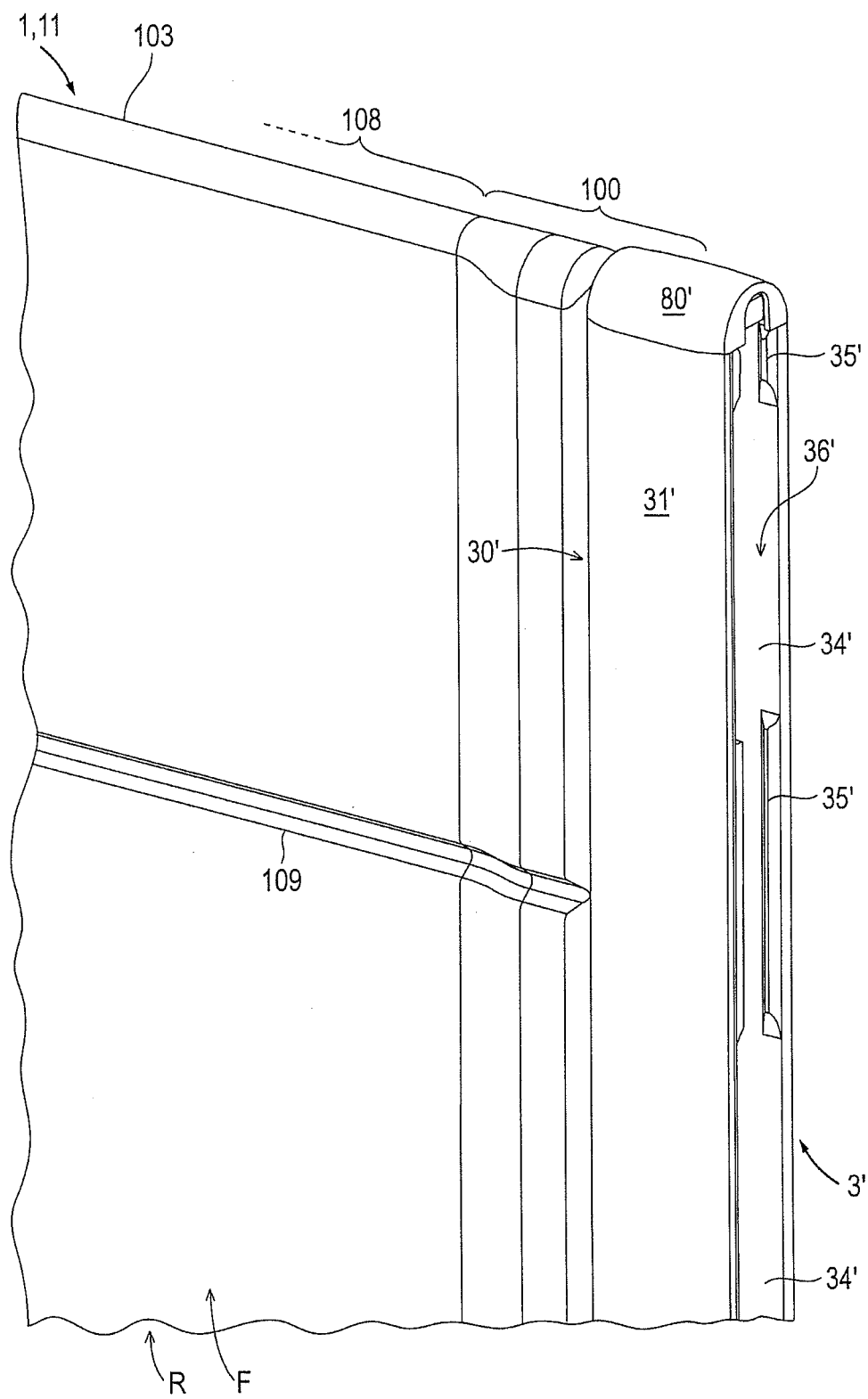
Figure 10A:
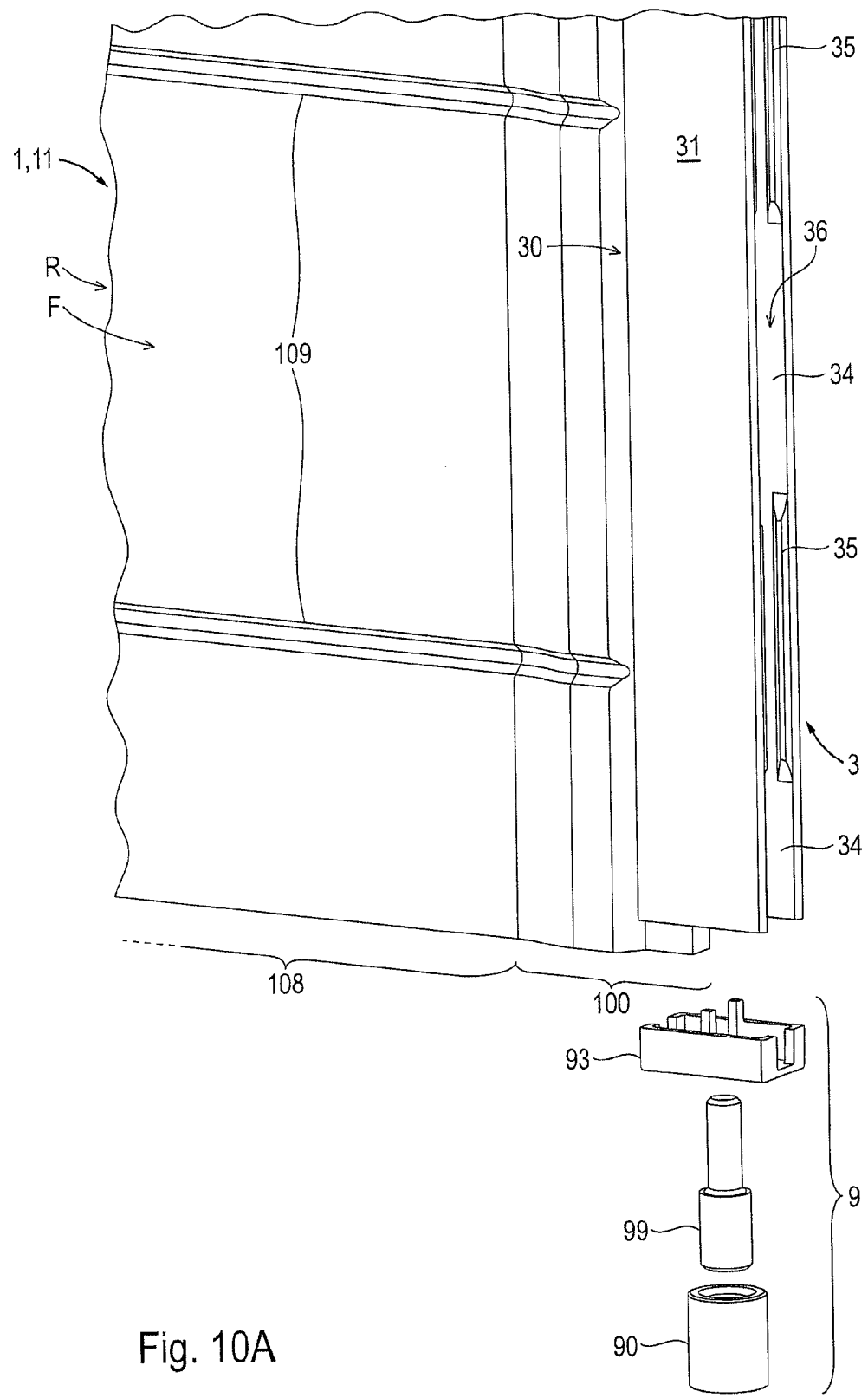
Figure 10B:
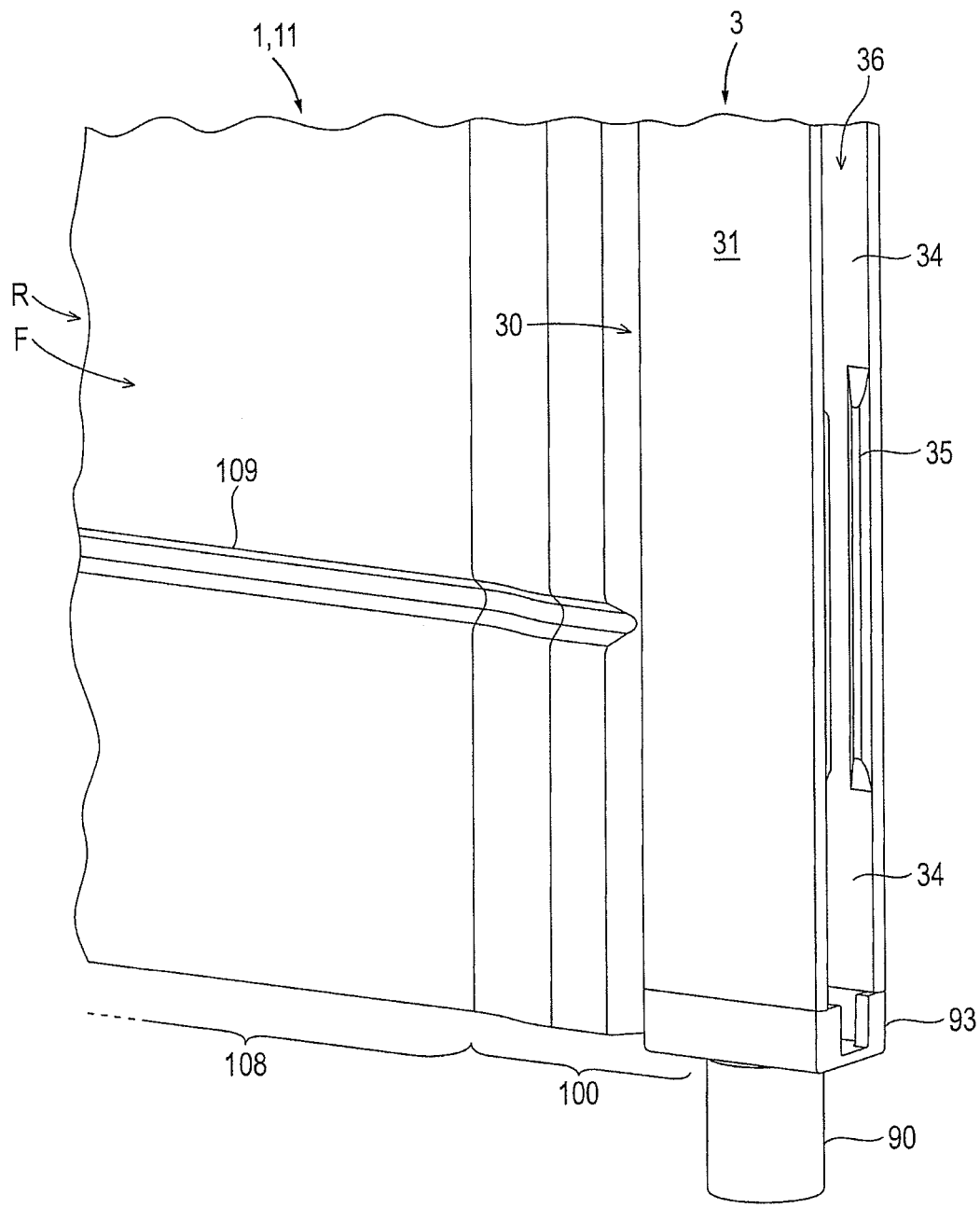
Figure 10C:
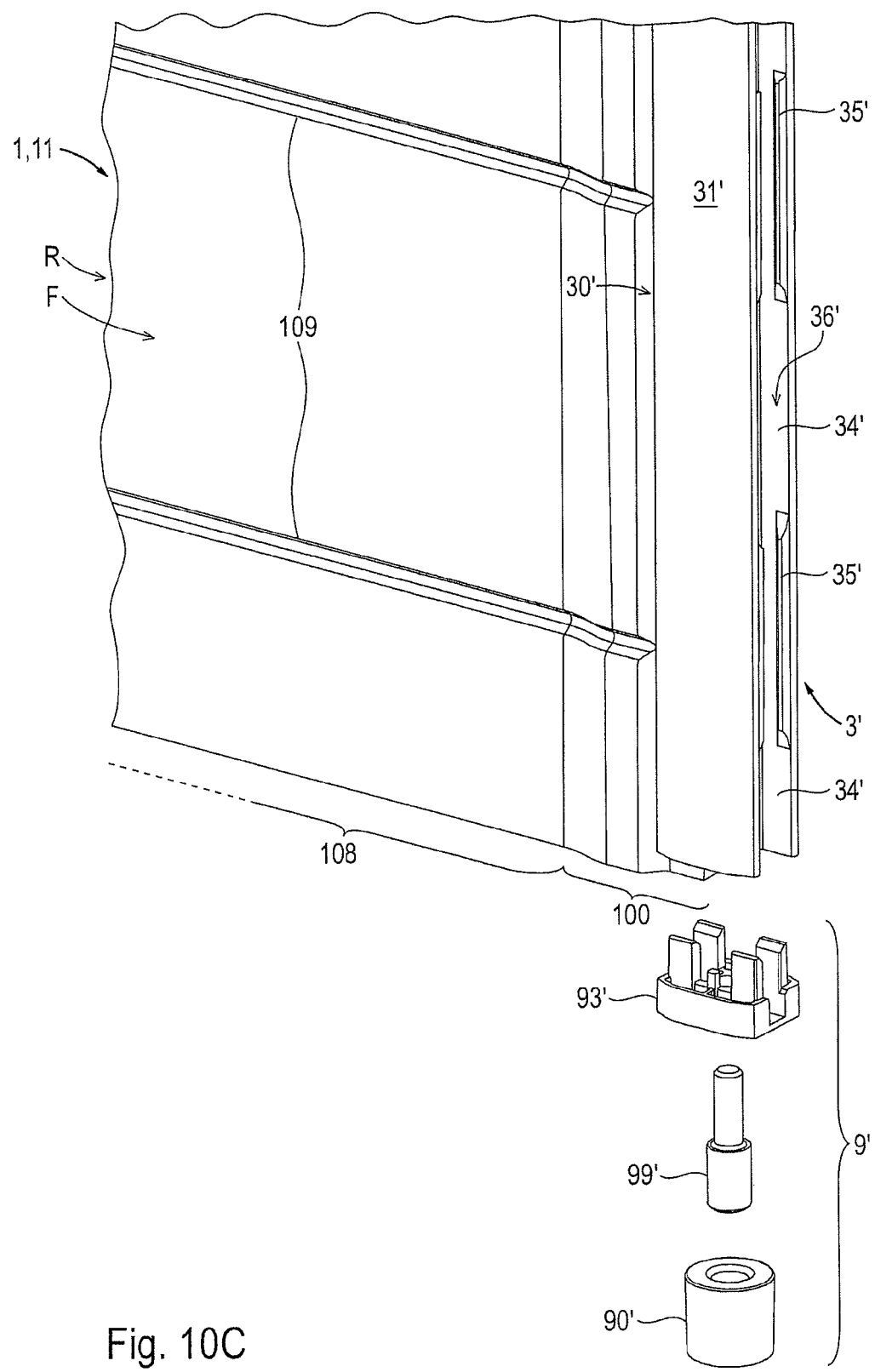
Figure 10D:
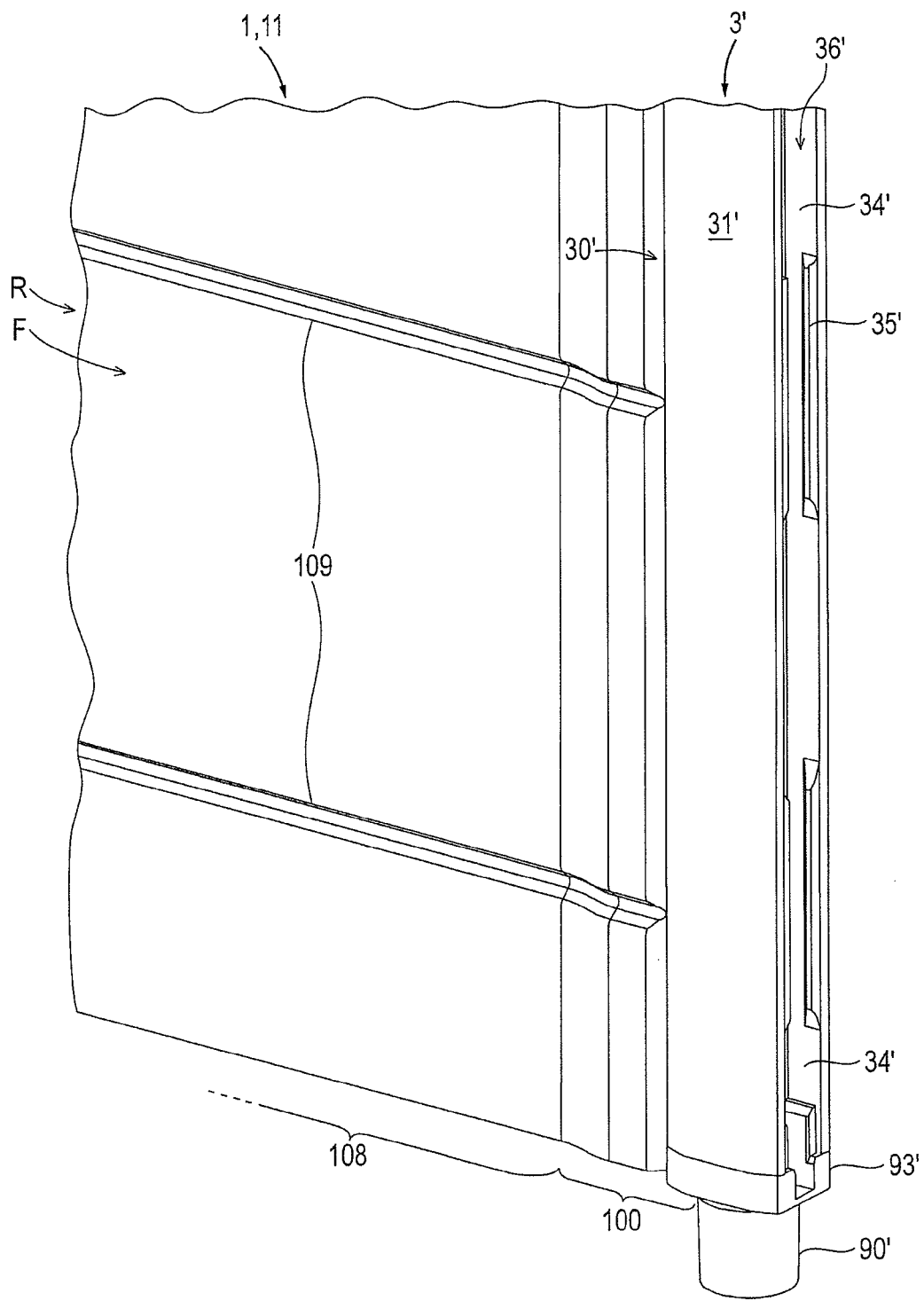
Figure 11A:
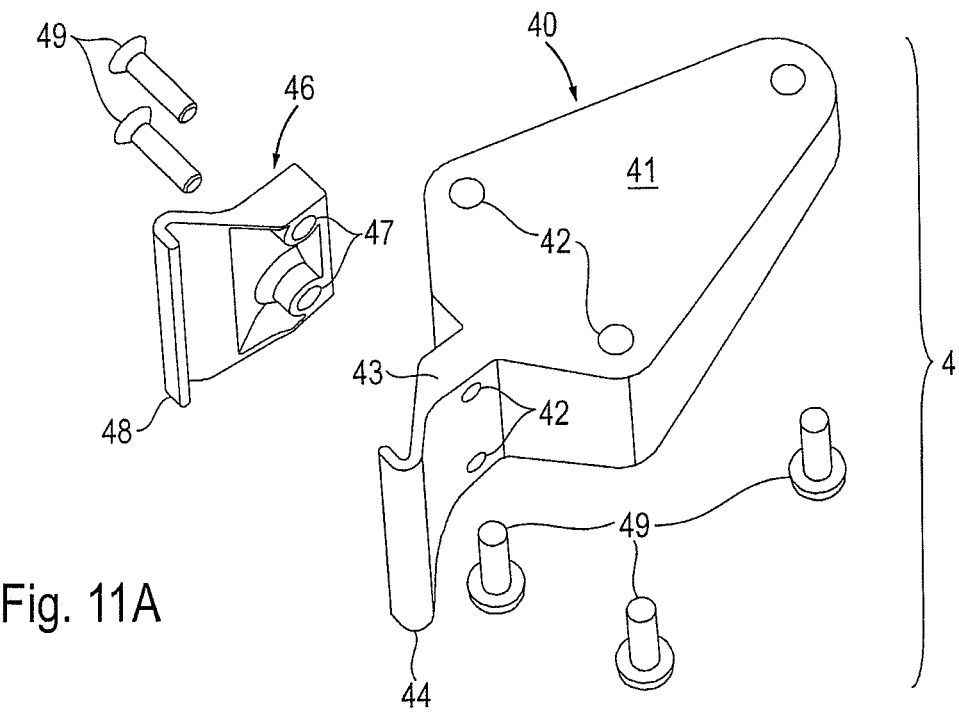
Figure 11B:
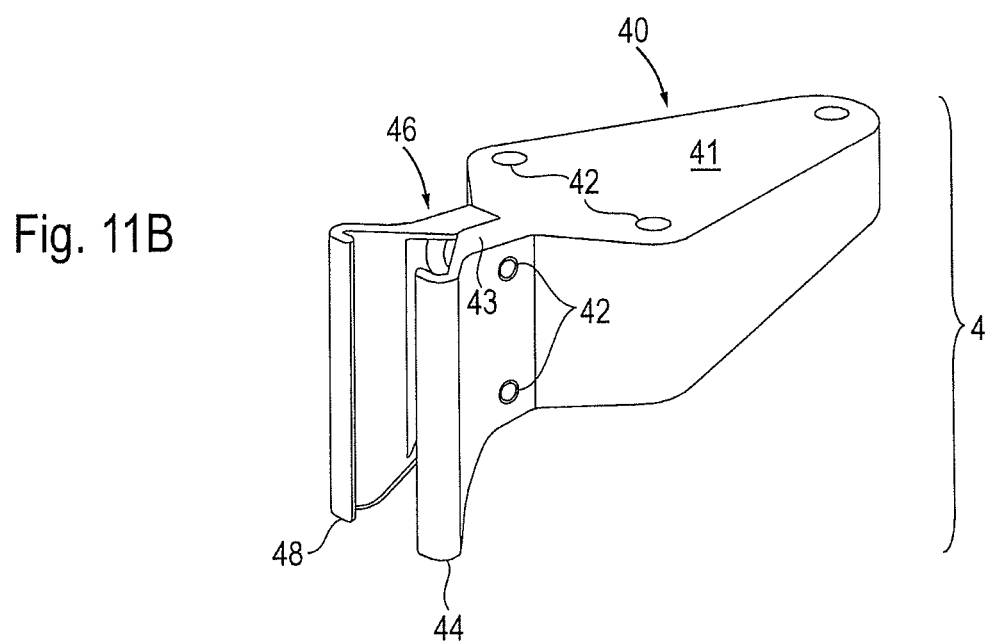
Figure 11C:
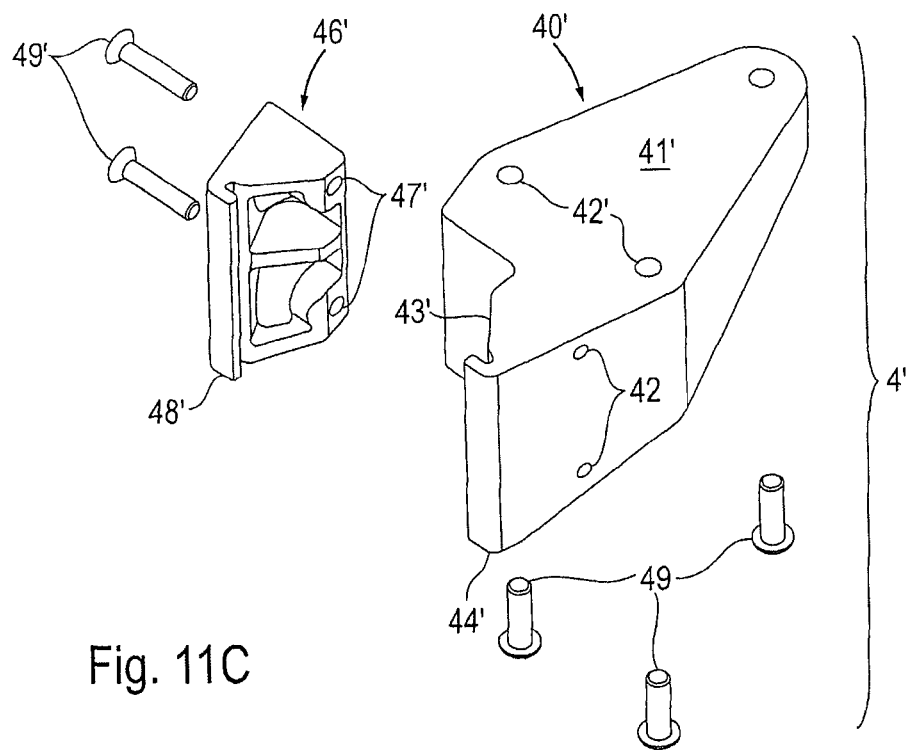
Figure 11D:
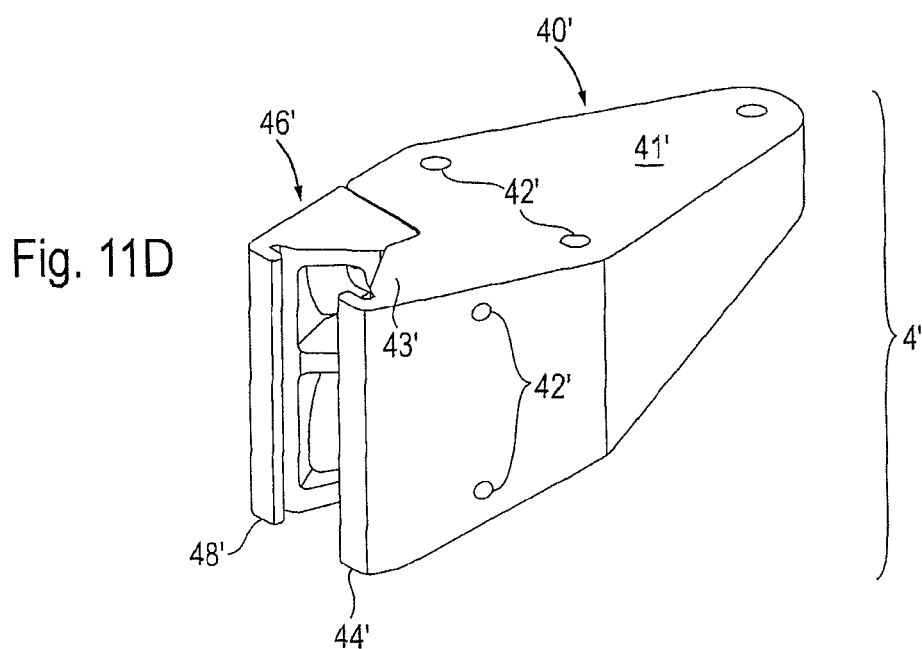
Figure 12C:
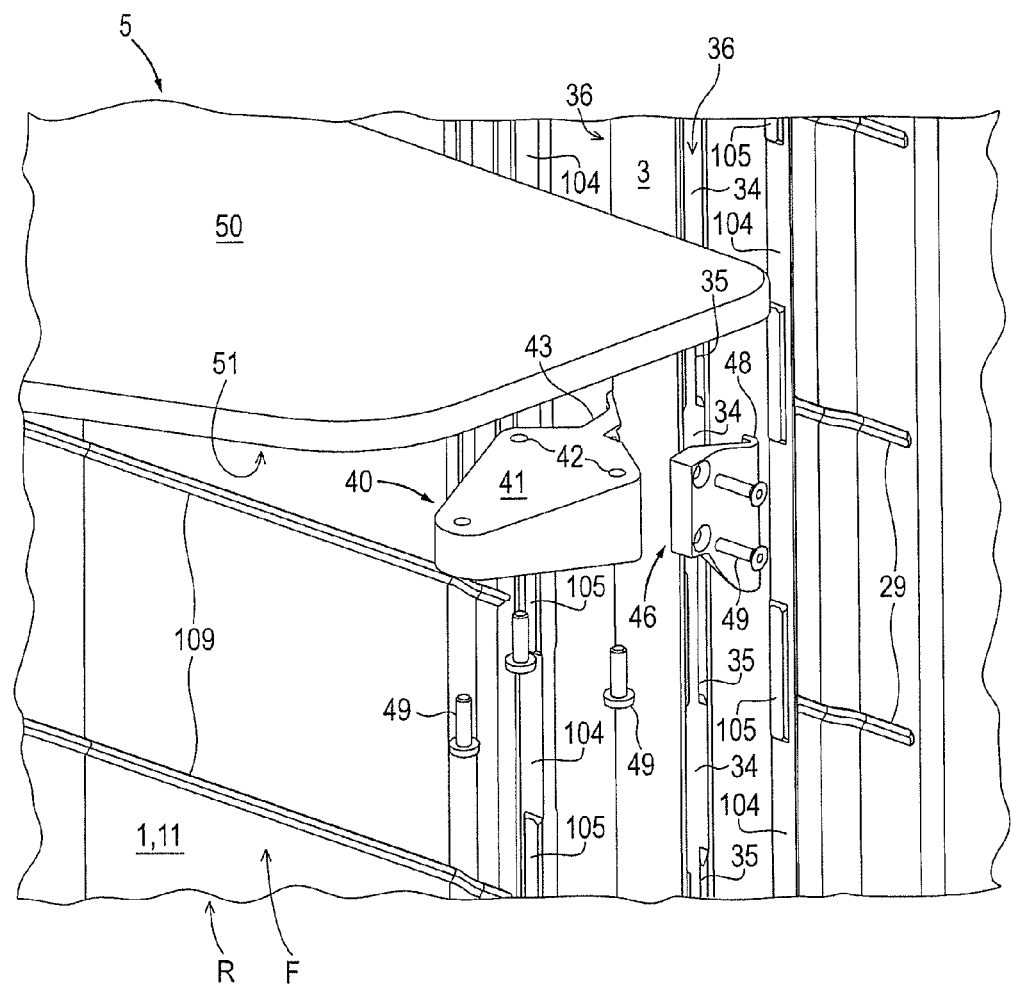
Figure 12F:
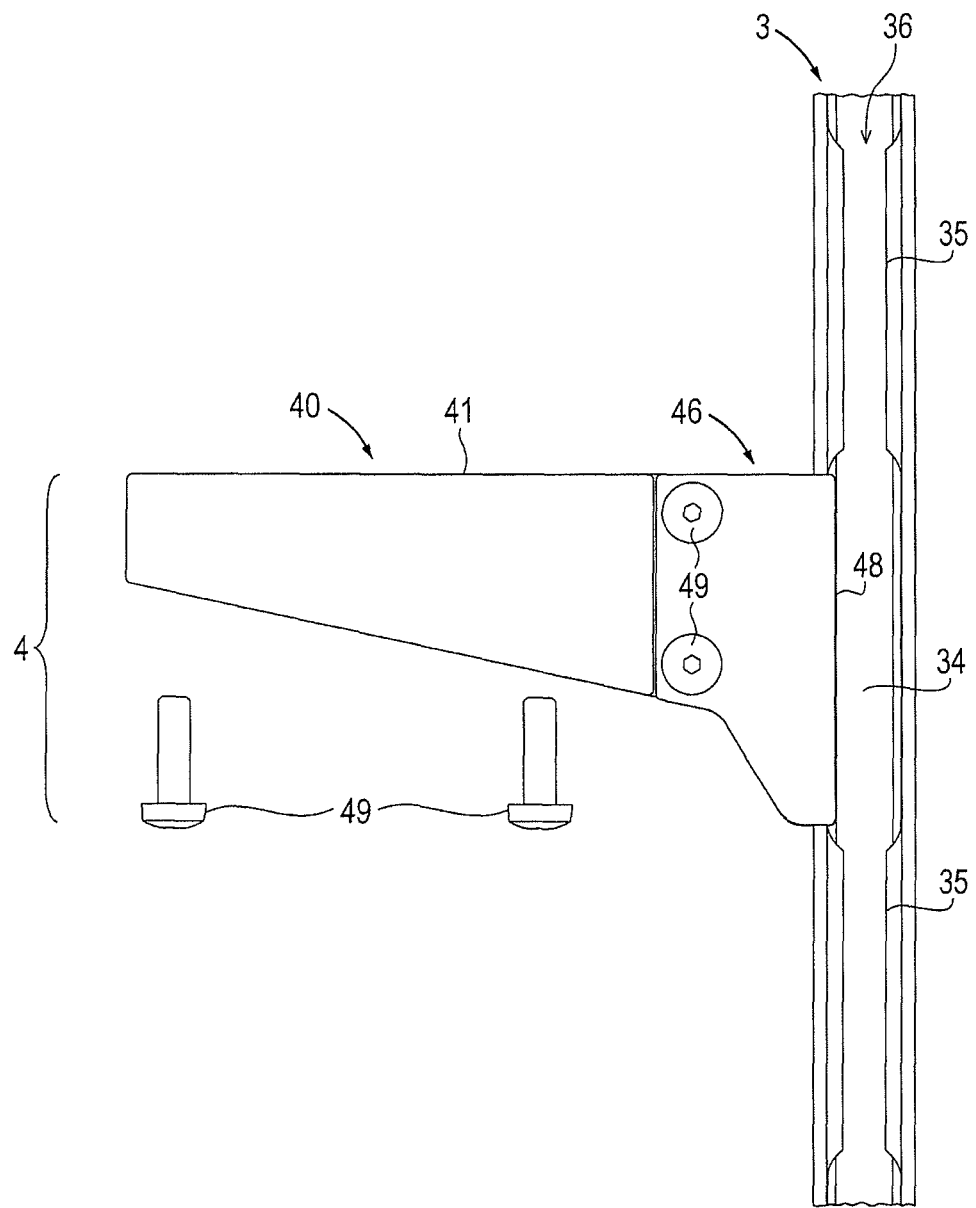
Figure 12G:
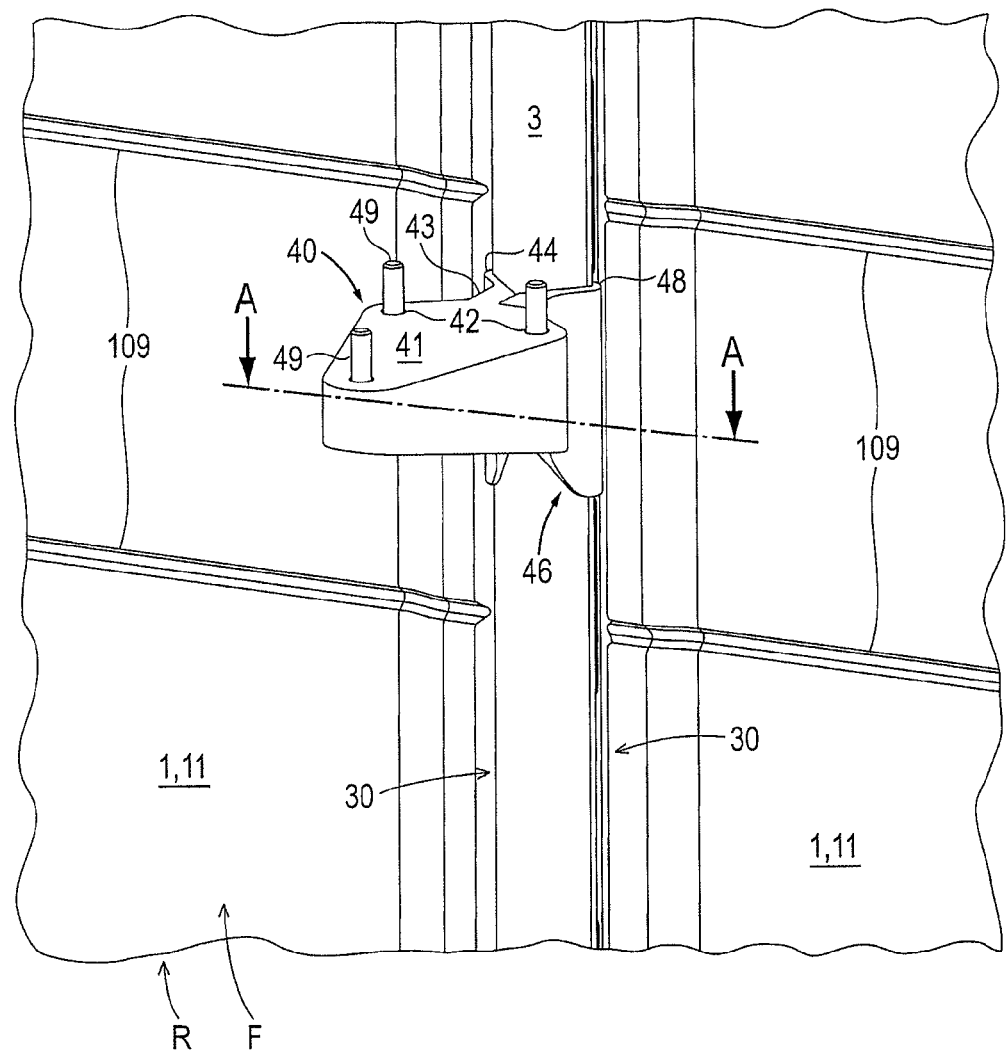
Figure 12H:
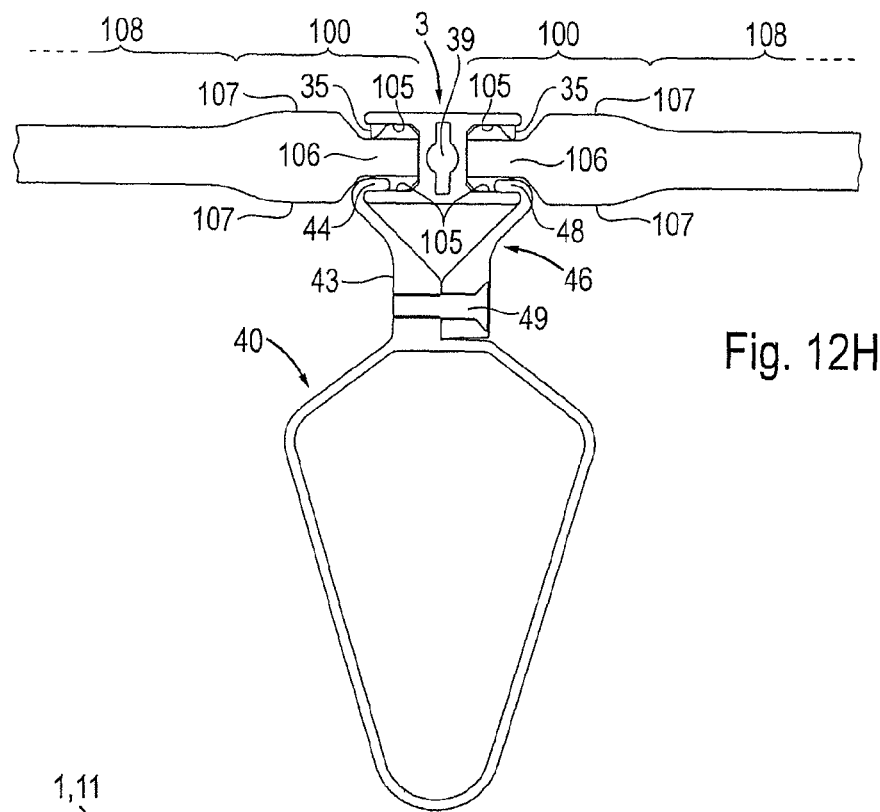
Figure 12J:
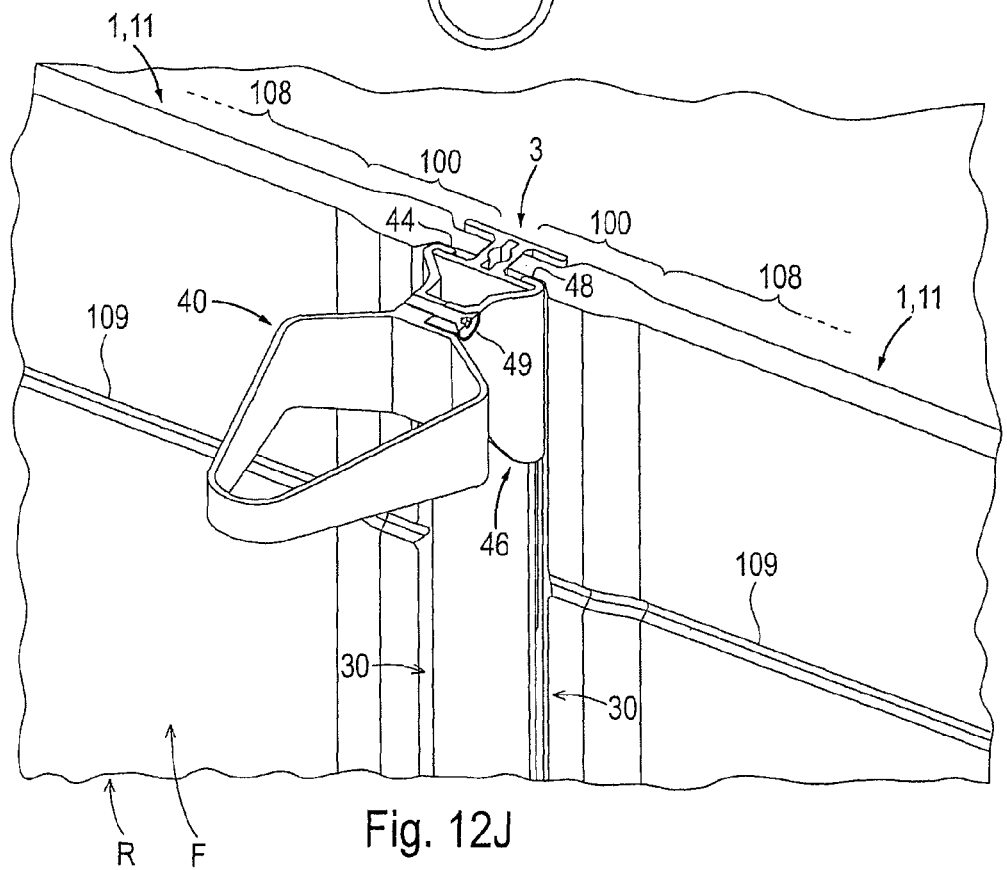
Figure 13A:
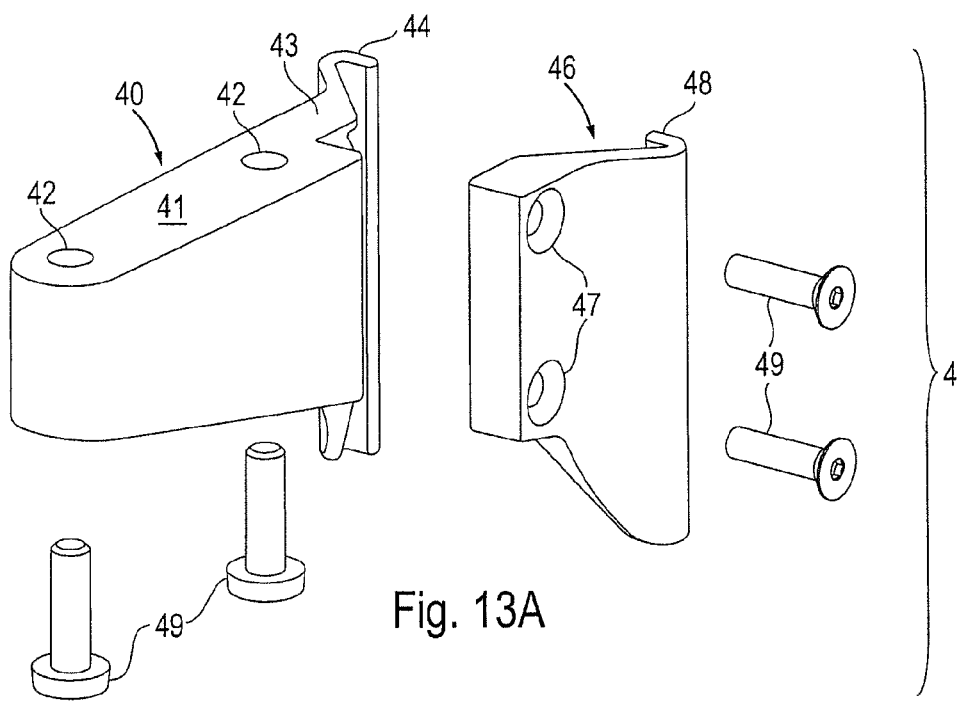
Figure 13B:
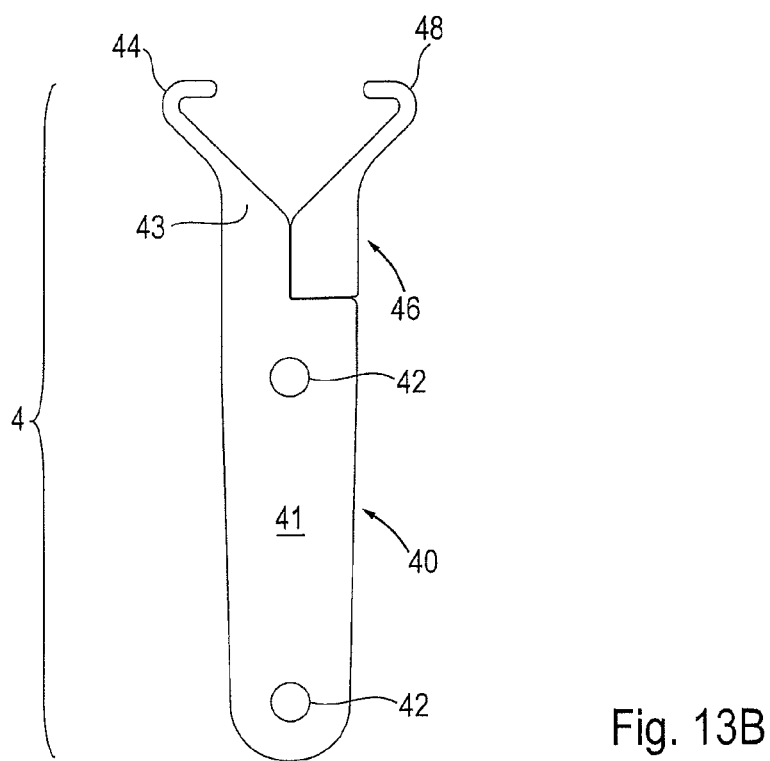
Figure 13C:
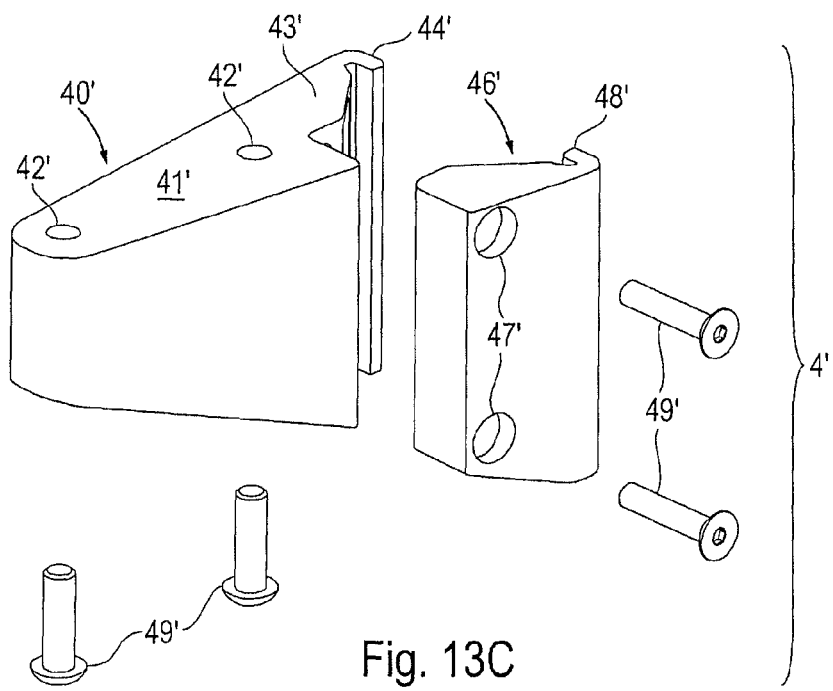
Figure 13D:
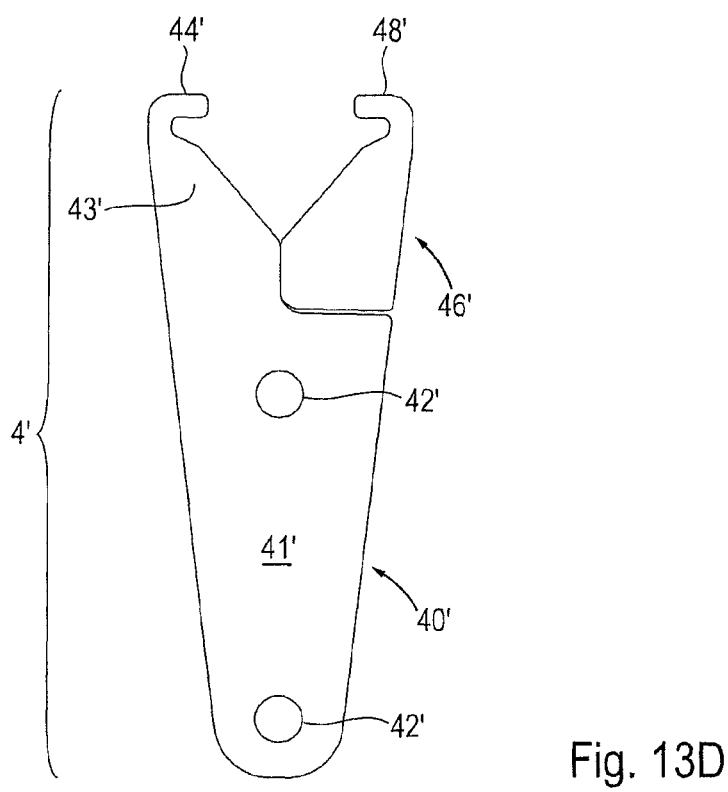
Figure 14A:
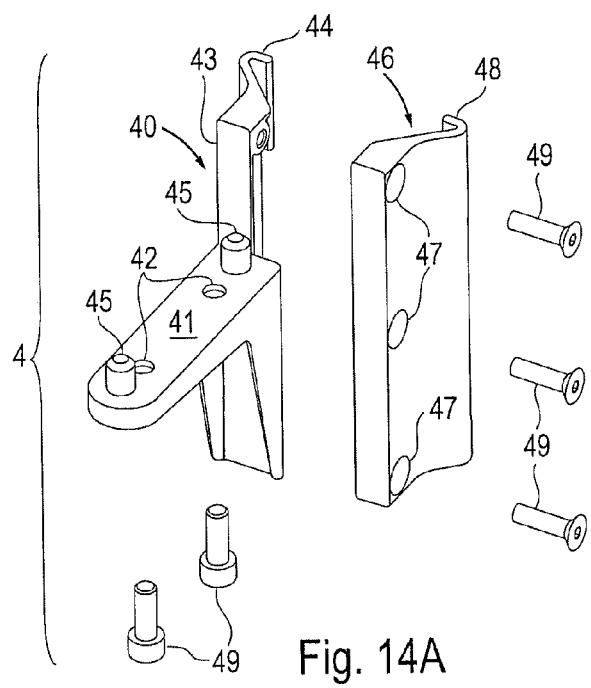
Figure 14B:
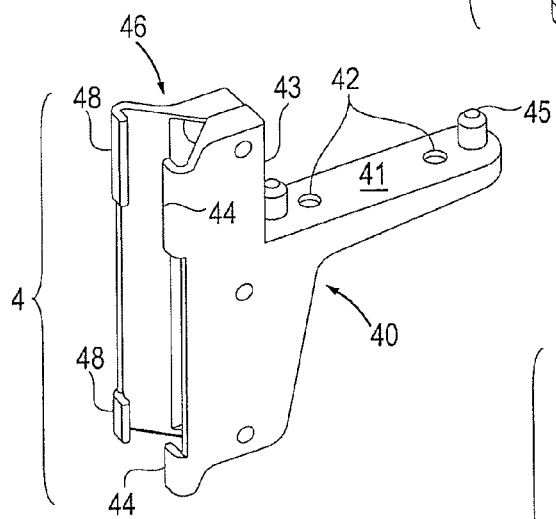
Figure 14C:
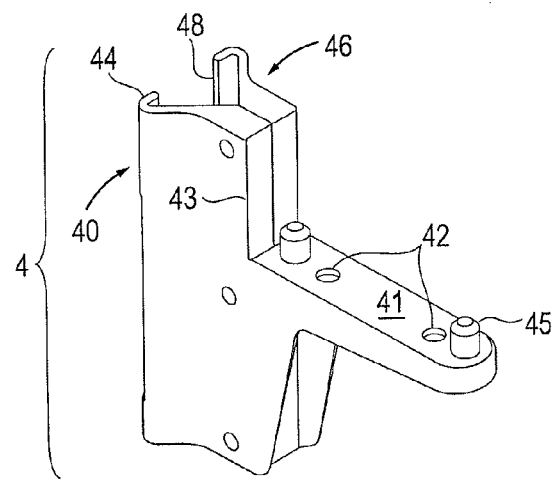
Figure 14D:
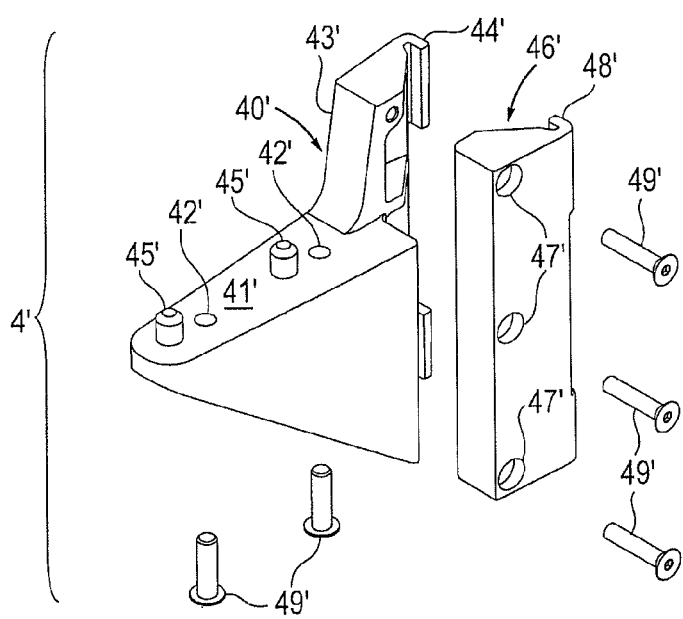
Figure 14E:
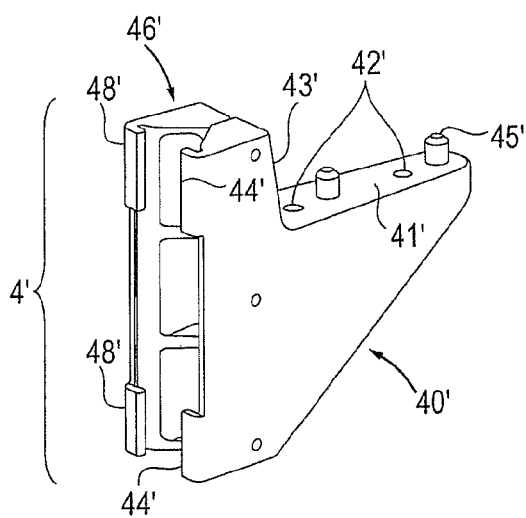
Figure 14F:
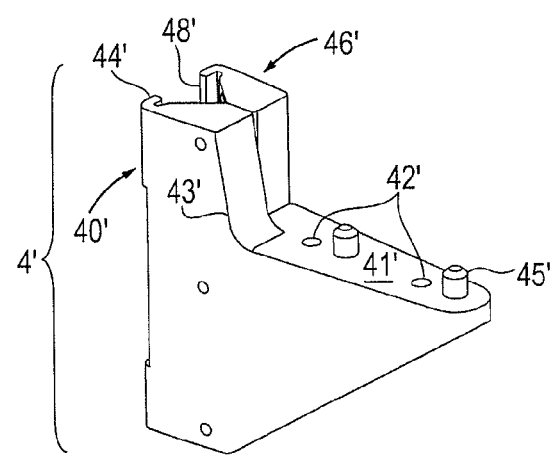
Figure 15A:
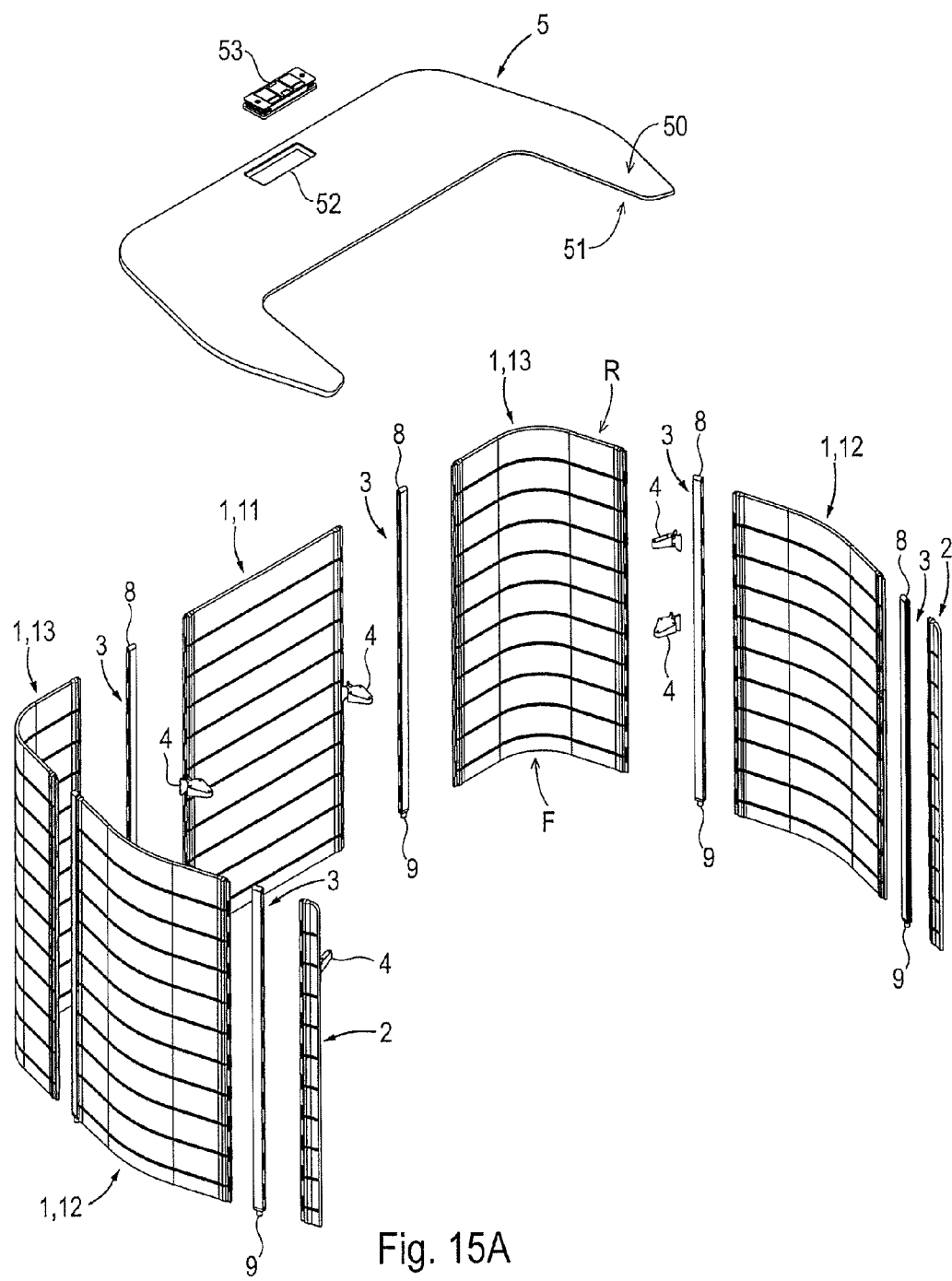
Figure 15B:
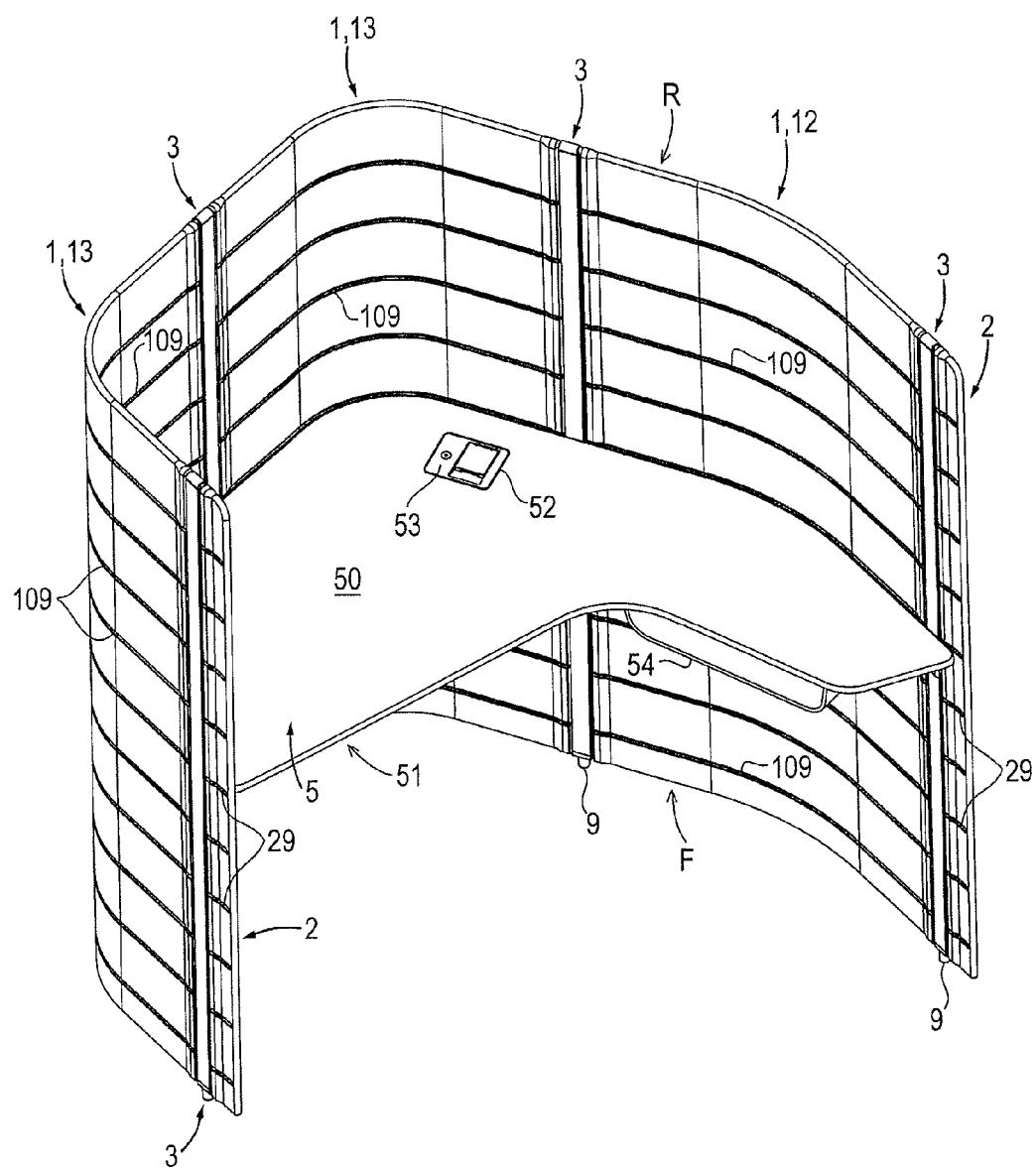
Figure 15C:
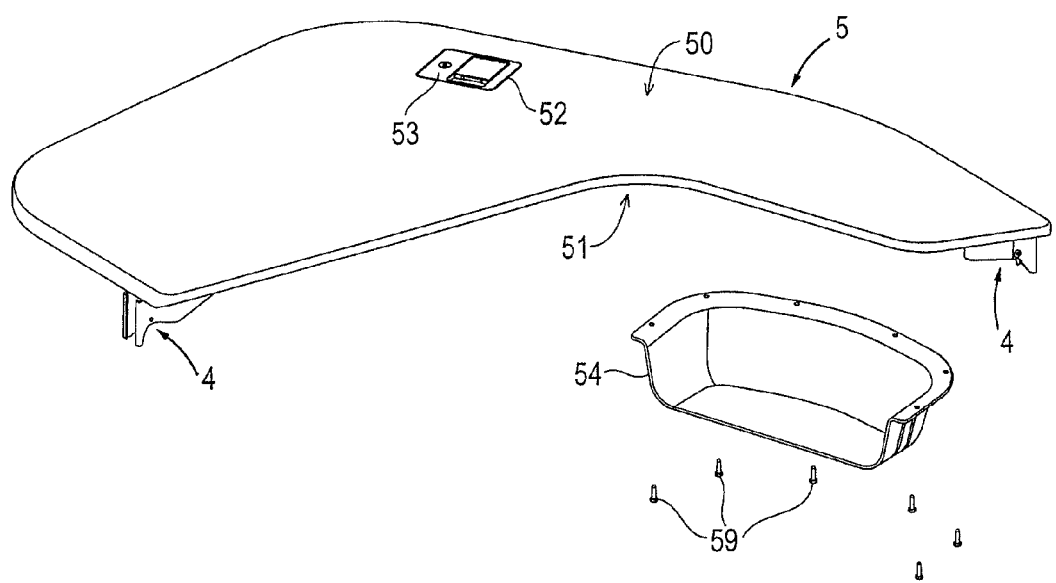
Figure 15D:
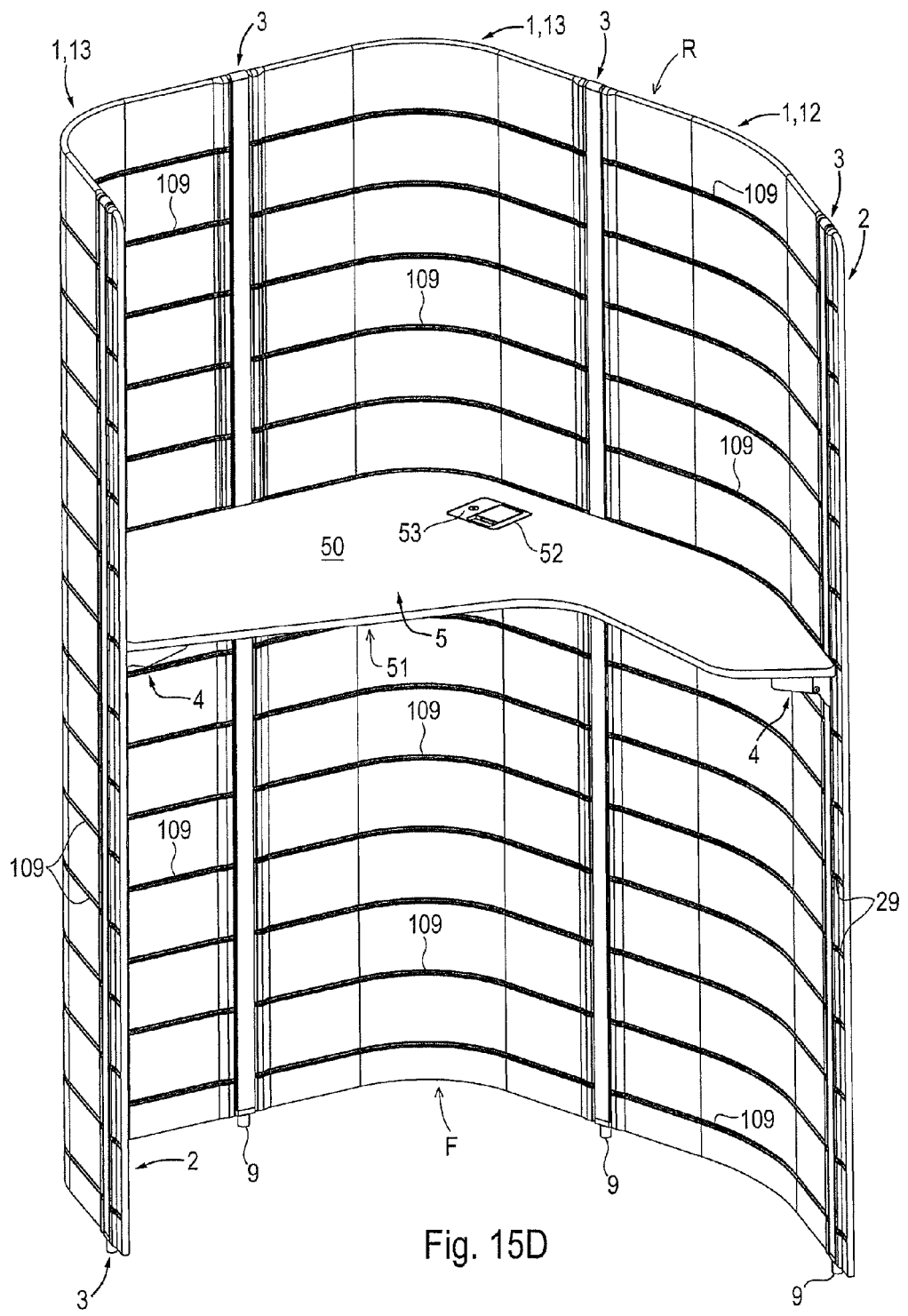
Figure 16A:
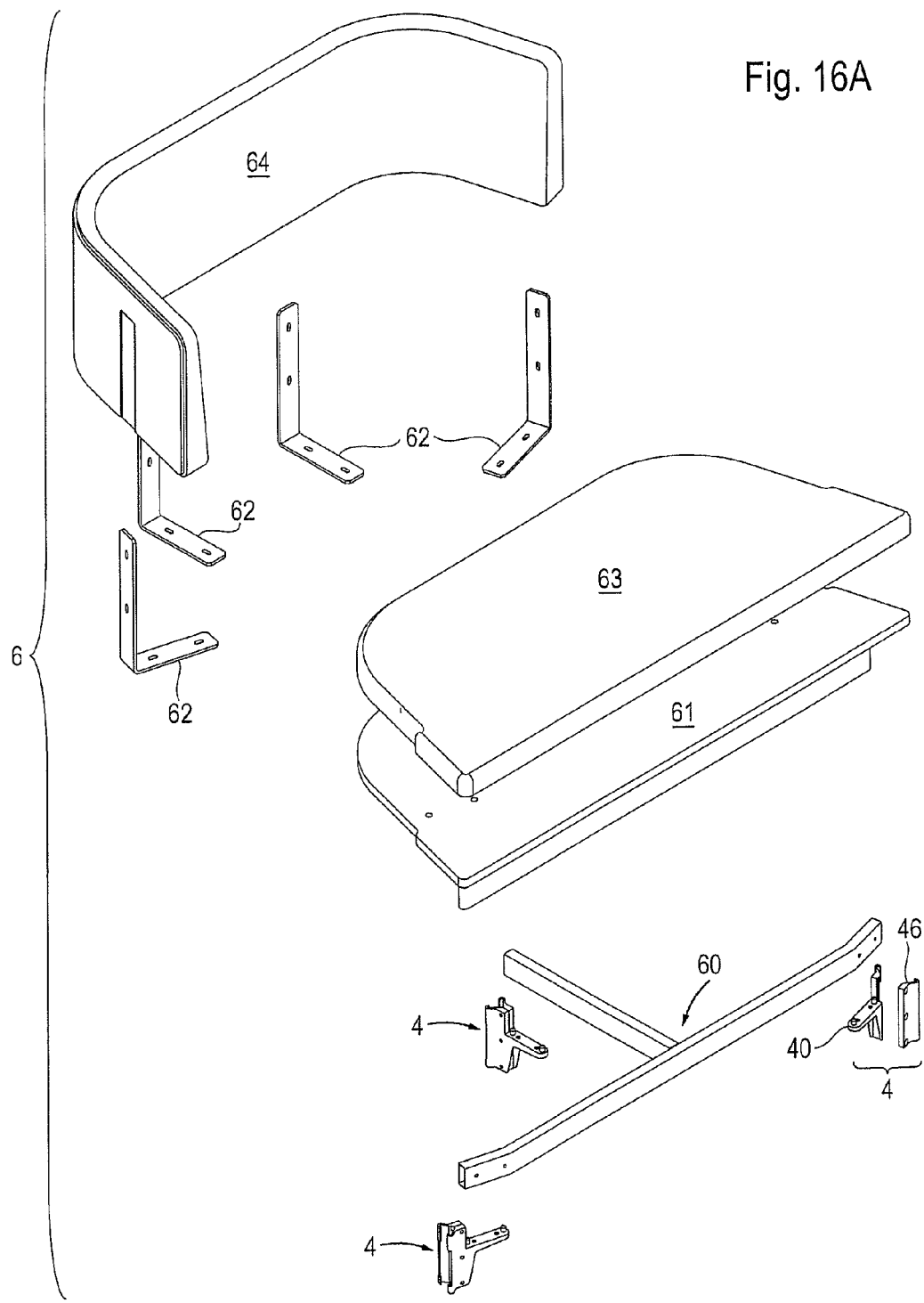
Figure 16B:
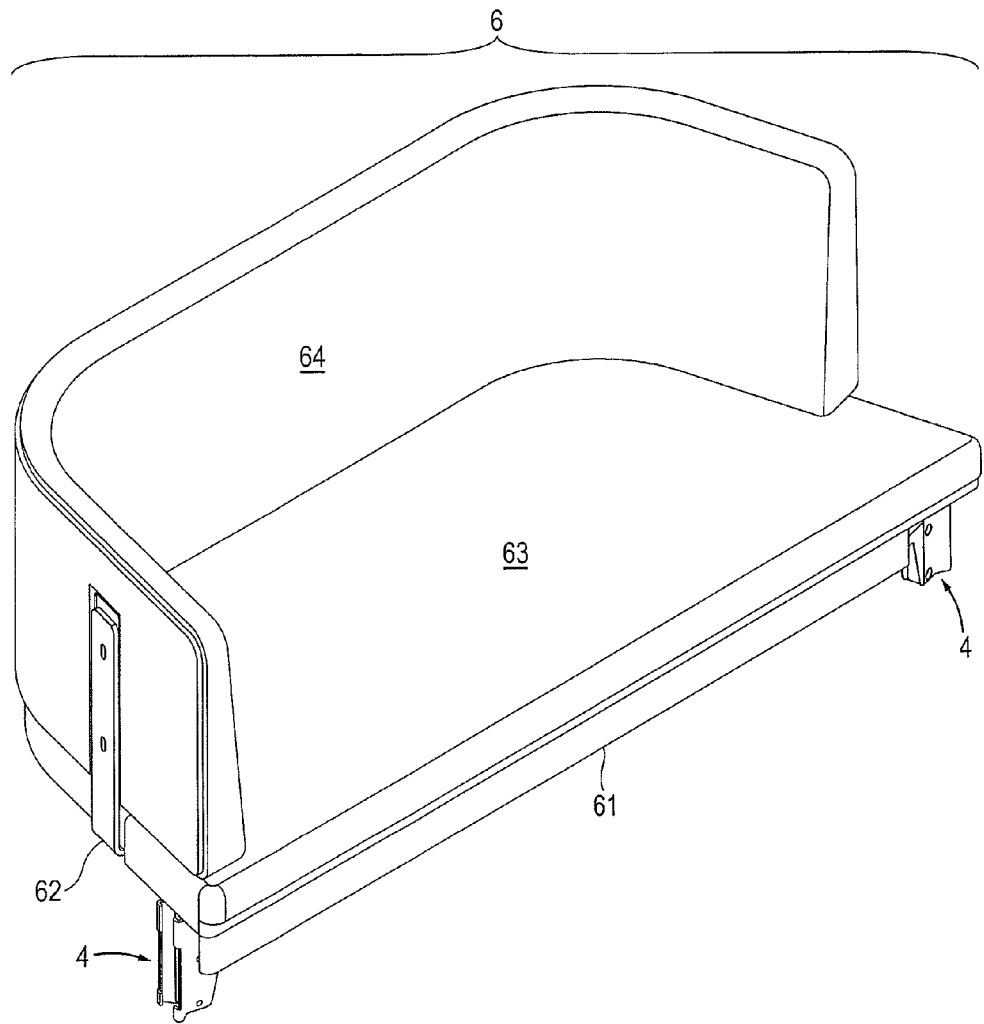
Figure 16C:
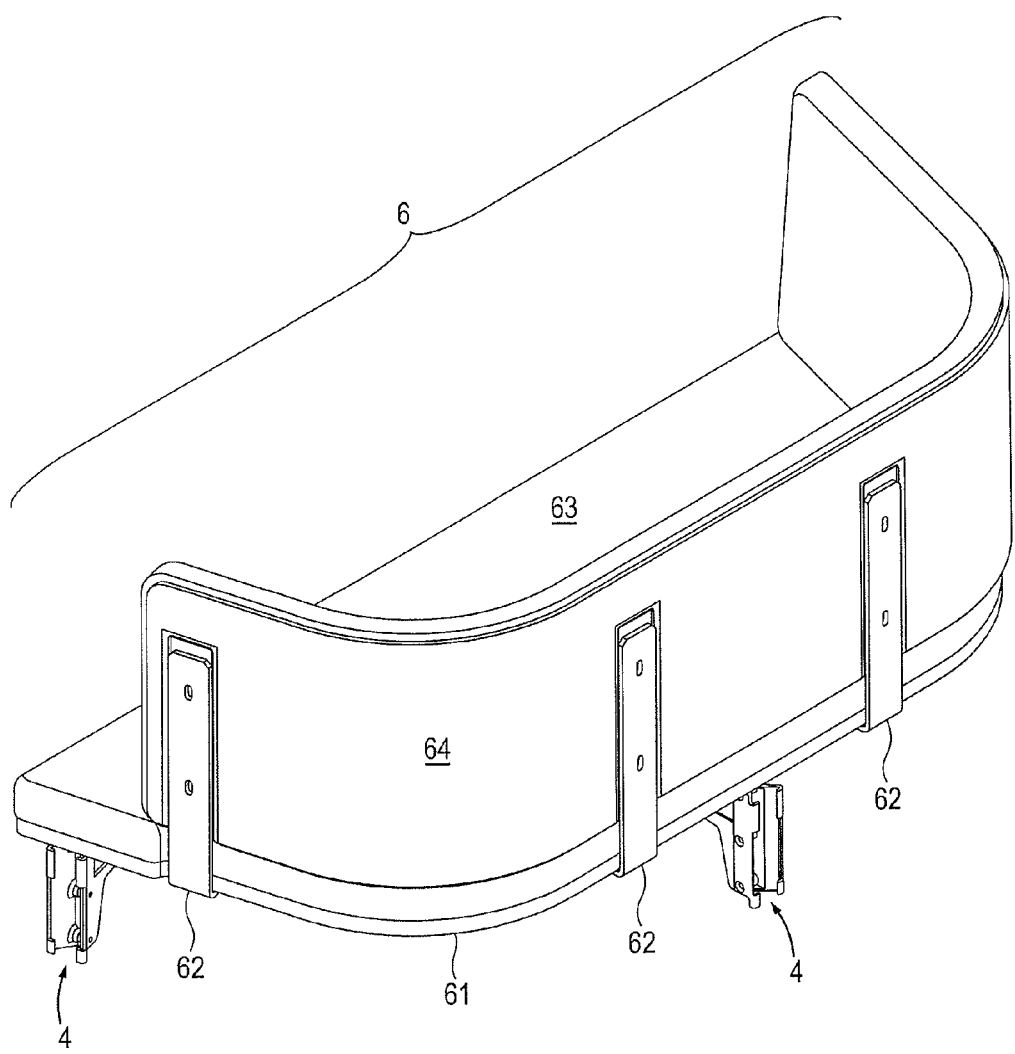
Figure 17A:
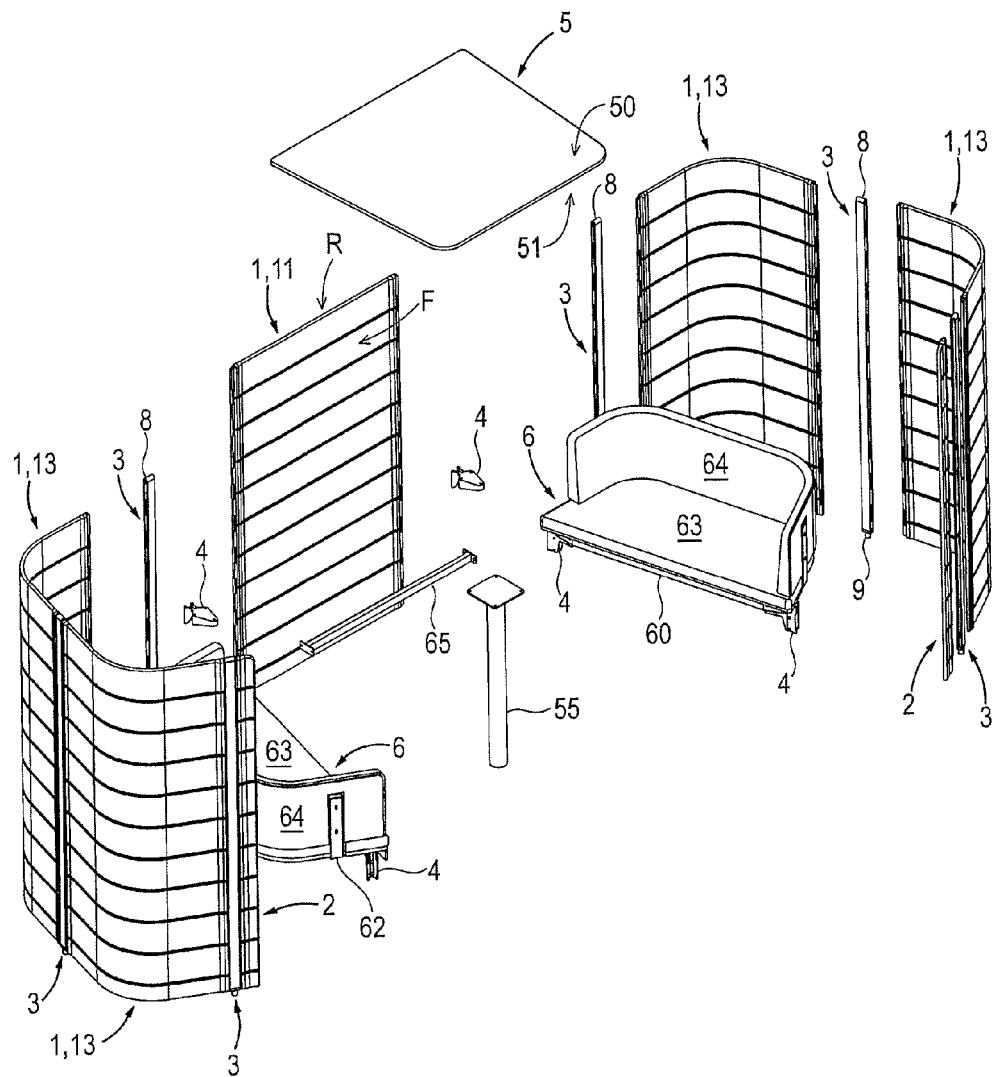
Figure 17B:
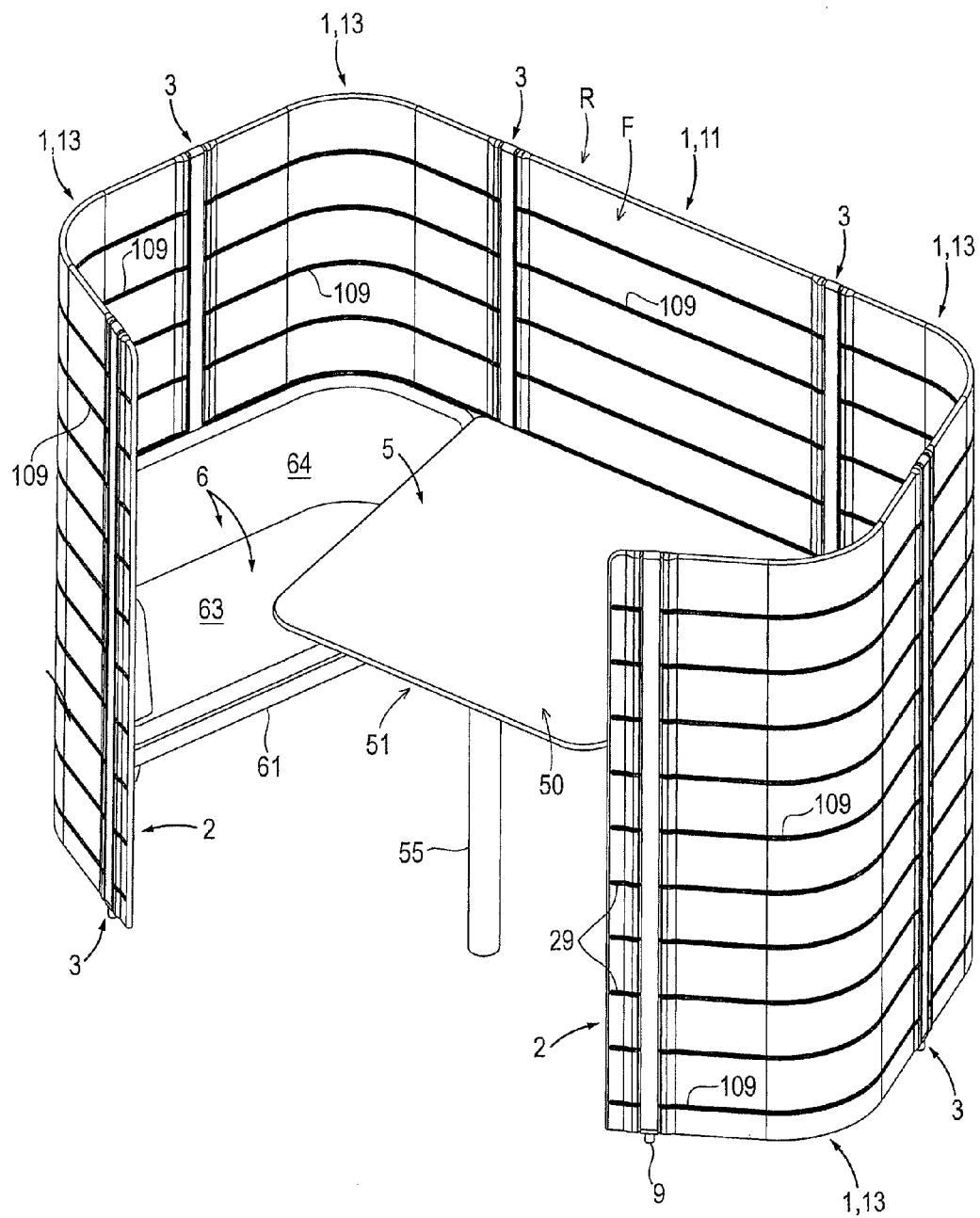
Figure 18A:
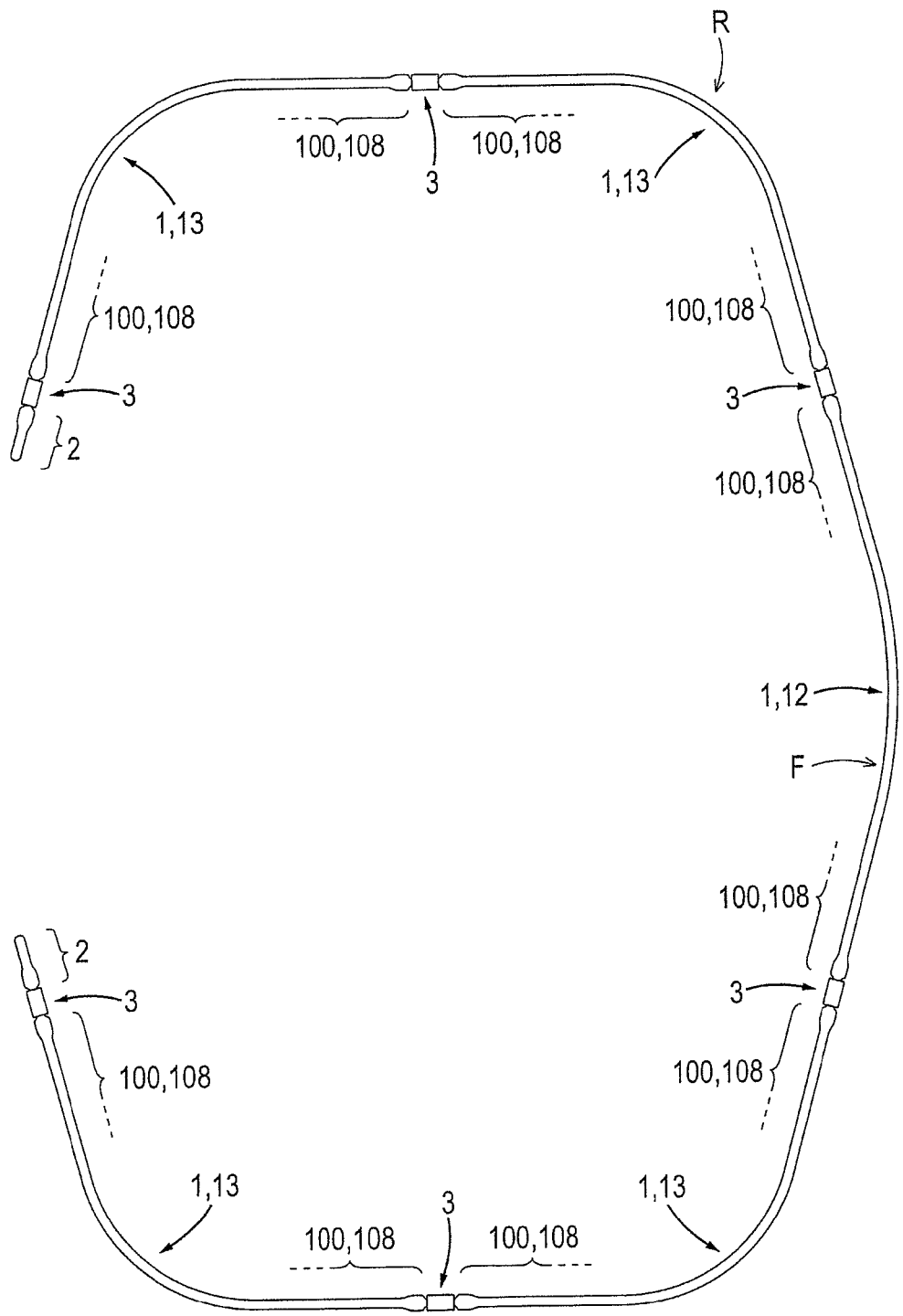
Figure 18B:
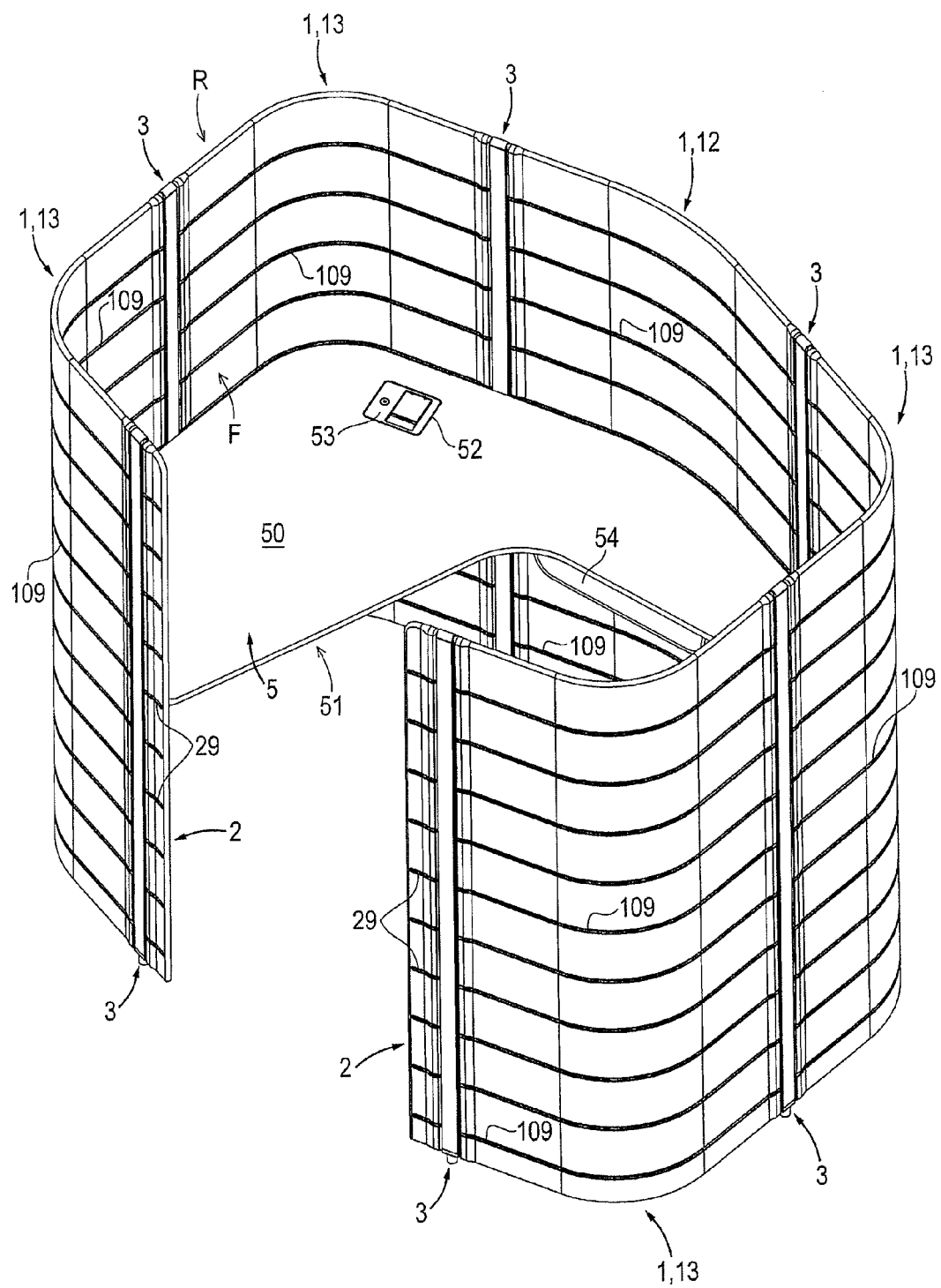
Figure 19A:
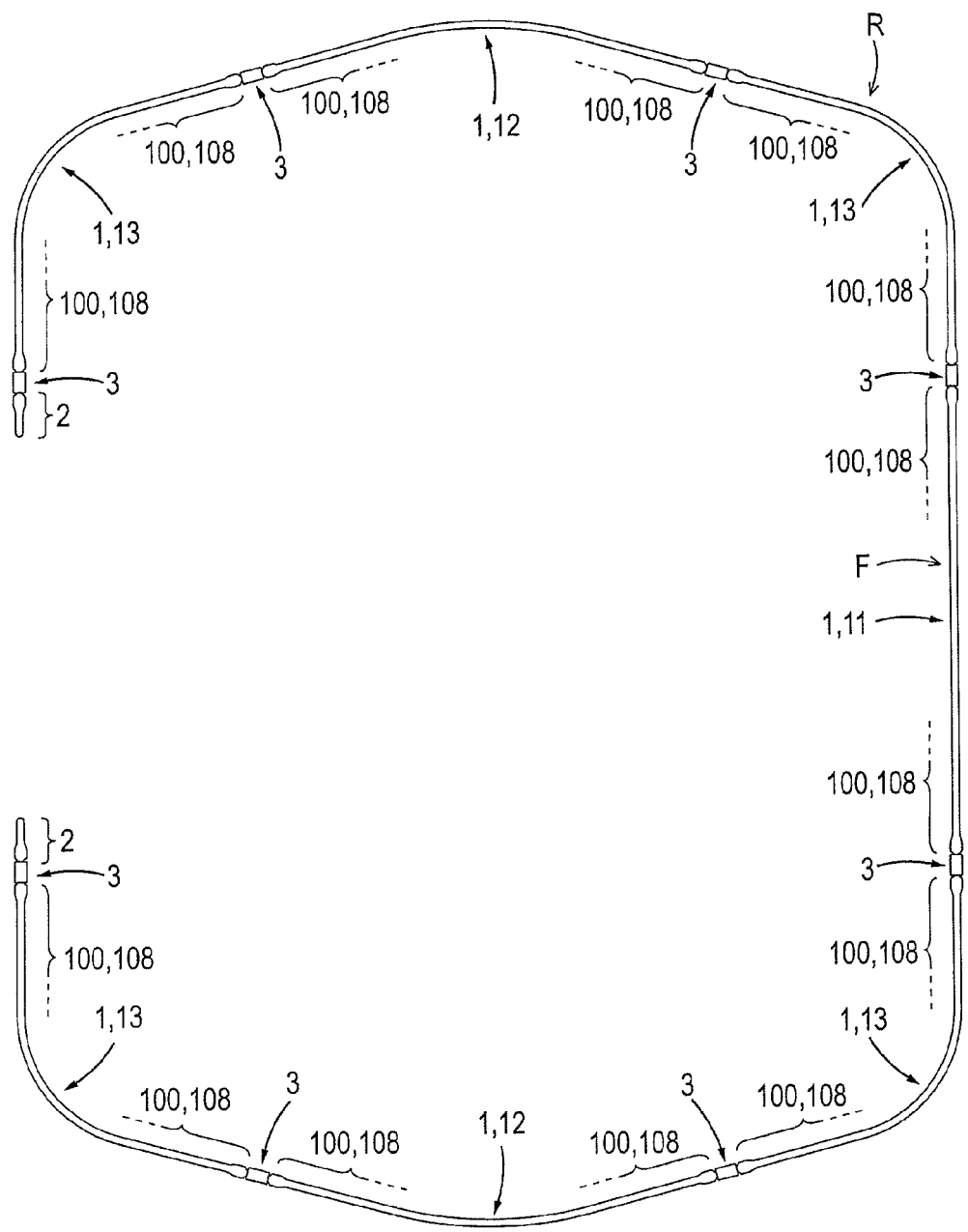
Figure 19B:
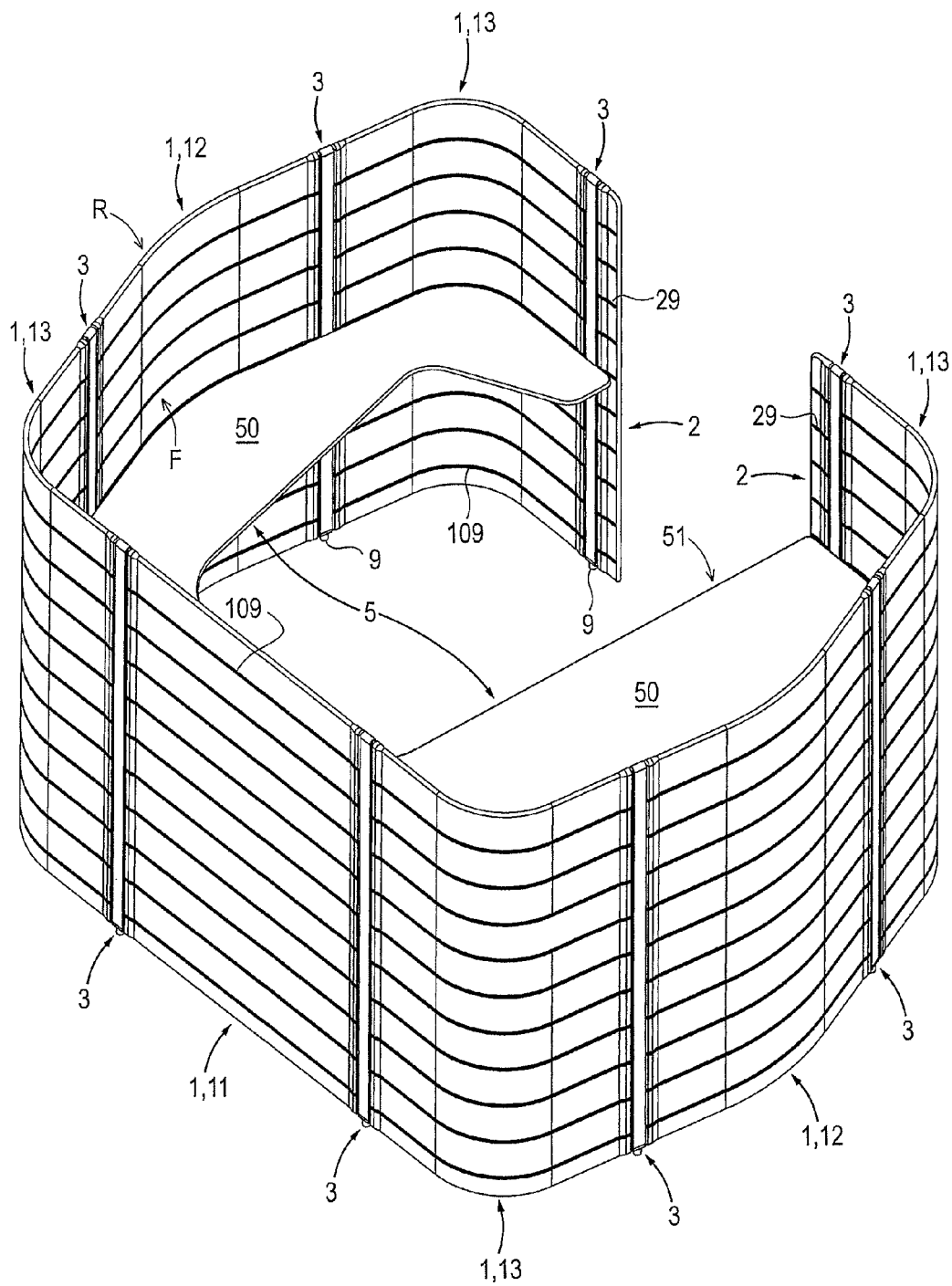
Figure 20A:
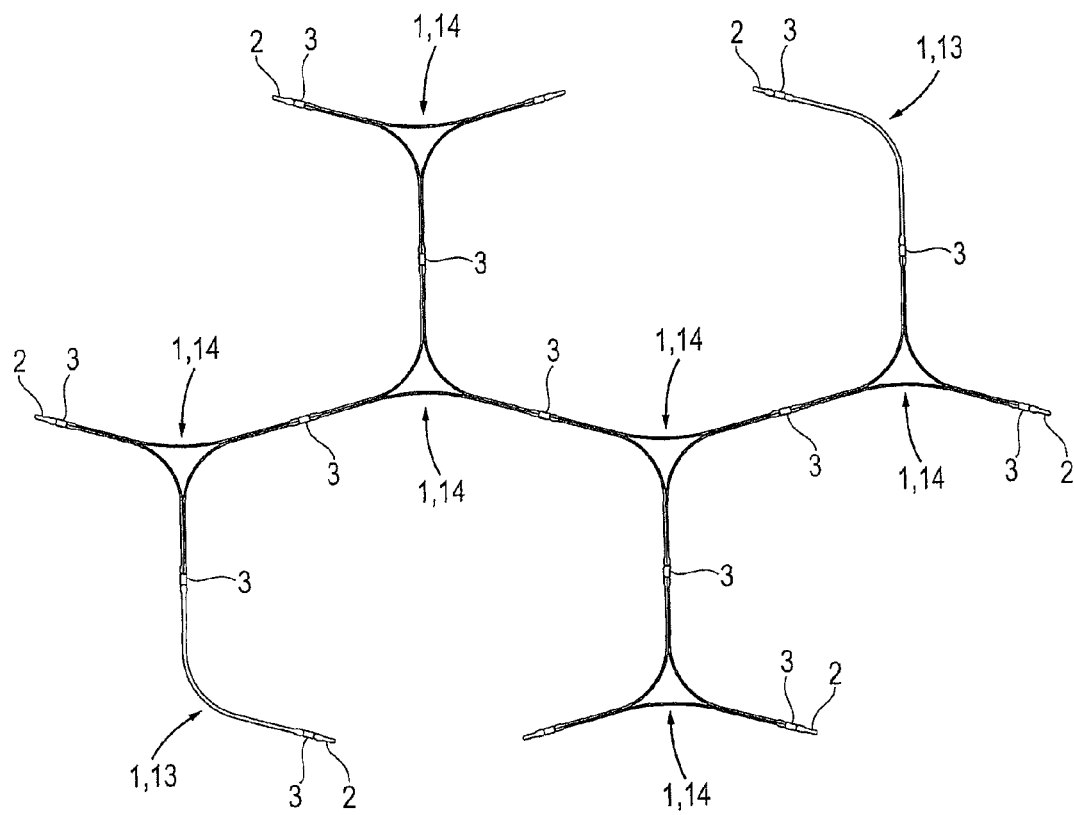
Figure 20B:
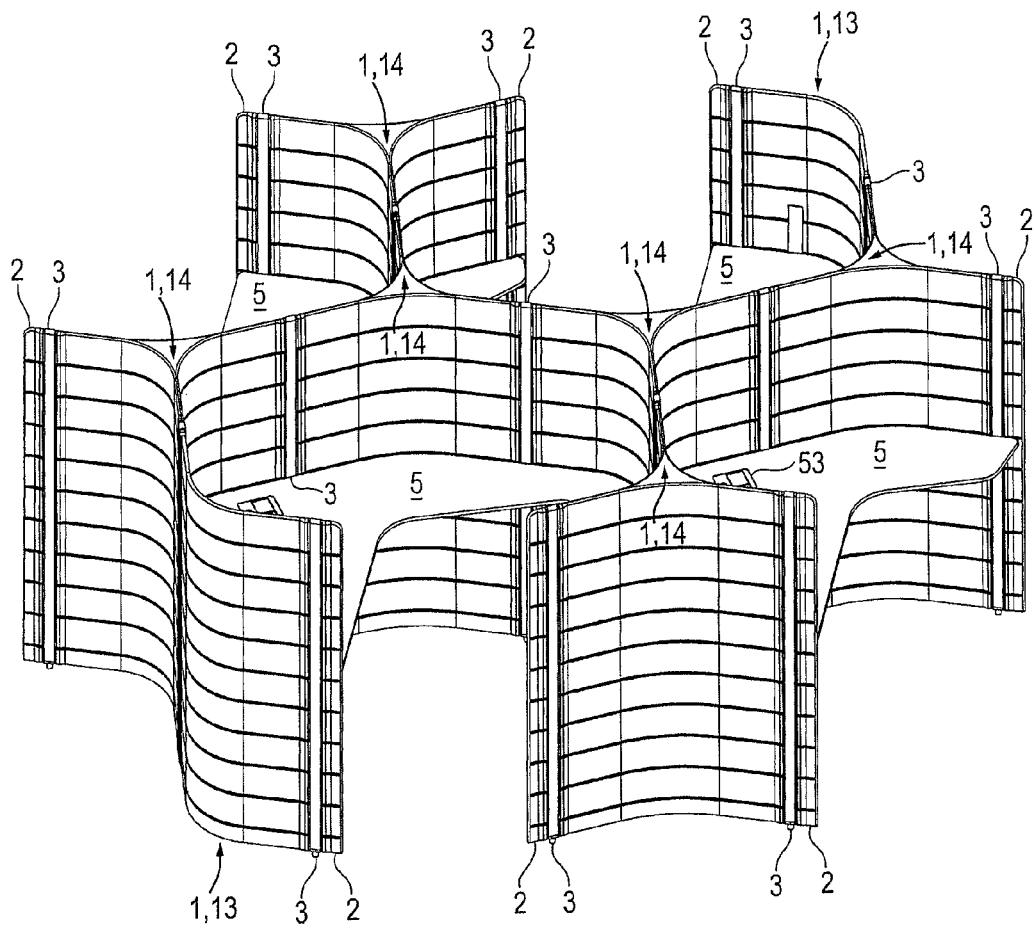
Figures 21A, 21B, 21C:
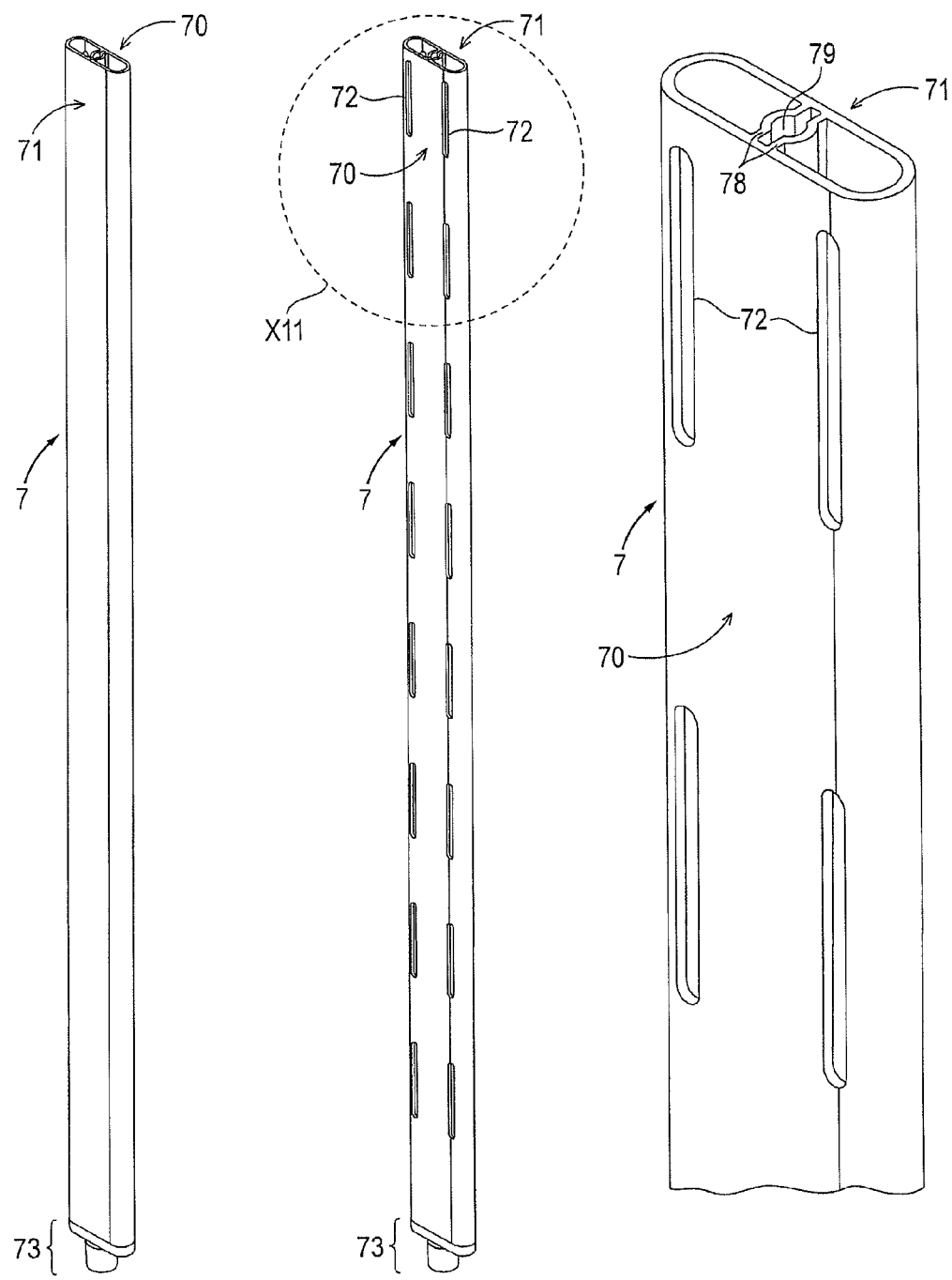
Figure 21D:
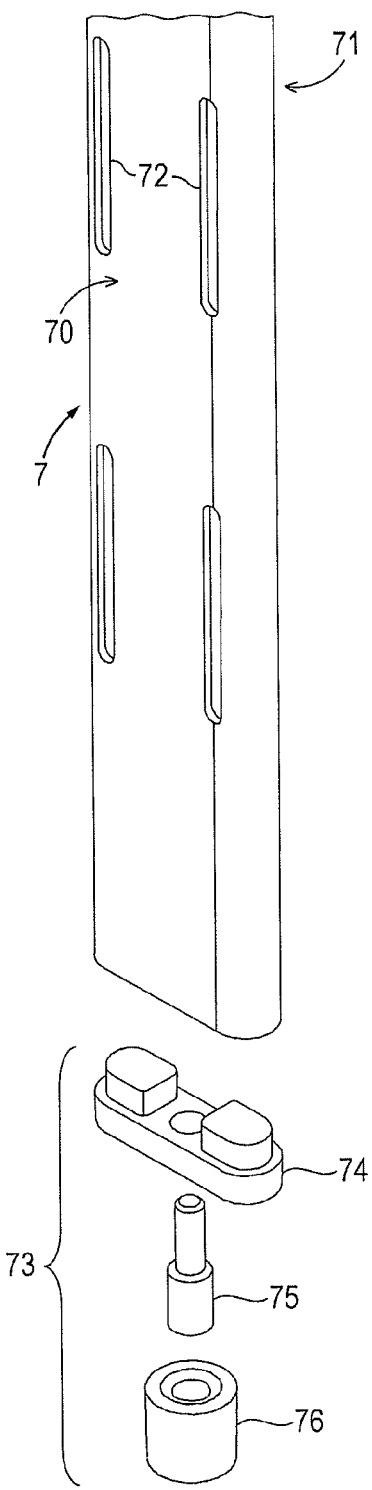
Figures 21E, 21F, 21G:
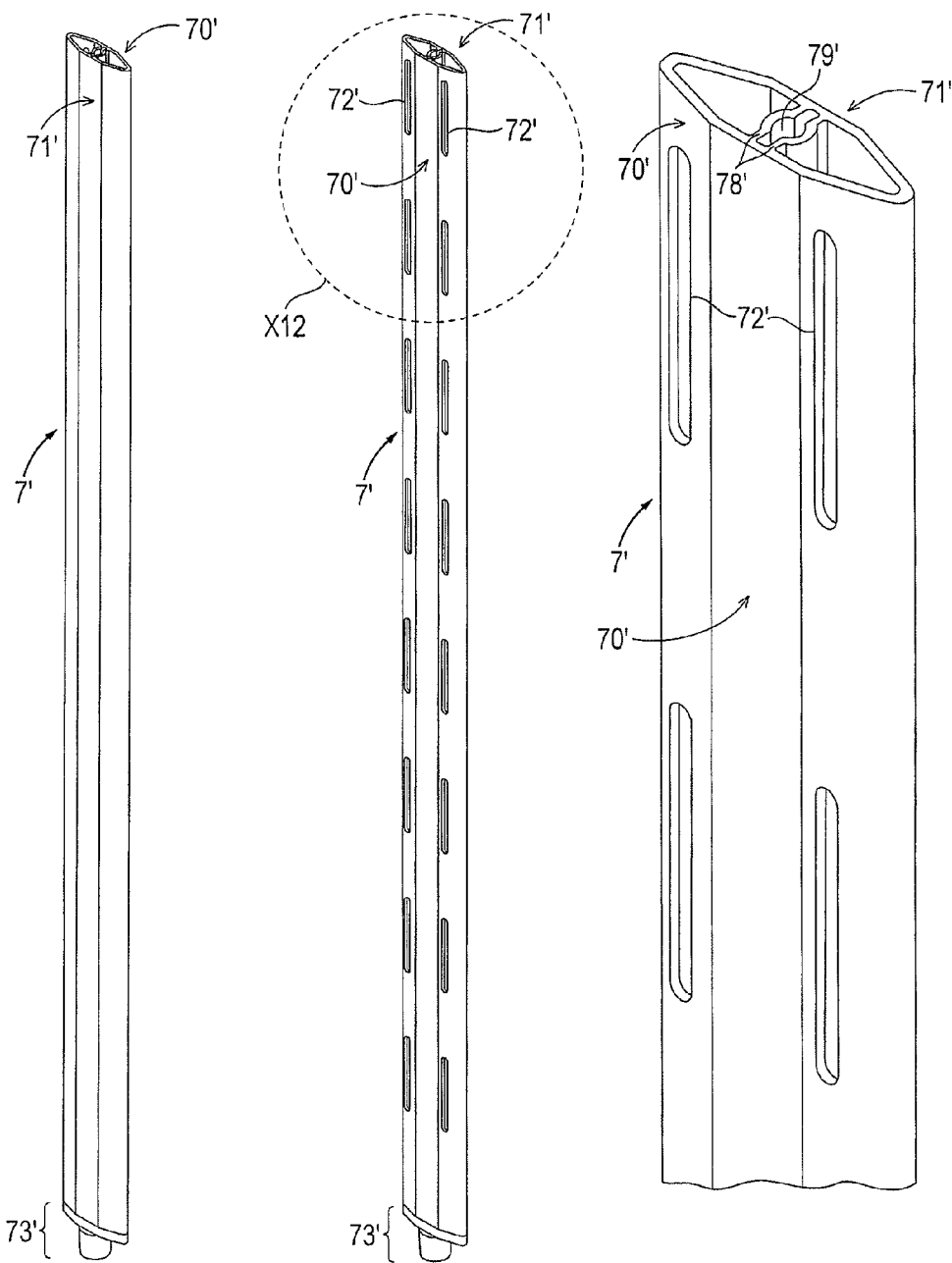
Figure 21H:
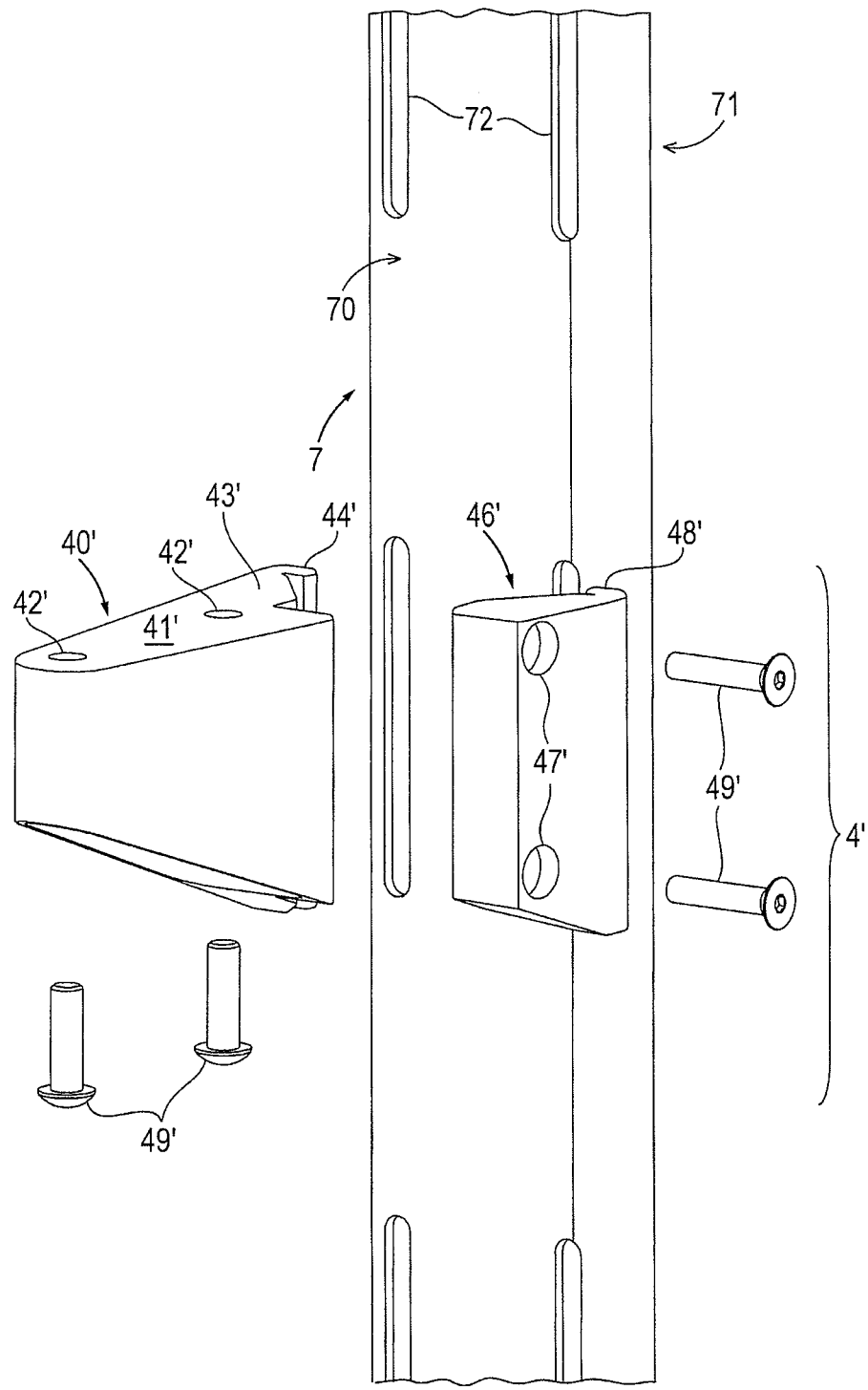
Figure 21J:
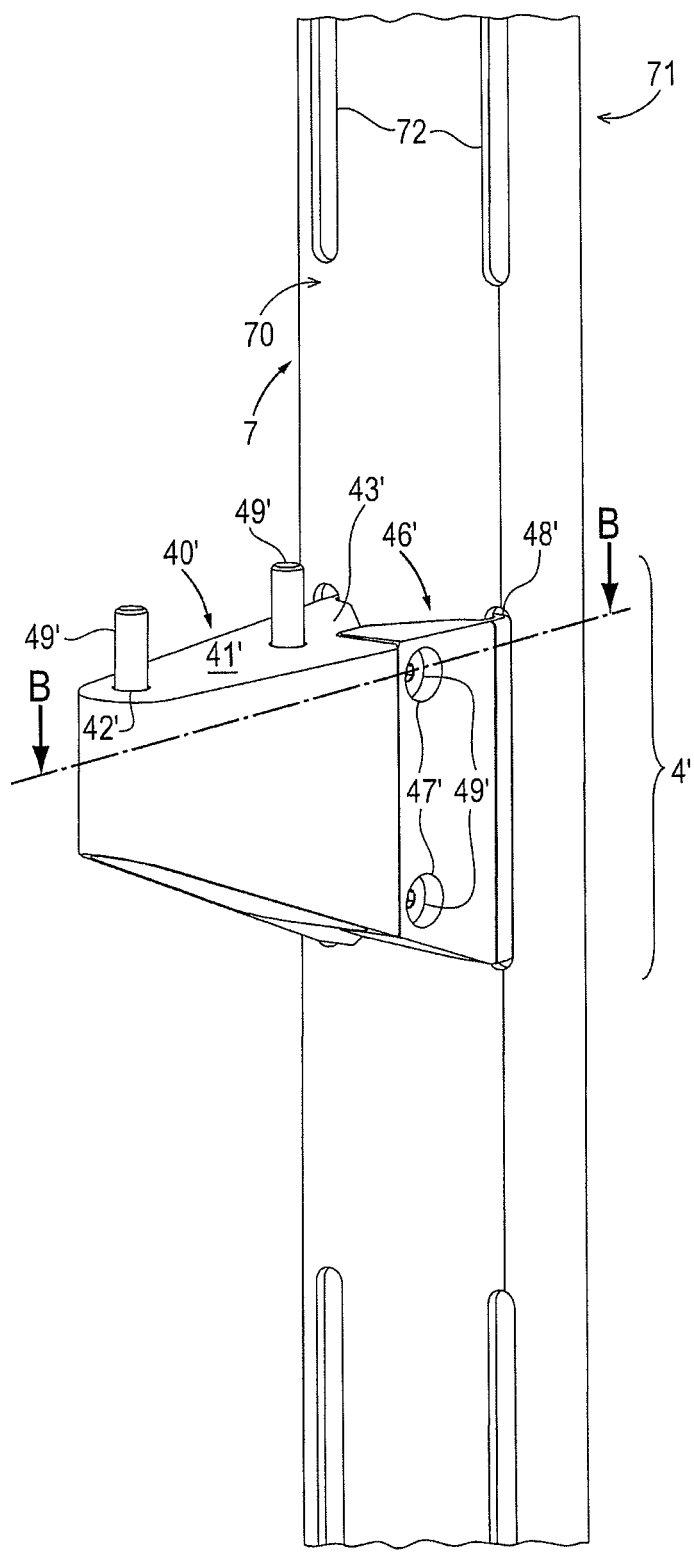
Figure 21K:
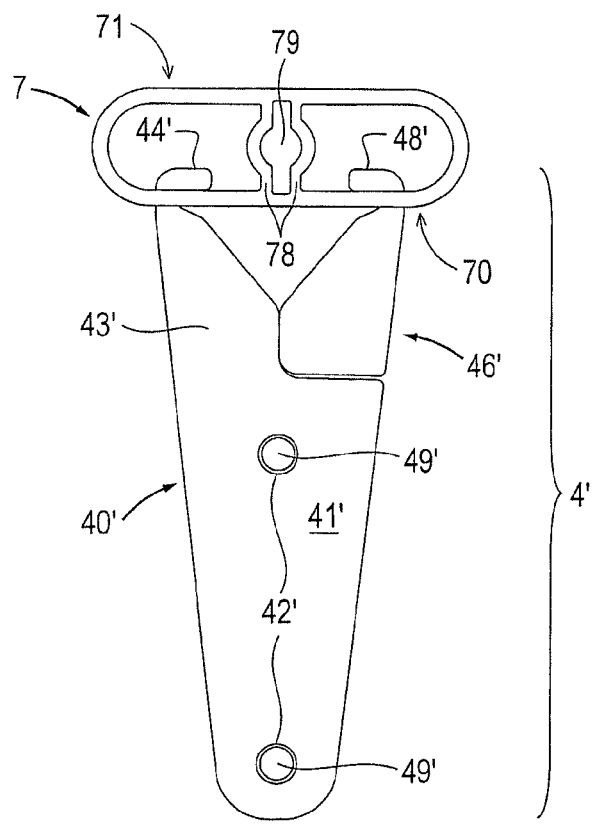
Figure 21L:
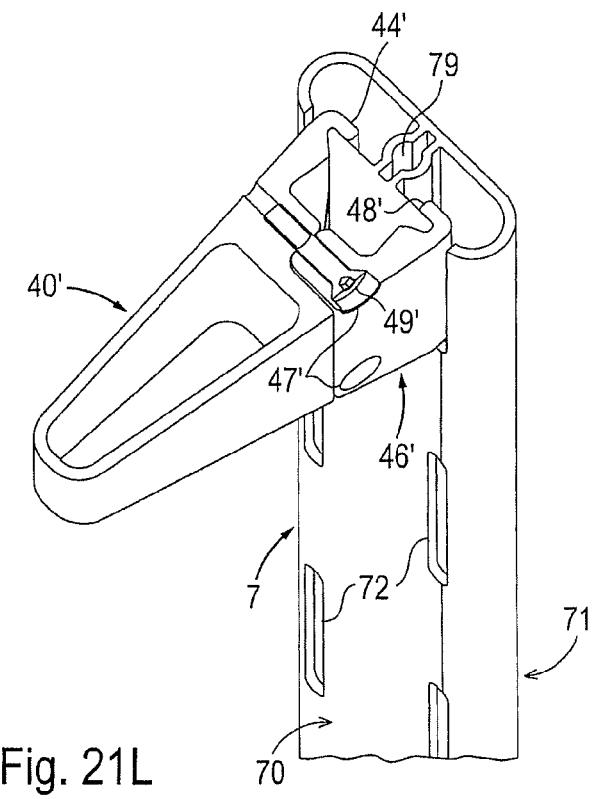
Figure 22A:
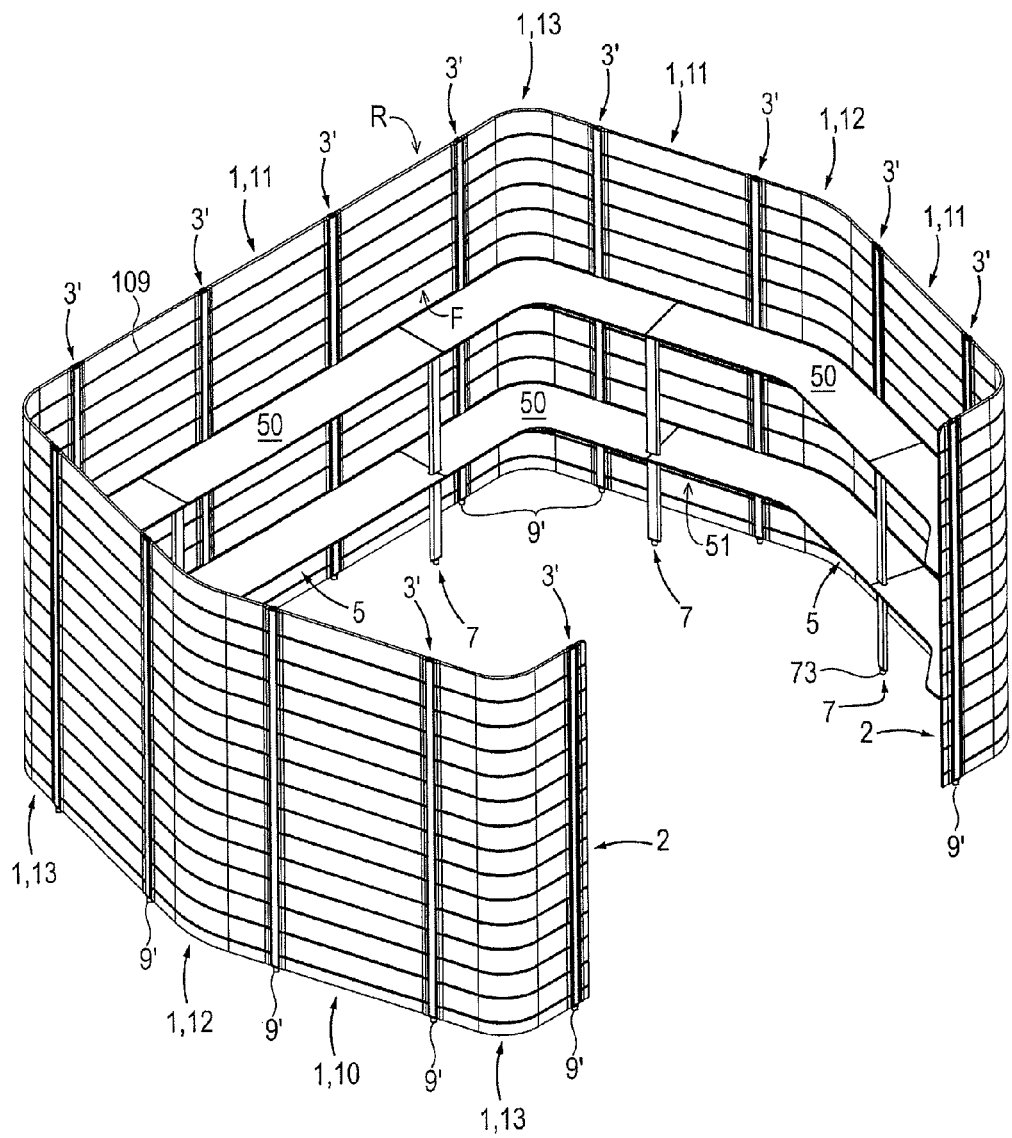
Figure 22B:
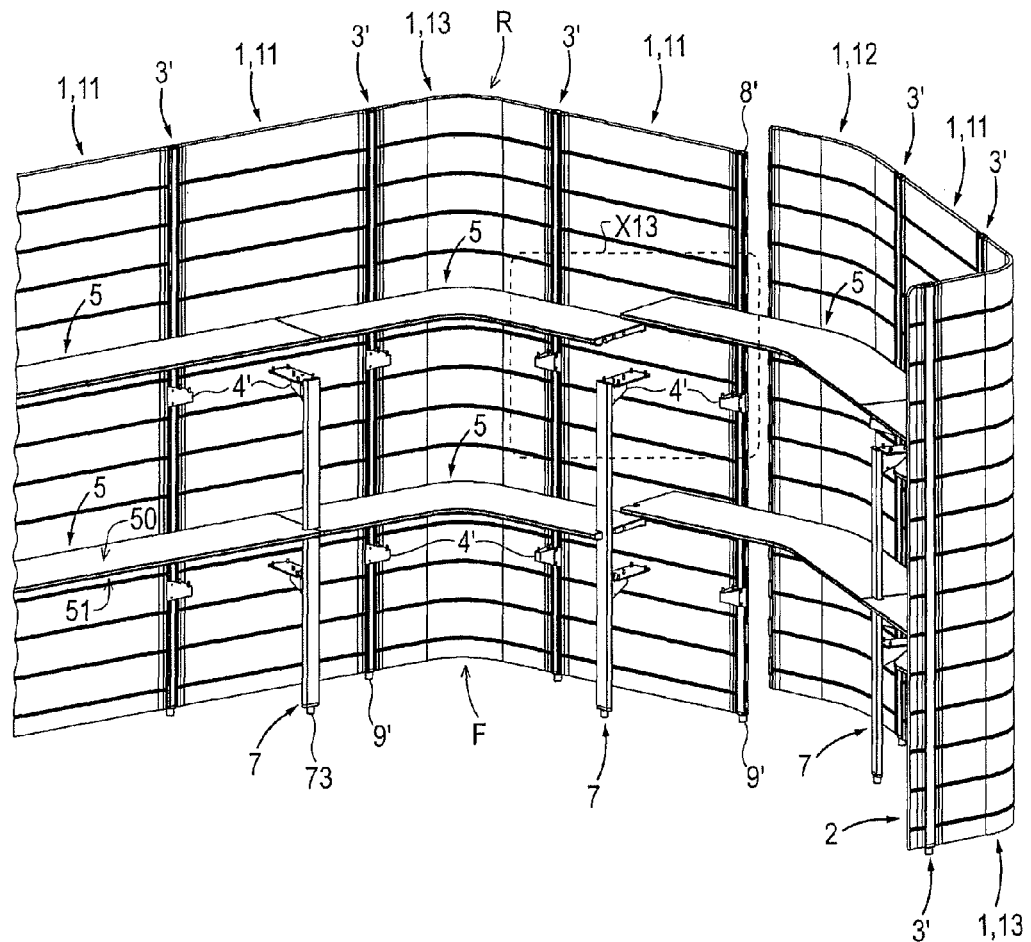
Figure 22C:
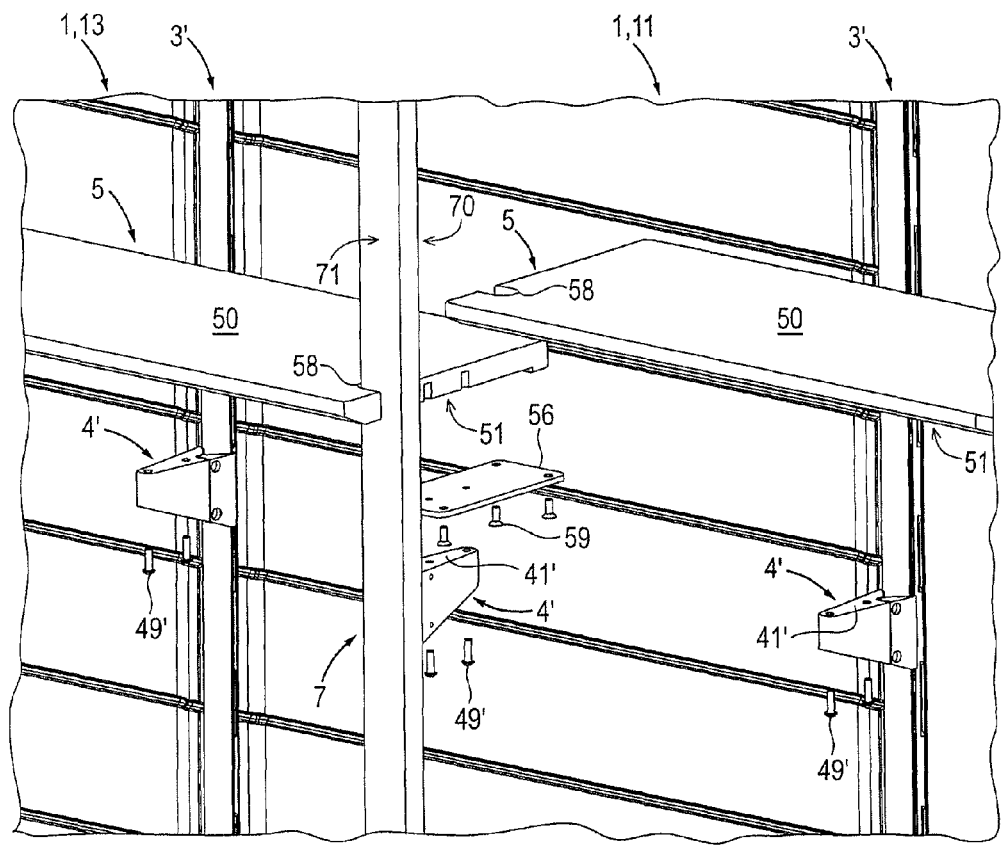
Figure 23A:
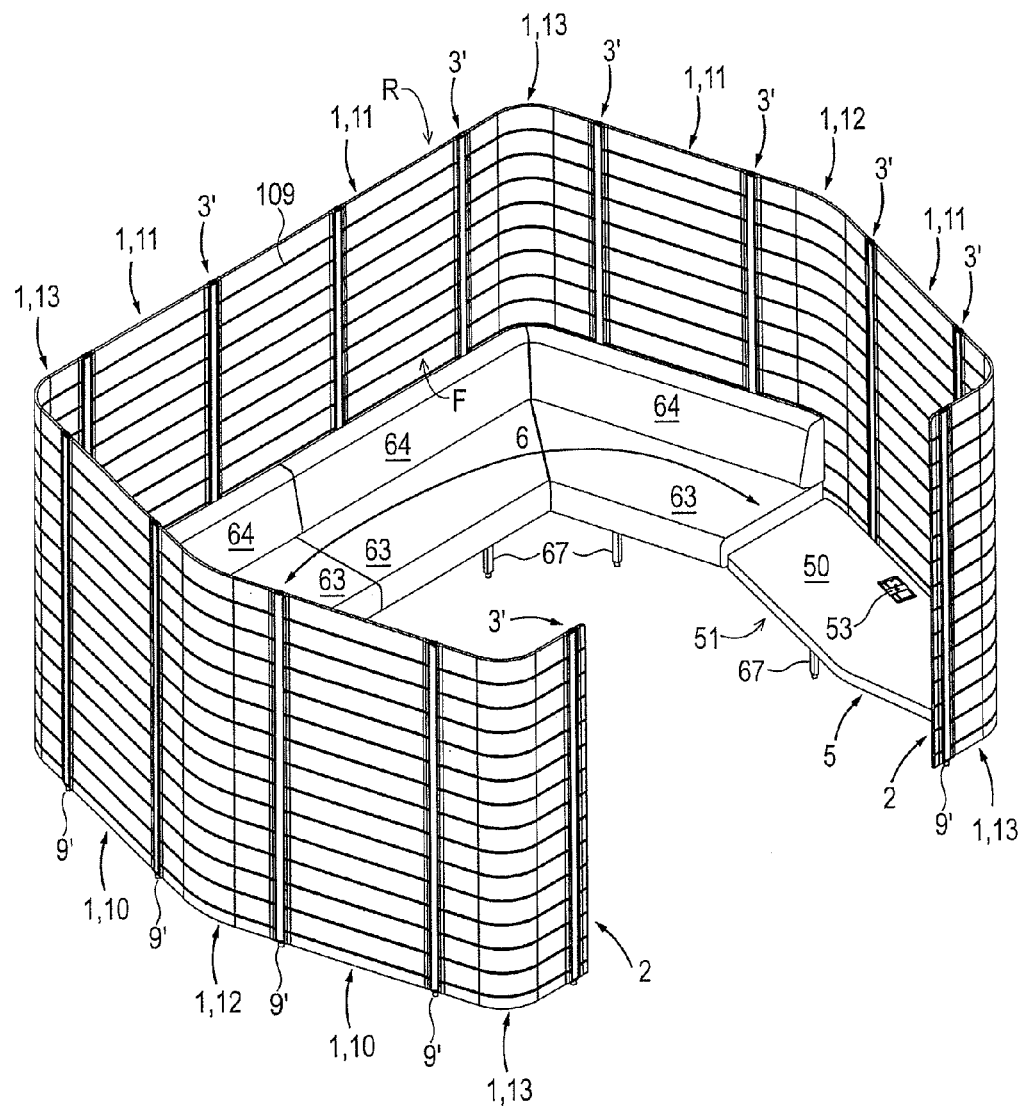
Figure 23B:
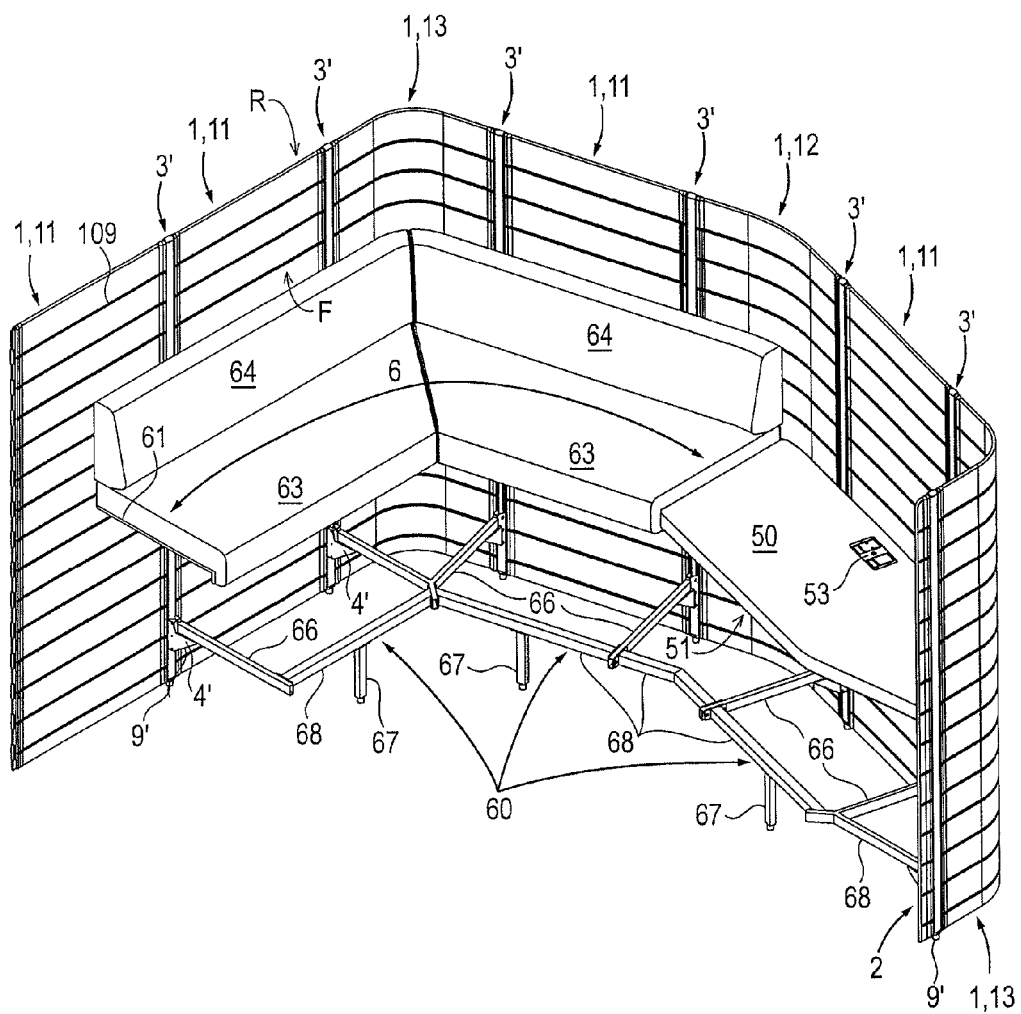
Figure 24:
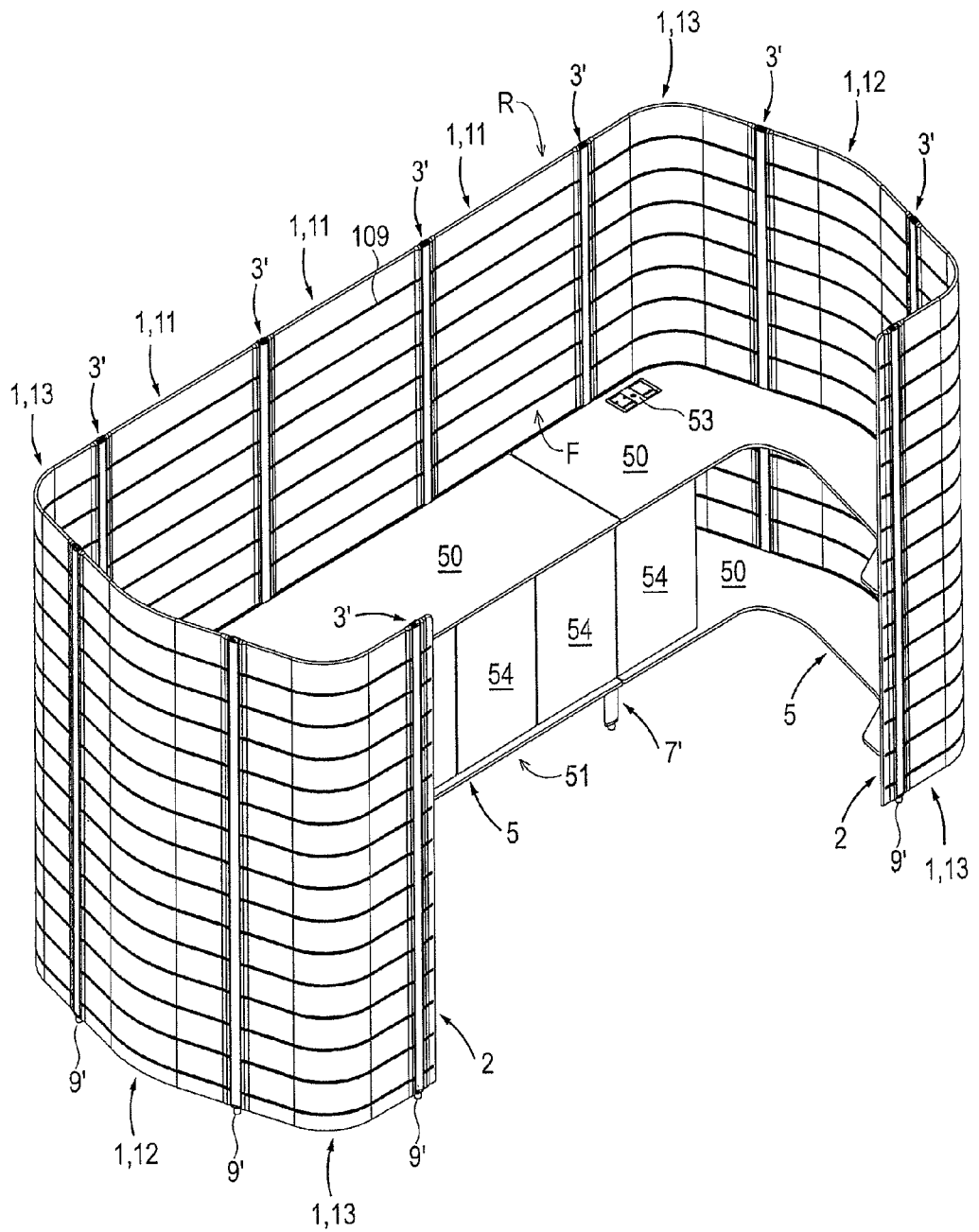
Figure 25:
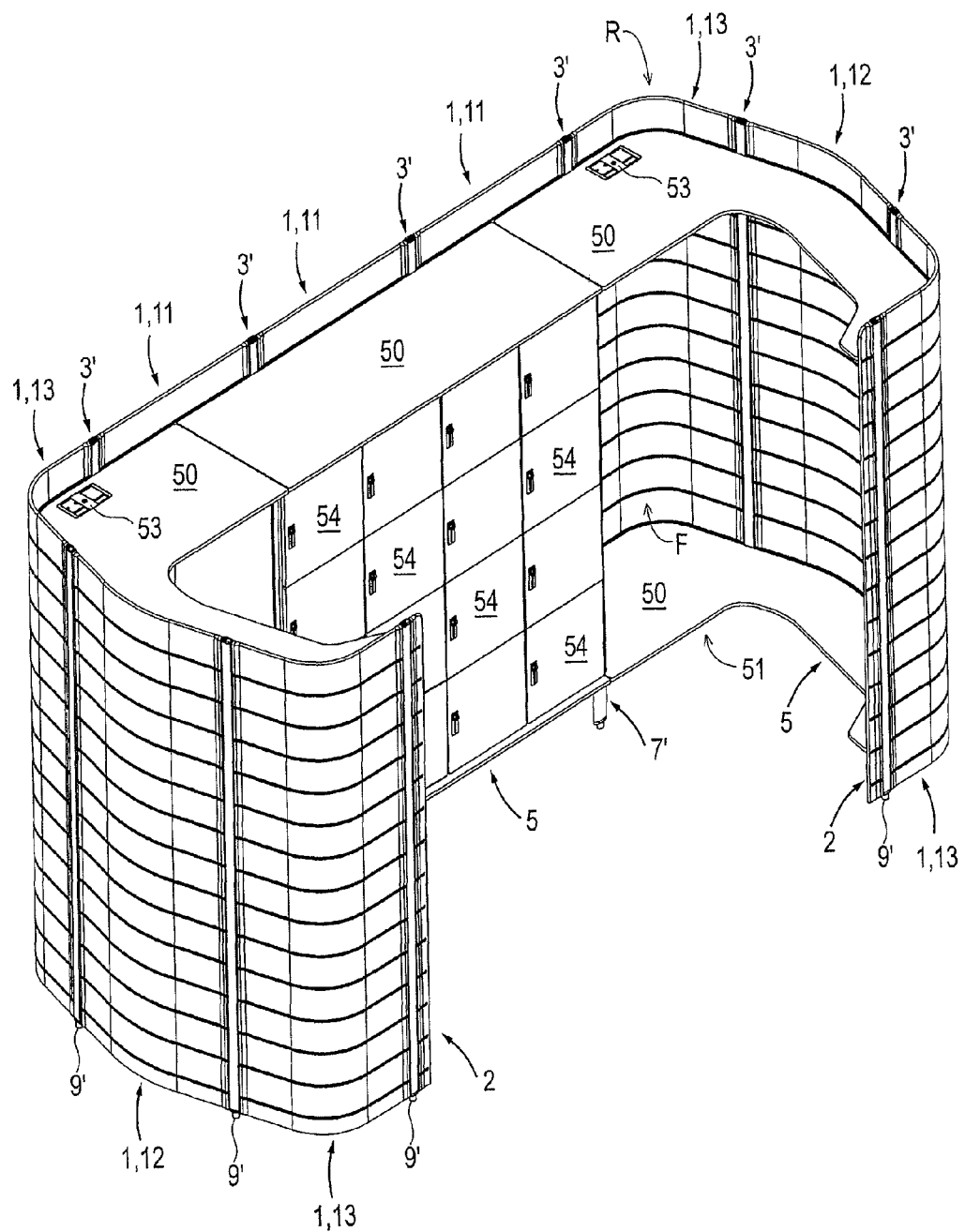

In the drawings:
FIG. 1A—shows a perspective view of a first wall element;
FIG. 1B—shows the enlarged detail X1 from FIG. 1A;
FIG. 10—shows an enlarged top view of the wall element according to FIG. 1A;
FIG. 1D—shows the enlarged detail X2 from FIG. 1C;
FIG. 2A—shows a perspective view of a second wall element;
FIG. 2B—shows the enlarged detail X3 from FIG. 2A;
FIG. 2C—shows an enlarged top view of the wall element according to FIG. 2A;
FIG. 3A—shows a perspective view of a third wall element;
FIG. 3B—shows the enlarged detail X4 from FIG. 3A;
FIG. 3C—shows an enlarged top view of the wall element according to FIG. 3A;
FIG. 4A—shows a perspective view of a fourth wall element;
FIG. 4B—shows a changed perspective of the enlarged detail X5 from FIG. 4A;
FIG. 4C—shows an enlarged top view of the fourth wall element according to FIG. 4A;
FIG. 4D—shows a top view of a partial element from FIG. 4A;
FIG. 4E—shows the enlarged detail X6 from FIG. 4D;
FIG. 5A—shows a perspective view of a side element;
FIG. 5B—shows a changed perspective of the enlarged detail X7 from FIG. 5A;
FIG. 5C—shows an enlarged top view of the side element according to FIG. 5A;
FIG. 6A—shows a perspective view of a connector of the first variant;
FIG. 6B—shows the enlarged detail X8 from FIG. 6A;
FIG. 6C—shows an enlarged top view of the connector according to FIG. 6A;
FIG. 6D—shows a perspective view of a connector of the second variant;
FIG. 6E—shows the enlarged detail X9 from FIG. 6D;
FIG. 6F—shows an enlarged top view of the connector according to FIG. 6D;
FIG. 7A—shows a perspective view of two third wall elements according to FIG. 3A, close to a connector according to FIG. 6A;
FIG. 7B—shows a changed perspective of the enlarged detail X10 from FIG. 7A;
FIG. 7C—shows an enlarged top view of the construction according to FIG. 7A;
FIG. 8A—shows a perspective sectional view of two first wall elements according to FIG. 1A, docked on the connector according to FIG. 6A;
FIG. 8B—shows an enlarged top view of the construction according to FIG. 8A;
FIG. 8C—shows an enlarged top view of the completed construction according to FIG. 8A;
FIG. 9A—shows a perspective partial exploded view, in the form of an excerpt, of a first wall element according to FIG. 1A, docked on the connector of the first variant according to FIG. 6A, with a covering assembly of the first variant close to the connector;
FIG. 9B—shows a changed perspective view of the construction according to FIG. 9A with wall elements docked on the connector on both sides and with the covering assembly mounted;
FIG. 9C—shows a perspective view of the construction according to FIG. 9A, with the covering assembly mounted;
FIG. 9D—shows a changed perspective view of the construction according to FIG. 9A, with the side element according to FIG. 5A close to the connector;
FIG. 9E—shows a perspective view of the construction according to FIG. 9D, with the side element docked on the connector and the covering assembly mounted;
FIG. 9F—shows a perspective partial exploded view, in the form of an excerpt, of a first wall element according to FIG. 1A, docked on the connector of the second variant according to FIG. 6D, with the covering assembly of the second variant close to the connector;
FIG. 9G—shows a perspective view of the construction according to FIG. 9F, with the covering assembly mounted;
FIG. 10A—shows a perspective partial exploded view, in the form of an excerpt, of a first wall element according to FIG. 1A, docked on the connector according to FIG. 6A, with a leg assembly of the first variant close to the connector;
FIG. 10B—shows a perspective view of the construction according to FIG. 10A, with the leg assembly mounted;
FIG. 10C—shows a perspective partial exploded view, in the form of an excerpt, of a first wall element according to FIG. 1A, docked on the connector according to FIG. 6D, with the leg assembly of the second variant close to the connector;
FIG. 10D—shows a perspective view of the construction according to FIG. 10C, with the leg assembly mounted;
FIG. 11A—shows a perspective exploded view of an adapter of the first variant in the form of a table top holder;
FIG. 11B—shows a changed perspective view of the adapter according to FIG. 11A, in assembled form;
FIG. 11C—shows a perspective exploded view of an adapter of the second variant in the form of a table top holder;
FIG. 11D—shows a changed perspective view of the adapter according to FIG. 11C, in assembled form;
FIGS. 12A to 12J show: schematic illustrations of the course of the assembly of the adapters of the first and second variant according to FIGS. 11A and 11C for holding a supporting surface on a construction with two first wall elements according to FIG. 1A docked on the connector of the first and second variant according to FIGS. 6A and 6D;

FIG. 12A—shows a top view of the base part and the counterpart of the adapter of the first variant according to FIG. 11A, separately close to the connector of the first variant according to FIG. 6A;

FIG. 12B—shows a perspective view of the construction according to FIG. 12A;

FIG. 12C—shows a perspective view of the construction with first wall elements docked on the connector of the first variant according to FIG. 6A on both sides, and with the base part fitted into the connector, and counterpart and supporting surface close thereto;

FIG. 12D—shows a top view of the base part and the counter part of the adapter of the second variant according to FIG. 11C, separately close to the connector of the second variant according to FIG. 6D;

FIG. 12E—shows a perspective view of the construction according to FIG. 12D;

FIG. 12F—shows a side view of the construction according to FIG. 12B, with the adapter mounted on the connector;

FIG. 12G—shows a perspective view of the construction according to FIG. 12C with the adapter mounted on the connector, without the supporting surface;

FIG. 12H—shows a top view of the construction according to FIG. 12G, in horizontal section on the line A-A;

FIG. 12J—shows a perspective view of the construction according to FIG. 12G, in horizontal section on the line A-A;

FIG. 13A—shows a perspective exploded view of an adapter of the third variant in the form of a shelf board holder;

FIG. 13B—shows a top view of the adapter according to FIG. 13A, in assembled form;

FIG. 13C—shows a perspective exploded view of an adapter of the fourth variant in the form of a shelf board holder;

FIG. 13D—shows a top view of the adapter according to FIG. 13C, in assembled form;

FIG. 14A—shows a perspective exploded view of an adapter of the fifth variant in the form of a seat holder;

FIG. 14B—shows a perspective view of the adapter according to FIG. 14A, in assembled form;

FIG. 14C—shows a changed perspective view of the adapter according to FIG. 14B;

FIG. 14D—shows a perspective exploded view of an adapter of the sixth variant in the form of a seat holder;

FIG. 14E—shows a perspective view of the adapter according to FIG. 14D, in assembled form;

FIG. 14F—shows a changed perspective view of the adapter according to FIG. 14E;

FIG. 15A—shows a perspective exploded view of the components for the construction of a booth of the first variant;

FIG. 15B—shows a perspective view of an erected booth of the second variant for sitting use;

FIG. 15C—shows a perspective view of the supporting surface with adapters mounted symbolically therebelow and the container from FIG. 15B close thereto;

FIG. 15D—shows a perspective view of the booth according to FIG. 15B, modified to form a booth of the third variant, for standing use;

FIG. 16A—shows a perspective exploded view of a seat with associated adapters of the fifth variant;

FIG. 16B—shows a perspective view of the construction according to FIG. 16A, as a mounted seat, with adapters mounted symbolically therebelow;

FIG. 16C—shows a changed perspective view of the construction according to FIG. 16B;

FIG. 17A—shows a perspective exploded view of the components for constructing a booth of the fourth variant;

FIG. 17B—shows a perspective view of the booth of the fourth variant erected from the components according to FIG. 17A;

FIG. 18A—shows a top view of an erected booth of the fifth variant;

FIG. 18B—shows a perspective view of the booth according to FIG. 18A, with the supporting surface installed;

FIG. 19A—shows a top view of an erected booth of the sixth variant;

FIG. 19B—shows a perspective view of the booth according to FIG. 19A, with the supporting surface installed;

FIG. 20A—shows a top view of a complex construction of a plurality of adjacent, differently configured booths;

FIG. 20B—shows a perspective view of the construction according to FIG. 20A with the supporting surfaces installed;

FIG. 21A—shows a perspective view from the rear side of a support of the first variant, with a floor assembly of the first variant;

FIG. 21B—shows the enlarged detail X11 from FIG. 21A;

FIG. 21C—shows a perspective view from the front side of the construction according to FIG. 21A;

FIG. 21D shows a perspective exploded view, in the form of an excerpt, of the construction according to FIG. 21A, with the floor assembly close to the lower end of the support;

FIG. 21E—shows a perspective view from the rear side of a support of the second variant, with a floor assembly of the second variant;

FIG. 21F—shows the enlarged detail X12 from FIG. 21D;

FIG. 21G—shows a perspective view from the front side of the construction according to FIG. 21E;

FIG. 21H—shows a perspective exploded view, in the form of an excerpt, of the support according to FIG. 21A, with components of the adapter of the fourth variant close thereto;

FIG. 21J—shows a perspective view of the construction according to FIG. 21H with the engagement of the adapter mounted on the support;

FIG. 21K—shows a top view of the construction according to FIG. 21J;

FIG. 21L—shows a perspective view of the construction according to FIG. 21J, in horizontal section on the line B-B;

FIG. 22A—shows a perspective view of an erected booth of the seventh variant;

FIG. 22B—shows a perspective partial exploded view of an excerpt from the booth according to FIG. 22A;

FIG. 22C—shows the enlarged detail X13 from FIG. 22B;

FIG. 23A—shows a perspective view of an erected booth of the eighth variant;

FIG. 23B—shows a perspective partial exploded view of an excerpt from the booth according to FIG. 23A;

FIG. 24—shows a perspective view of an erected booth of the ninth variant, useable as a kitchen; and FIG. 25—shows a perspective view of an erected booth of the tenth variant, useable as a wardrobe.

EXEMPLARY EMBODIMENT

The detailed description of an exemplary embodiment of the construction kit according to the invention with the various types of wall elements and the connectors to be arranged therebetween for erecting room dividers of diverse designs and fittings will be given below with reference to the attached drawings. The additional components used for the various fittings will also be described.

The following statement applies to the entirety of the rest of the description. If, in order to avoid ambiguity in the drawings, a figure contains designations which are not explained in the directly associated description of the text, reference is made to the point at which they are mentioned in the previous descriptions of the figures. For reasons of clarity, components are generally not designated again in subsequent figures, provided that it is clearly identifiable from the drawings that they are "recurring" components.

FIGS. 1A to 1D

The wall element 1 in the form thereof as a first element 11 has a rectangular, basically flat surface with a front side F and a rear side R opposite the latter. There is a connecting flank 100 on each outer, vertically running longitudinal side. The inner wall 108 extends between the two connecting flanks 100. The two connecting flanks 100 are made identically, and therefore only one connecting flank 100 is described below. Starting from the inner wall 108, the connecting flank 100 first of all widens to approximately half of the length thereof on the front side F and the rear side R with a bead 107. Adjacent to the bead 107, the connecting flank 100 then tapers again on the front side F and the rear side R toward a lip 106 which terminates at a free end and forms the outer edge along the longitudinal side of the first element 11.

From the lip 106, rectangular, elongate contours 105 which are spaced apart from one another systematically in the grid on the front side F and the rear side R rise over the entire longitudinal side. Respective intermediate spaces 104 remain between the contours 105 on the front side F and the rear side R, wherein the individual contours 105 have the grid spacing of, for example, 130 mm with respect to one another. The upper edge 103 runs in the horizontal direction along the inner wall 108 and over the connecting flanks 100 and is a solidified pinch edge which is produced by molding and does not require any additional finishing. On the outer edge, there is a stepped clearance 102 on the upper edge 103 in the region of the lip 106. A plurality of reinforcing means 109 spaced apart parallel to one another run in the horizontal direction in the region of the inner wall 108 into the connecting flanks 100 and end virtually at the lips 106. In the present example, the reinforcing means 109 are zones which are more greatly compressed and appear as grooves.

The first wall element 11 and the wall elements 1 described later, such as the second element 12, the third element 13 (see FIGS. 2A to 3C) and the side element 2 (see FIGS. 5A to 5C) are of virtually identical construction and differ only in the shape or dimension thereof. The production operation of the wall elements 1 and the side element 2 is therefore only described once. Only the fourth element 14 (see FIGS. 4A to 4D) differs somewhat in production and is therefore explained separately later.

The starting material used is a needle-punched polyester nonwoven fabric of a thickness of, for example, 15 mm, with a density of, for example, 1.5 kg/m² with the corresponding elongate and lateral dimensions which are made to be somewhat larger than the dimensions of the finished product, such as, for example, the first wall element 11, which is for example, of a length of 1900 mm and a width of 780 mm. The polyester nonwoven fabric consists of 70% of high-melting polyfibers and 30% of bico fibers or adhesive fibers. For the pressing operation, in each case one side of the polyester nonwoven fabric is placed into the corresponding mold half while the other side of the polyester nonwoven fabric lies in the other mold half. An adhesive film is inserted between the two sides of the polyester nonwoven fabric that are still spaced apart from each other. During the pressing operation, the two mold halves move together in a complementary manner under increased temperature (approx. 190° C.) such that the two sides of the polyester nonwoven fabric are compressed by means of pressure to a thickness of, for example, 12 mm in the region of the inner wall 108 and are, as it were, connected to each other because of the adhesive film. During the pressing operation, the upper edge 103—here made, for example, in the form of a semicircle—is formed in completed form by means of the two mold halves and using the pinch technology. The polyester nonwoven fabric is additionally compressed in the process along the upper edge 103, as a result of which the stability is increased and the user friendliness is improved. Since, in the constructions shown later, the upper edge 103 is visible as a single edge, the elegant termination emphasizes the optical effect and, in addition, imparts an impression of overall high quality.

The remaining sections present on the first wall element 11, such as the contours 105, the lips 106, the beads 107 and the reinforcing means 109, are made by regions complementary thereto in the respective mold half during the pressing operation. The reinforcing means 109 and the lips 106 are compressed here to the greatest extent since the material thickness of the polyester nonwoven fabric is smallest here, while the beads 107 are compressed to the least extent since the material thickness is the greatest here. After the pressing operation, the two mold halves move apart again and the excess length of the material of the compressed polyester nonwoven fabric is removed at the two longitudinal edges thereof and at the lower edge thereof—the latter is opposite the upper edge 103—, for example by means of water jet cutting, and therefore the first wall element 11 obtains the desired dimensions of, for example, a length of 1900 mm and a width of 780 mm. The clearance 102 on the upper edge 103 is preferably realized by a milling or cutting tool.

FIGS. 2A to 2C

The second wall element 12 in turn has a rectangular area, but which is curved at an angle of, for example, 150°. The concave side is defined as the front side F, the convex side, by contrast, as the rear side R. The remaining regions, such as the connecting flanks 100, the upper edge 103, the inner wall 108 and the reinforcing means 109, are unchanged in the design and function thereof from FIGS. 1A to 1D. The height of the second element 12 is, for example, likewise of a system size of 1900 mm.

FIGS. 3A to 3C

The third wall element 13 likewise has a rectangular area which is curved to an even greater extent and therefore encloses, for example, a smaller angle of 105°. The front side F here is again the concave side, and the convex rear side R is located opposite thereto. The further regions, such as the connecting flanks 100, the upper edge 103, the inner wall 108 and the reinforcing means 109, also remain unchanged here in the design and function thereof with respect to the previous wall elements 11, 12. Within a defined system size, the third element 13 has the unit height of 1900 mm.

FIGS. 4A to 4E

The fourth wall element 14 is a star-shaped combination of a total of three partial elements 18. The individual partial elements 18 are rectangular plane elements, wherein one of the latter has an angle of 150° and the two remaining ones each have an angle of 105°, and therefore, in total, an angle of 360° results. The concave sides form the front sides F, and the convex rear sides R are opposite thereto. The partial element 18 with the angle of 150° is exactly half of the second element 12 in FIGS. 2A to 2C, wherein the sectional profile in the vertical direction extends centrally along the upper edge 103. The two remaining partial elements 18 with the angles of 105° are exactly the respective halves of the third element 13 according to FIGS. 3A to 3C, wherein the sectional profile also lies here in the vertical direction along the upper edge 103.

Only one partial element 18 with the angle of 105° is described below since the other partial element 18 is identical in construction and differs merely with the angle of 150° with respect thereto. A partial flank 180 is present in each case along the longitudinal sides running in the vertical direction. The partial wall 188 extends between the two opposite, spaced-apart partial flanks 180. Since the two partial flanks 180 are made in identical form, only the description of one thereof is required. Starting from the inner wall 108, the partial flank 180 first of all widens to approximately half of the length thereof on the front side F with a partial bead 187. Adjacent to the partial bead 187, the partial flank 180 then tapers in turn on the front side F toward a partial lip 186 which ends at a free end and forms the outer edge along the longitudinal side of the partial element 18. From the partial lip 186, the partial contours 185, which are formed identically, but only on one side with respect to the contours 105, rise over the entire longitudinal side on the front side F. An intermediate space 104 remains in each case between the partial contours 185 on the front side F. The partial edge 183 runs in the horizontal direction along the partial inner wall 188 and over the partial flanks 180 and is, in turn, a solidified pinch edge which is produced by molding and likewise does not require any additional finishing.

The starting material for the fourth wall element 14 is unchanged. During the pressing operation, the corresponding side of the polyester nonwoven fabric is placed into the respective mold half, wherein the other mold half is made as a flat surface in order to produce a basically smooth rear side R. During the pressing operation, the two mold halves move together at an increased temperature of approx. 190° C. such that the polyester nonwoven fabric is compressed by means of pressure to a thickness of 6 mm in the region of the partial inner wall 188. During the pressing operation, the partial edge 183—made here, for example, in the form of a quarter circle—is formed in completed form by means of the two mold halves and the pinch technology and the polyester nonwoven fabric is additionally compressed along the partial edge 183. The remaining sections present on the fourth wall element 14, such as the partial contours 185, the partial lips 186, the partial beads 187 and the reinforcing means 109, are made by the complementary regions in the mold half during the pressing operation. The reinforcing means 109 and the partial lips 186 are compressed here to the greatest extent since the material thickness of the polyester nonwoven fabric is the smallest here, whereas the partial beads 187 are compressed to the least extent since the material thickness is the greatest here. After the pressing operation, the two mold halves move apart again, and the excess length of material of the compressed polyester nonwoven fabric is removed at the two longitudinal edges thereof and at the lower edge thereof opposite the partial edge 183, for example by means of water jet cutting, such that the partial element 18 obtains the desired dimensions of, for example, a length of 1900 mm.

After the pressing operation, the three individual partial elements 18 are joined together, wherein the rear side R of the partial element 18 of 150° lies on the two rear sides R of the partial elements 18 each having 105°, and the two rear sides R of the partial elements each having 105° lie against each other and, at the respectively touching points, form the inner wall 108. The connection of the individual partial elements 18 can be produced with an adhesive film. By joining the partial elements 18 together, the three connecting flanks 100 are also produced in the direction of the free ends of said partial elements 18, and adjacent to the inner wall 108. The central region of the joined-together fourth element 14 is made in the form of a center 141, wherein, in the center 141, the respective rear sides R of the partial elements 18 are opposite each other at a distance from each other and form a cavity therebetween. The partial edges 183 made, for example, in the form of a quarter circle in the center 141 complement each other at the transition to the inner walls 108 to form semicircular upper edges 103. The cavity formed by the center 141 can be closed by means of a covering (not shown here) which is complementary with respect to the center 141. As a result, only the upper edges 103 are visible as single edges on the constructions realized later, and the elegant termination emphasizes the optical effect. The corresponding connecting flank 100 sits along the corresponding longitudinal sides which each run in the vertical direction. A clearance 102 in the form of a step is present on the outer edge in the region of the lip 106 on the upper edge 103. The remaining regions, such as the contours 105, the intermediate spaces 104 and the reinforcing means 109 are unchanged in the design and function thereof from the preceding figures. The height of the fourth element 14 would be dimensioned at 1900 mm within the exemplary size system.

FIGS. 5A to 5C

Like the wall elements 1, the side element 2 has a rectangular, basically flat area with a front side F and rear side R. A connecting flank 20 is present along one of the longitudinal sides running in the vertical direction and continues to the opposite longitudinal side with a wing 21. Starting from the wing 21, the connecting flank 20 first of all widens to approximately half of the length thereof on the front side F and the rear side R with a bead 27. Adjacent to the bead 27, the connecting flank 20 then tapers in turn on the front side F and the rear side R toward a lip 26 which ends at a free end and forms the outer edge along the longitudinal side of the side element 2. From the lip 26, a plurality of spaced-apart, rectangular, elongate contours 25 rise over the entire longitudinal side on the front side F and the rear side R. An intermediate space 24 remains in each case between the contours 25 on the front side F and the rear side R. The upper edge 23 runs in the horizontal direction along the connecting flank 20 and the wing 21 and is a solidified pinch edge which is produced by molding and does not require any additional finishing. Along the longitudinal side of the side element 2, which longitudinal side is opposite the lip 26, the pinch edge continues in a vertical profile direction as far as the lower end of the side element 2. The transition between the upper edge 23 and this longitudinal side of the side element 2 is rounded. A step-shaped clearance 22 is present on the upper edge 103 and the outer edge in the region of the lip 26. A plurality of reinforcing means 29 which are spaced apart parallel from one another and are of the type already described extend in the horizontal direction in the region of the connecting flank 20 and end virtually at the lip 26.

FIGS. 6A to 6C

The connector 3 of the first variant is in the shape of an H profile and has the two limbs 31 with the plane-shaped outer surfaces thereof. The central web 32 extends between the limbs 31, wherein the limbs 31 each surround a connection 30 on both sides. The connections 30 are made in an identical manner, and therefore only one connection 30 is described below. A connection 30 essentially consists of a groove 36 which extends over the entire length of the connector 3, is open toward the narrow side and is bounded laterally by the two struts which are adjacent to each other. At the free end of each strut, a projection which is directed toward the mouth of the groove 36 is provided in sections on the interior wall. The projections in pairs form the mating contours 35 which therefore constrict the groove 36 from both sides. An intermediate space 34 remains between the individual mating contours 35. The connector 3 is passed through centrally in the longitudinal direction by a screw channel 39 which lies within the central web 32 and, at both of the open ends, has a thread which would be useable for fastening the covering assembly 8 described later (see FIGS. 9A to 9E) or the leg assembly 9 (see FIGS. 10A and 10B).

FIGS. 6D to 6F

On the connector 3' of the second variant, all of the equivalent contours which are located on the connector 3 of the first variant are provided with identical reference numbers, but with the addition of a prime [']. To this extent, a repeating description is not required. The sole design difference at the connector 3' of the second variant consists in that the two limbs 31' do not have continuously plane-shaped outer surfaces, but rather the longitudinal edges thereof are rounded in pairs toward the respective connection 30'. The screw channel 39' is provided for the fastening of the covering assembly 8' of the second variant (see FIGS. 9F and 9G) or of the leg assembly 9' of the second variant (see FIGS. 10C and 10D).

FIGS. 7A to 7C

Two third elements 13, with the respective connecting flanks 100 thereof, are initially close to the connector 3 of the first variant. The corresponding lip 106 points here in the direction of alignment with the groove 36. The connector 3 is already docked on the longitudinal side, located on the outside on the left, of the third element 13, and therefore the lip 106 is accommodated in the groove 36. In the position illustrated, the connector 3 located between the two third elements 13 would not be able to dock onto the connecting flanks 100 of the wall elements 13 which are close thereto. To this end, the intermediate spaces 34 have to be aligned with the contours 105.

FIGS. 8A to 8C

Two first elements 11 are docked on the respective connection 30 of the connector 3 of the first variant. The lips 106 and the contours 105 of the first elements 11 come to lie here in the grooves 36 of the connector 3, and the mating contours 35 of the connector 3 reach here virtually behind the contours 105 of the first elements 11. The beads 107 are located here in a line with the respective outer edges of the connector 3, wherein a small gap remains between connector 3 and the beads 107.

FIGS. 9A to 9E

The covering assembly 8 of the first variant is initially close to the connector 3 of the first variant, on which a first element 11 is docked on the facing connection 30 just on one side. The covering assembly 8 consists of the cap 80, the attachment part 83 and the screw 89. The connector 3 ends with the upper edge thereof flush with the clearance 102 present on the lip 106. The attachment part 83 can therefore be correctly positioned and screwed on the upper end of the connector 3. An upwardly directed displacement of the docked wall element 11 in the connector 3 is therefore prevented, which contributes to the lateral stability of the construction. The cap 80 which is placed on last only has a decorative function.

FIGS. 9F and 9G

On the covering assembly 8' of the second variant, all of the equivalent contours which are located on the covering assembly 8 of the first variant are provided with the same reference numbers, but with the addition of a prime [']. In this respect, a repeating description is not required. The single design difference at the covering assembly 8' of the second variant consists in the outer contour of the cap 80' being matched for the purpose of a harmonious transition to the curvature profile of the limbs 31' of the connector 3' of the second variant.

FIGS. 10A and 10B

The leg assembly 9 of the first variant comprises the floor element 90, which can be leveled in height on a bolt 99, and a cuboidal joining part 93 which is placed on the lower end of the connector 3 of the first variant. The bolt 99 is mounted in the screw channel 39 of the connector 3.

FIGS. 10C and 10D

On the leg assembly 9' of the second variant, all of the equivalent contours which are located on the leg assembly 9 of the first variant are provided with the same reference numbers, but with the addition of a prime [']. To this extent, a repeating description is not required. The single design difference at the leg assembly 9' of the second variant consists in that the outer contour of the joining part 93' is matched for the purpose of harmonious transition to the curvature profile of the limbs 31' of the connector 3' of the second variant.

FIGS. 11A, 11B and 12A to 12J

The adapter 4 of the first variant in the form of a table top holder consists of a base part 40 and the counterpart 46 which is screwable thereto. The base part 40 has the upper side 41 with the fastening holes 42 opening here, and the tongue 43 with the holes 42 and the first hook contour 44 located at the end. The counterpart 46 has holes 47 in order to introduce the screws 49 for the purpose of connection to the base part 40, and the second hook contour 48. Further screws 49 serve for fastening a supporting surface 5 by the lower side 51 thereof on the upper side 41 of the base part 40. In the assembled state, the two hook contours 44, 48 form a claw which is intended for grasping the connector 3 of the first variant with engagement of the hook contours 44, 48 in a selected intermediate space 34. The upper side 50 of the mounted supporting surface 5 is useable as a worktop or tray. The hook contours 44, 48 find space in the grooves 36 of the connector 3 at the inserted lips 106.

FIGS. 11C, 11D, 12D and 12E

On the adapter 4' of the second variant, all of the equivalent contours which are located on the adapter 4 of the first variant are provided with the same reference numbers, but with the addition of a prime [']. In this respect, a repeating description is not required. The single difference at the adapter 4' of the second variant for increasing the mechanical strength consists in that the tongue 43' on the base part 40' and the counterpart 46' are designed to be more solid. The assembly and engagement of the adapter 4' of the second variant on the connector 3' of the second variant are unchanged from the first variant of adapter 4 and connector 3.

FIGS. 13A and 13B

This adapter 4 of the third variant is designed as a shelf board holder with a narrowed upper side 41 and otherwise basically has the same features as the adapters 4, 4' according to the first and second variant and is mounted in an equivalent manner. The screw holes 42 in the base part 40 with the screws 49 serve for fastening a shelf board placed thereon.

FIGS. 13C and 13D

On the adapter 4' of the fourth variant, which is likewise designed as a shelf board holder, all of the equivalent contours which are located on the adapter 4 of the third variant are provided with the same reference numbers, but with the addition of a prime [']. A new description is therefore unnecessary. In order to increase the mechanical strength, the adapter 4' of the fourth variant has in turn on the base part 40' a tongue 43' which is designed to be more solid and a stronger counterpart 46'. Assembly and engagement of the adapter 4' of the fourth variant on the connectors 3, 3' and the fastening of a shelf board placed thereon are unchanged.

FIGS. 14A to 14C

This adapter 4 of the fifth variant is configured as a seat holder and first of all likewise comprises a base part 40 with the screw holes 42, the tongue 43 and the first hook contour 44. Studs 45 rise from the base part 40. The associated counterpart 46 has the screw holes 47 and the second hook contour 48. The screws 49 serve for the connection between base part 40 and counterpart 46 and for the purpose of mounting a seat.

FIGS. 14D to 14F

On the adapter 4' of the sixth variant, which is likewise designed as a seat holder, all of the equivalent contours which are located on the adapter 4 of the fifth variant are provided with the same reference numbers, but with the addition of a prime [']. A new description is therefore omitted. In order to increase the mechanical strength, the entire base part 40' and the counterpart 46' of the adapter 4' of the sixth variant are made to be more stable. Assembly and engagement of the adapter 4' of the sixth variant on the connectors 3, 3' and the fastening of a seat correspond to the adapter 4 of the fifth variant.

FIG. 15A

The components for the construction of a booth of the first variant first of all comprise two side elements 2 forming the outer termination, in each case two second wall elements 12 and third wall elements 13 and a first wall element 11. A connector 3 of the first variant is provided between each side element 2 and wall element 11-13. The adapters 4 of the first variant are already partially mounted or provided in order to install a supporting surface 5 which has a recess 52 for the insertion of a socket insert 53. In the assembled state, the supporting surface 5 rests fixed on the adapters 4.

FIGS. 15B to 15D

In the case of the erected booth of the second variant, the supporting surface 5 rests on the adapters 4 of the first variant that are fixed on the connectors 3 of the first variant, wherein a container 54 is fixed on the lower side 51 of the supporting surface by means of screws 59 (see FIGS. 15B, 15C). In the case of this booth construction of the third variant, the supporting surface 5 is arranged within the booth at a higher position in order to provide a work surface for a standing user (see FIG. 15D).

FIGS. 16A to 16C

This sequence of figures illustrates the construction and fastening of a seat bench 6 which comprises a plate-like seat support 61 and a cushion 63 to be positioned thereon and also a backrest 64. Brackets 62 engage in a fastened manner under the seat support 61 and are fixed on the other side on the rear side of the backrest 64. A T-shaped framework 60 serves as a support for the entire seat bench 6 and is provided on a plurality of adapters 4 of the fifth variant for assembly.

FIGS. 17A and 17B

In the case of the erected booth of the fourth variant, the installation of two seat benches 6 and a supporting surface 5 positioned therebetween is illustrated in the form of a table within a spacious booth. In this more complex construction, the supporting surface 5 is held by a support 55 mounted therebelow, and, in order to stabilize the two seat benches 6, a transverse strut 65 is provided in order to connect the seat benches 6 to each other.

FIGS. 18A and 18B

In the illustrated booth construction of the fifth variant, a supporting surface 5 is installed together with container 54 and socket insert 53, but without a seat.

FIGS. 19A and 19B

The newly expanded booth construction of the sixth variant likewise has a symmetrical outline and now comprises seven wall elements 1, namely a first element 11, two second elements 12 and four third elements 13, and also two side elements 2 which flank the access to the booth construction. A supporting surface 5 which extends along the inner circumference of the booth is mounted within the booth construction.

FIGS. 20A and 20B

In this complex construction, a plurality of mutually adjacent booths which are divided from one another by means of a multiplicity of interconnected fourth wall elements 14 are produced. The installation of the fourth wall elements 14 with the three connecting flanks 100 in each case shows the particularly variable possibilities of combination.

FIGS. 21A to 21D

The tubular support 7 of the first variant has a rear side 70 and a front side 71 which form the two longitudinal sides which are opposite each other in parallel. Between rear side 70 and front side 71, the support 7 has a rounded portion along each of the two narrow sides thereof and a central web 78 centrally. A double-row slot grid 72 is located on the rear side 70, and therefore the two slots of a pair are in each case located at the same height. A screw cannel 79 which runs through the support 7 and is usable for fastening the floor assembly 73 of the first variant is located in the central web 78. The floor assembly 73 comprises the floor element 76, which can be leveled in height on a bolt 75, and a cuboidal joining part 74 which is placed onto the lower end of the support 7. The threaded part of the bolt 75 is determined for engaging in the screw channel 79.

FIGS. 21E to 21G

On the support 7' of the second variant, all of the equivalent contours which are located on the support 7 of the first variant are provided with the same reference numbers, but with the addition of a prime [']. In this respect, a repeating description is not required. The single design difference at the support 7' of the second variant consists in that the rear and front sides 70', 71' do not have any continuously plane-shaped outer surfaces, but rather the longitudinal edges thereof are flattened in pairs toward the respective narrow side such that the narrow sides of the support 7' are basically of conical design. The screw channel 79' is provided for the fastening of a floor assembly 73' of the second variant, the joining part of which is matched to the cross section of the support 7'.

FIGS. 21H to 21L

The adapter 4' of the fourth variant in the form of a shelf board holder has already been described in the pair of FIGS. 13C and 13D, and therefore a new description is unnecessary. The two hook contours 44', 48' of the adapter 4' are determined for engaging in the two slots of a pair, selected for the desired height, of slot grids 72 and, in the mounted state, grip therein in the form of claws. The fastening of a supporting surface 5 placed onto the adapters 4' is unchanged (see FIGS. 15B to 15D). The adapter 4' can be mounted on the support 7' of the second variant in the same manner.

FIGS. 22A to 22C

This spacious booth construction of the seventh variant illustrates the installation of two levels lying one above another of a shelf unit arrangement consisting of a multiplicity of individual supporting surfaces 5, the upper sides 50 of which are usable as a worktop or tray, adapters 4' of the fourth variant, rests 56 and supports 7 of the first variant, with incorporation of the connectors 3' of the second variant that are mounted in the booth construction.

Rear adapters 4' are positioned on the connectors 3' in a manner corresponding to the planned height at which the shelf unit levels are intended to be located. Supports 7 are placed in each case between two connectors 3' of a wall element 1 and between the two connectors 3' of the next but one wall elements 1 in each case, with an offset into the interior of the booth construction, the length of which supports is determined according to the height of the uppermost shelf unit level. Front adapters 4' are mounted on the rear sides 70 of the supports 7 at an equivalent height to the rear adapters 4' positioned on the connectors 3'. Holding plates 56 are fastened on the front adapters 4' by means of screws 49'. The supporting surfaces 5 provided for lower shelf unit levels are provided on the narrow sides thereof with a recess 58 which opens outward and corresponds to half the cross section of a support 7. Rectilinear supporting surfaces 5 which are slightly angled and angled to a greater extent for the purpose of adaptation to the extent of the wall elements 1; 11-14 are provided. The lengths of the supporting surfaces 5 are cut to size in such a manner that said supporting surfaces extend over a wall element 1; 11-14 and in each case halfway over the two adjacent wall elements 1; 11-14.

The supporting surfaces 5 used rest on the front side with the lower sides 51 thereof on the holding plates 56 and on the rear side directly on the adapters 4' mounted on the connectors 3' and are fastened with the screws 59, 49'. Two adjacent supporting surfaces 5 come to lie with the abutting narrow sides thereof in each case halfway over a holding plate 56, and at the same time a half cross section of a support 7 is located in each case in the recesses 58 of the two supporting surfaces 5 while each supporting surface 5 sits on the rear side on the two associated rear adapters 4' which are suspended between the two front adapters 4'.

FIGS. 23A and 23B

A multi-part seat bench 6 is arranged within the booth of the eighth variant with the wall elements 1; 11-13, wherein a respective supporting surface 5 can be connected at the two ends of said seat bench. The seat bench 6 consists of a plurality of plate-like seat supports 61, cushions 63 resting thereon and backrests 64 and is mounted on a framework 60 on which the supporting surfaces 5 are also positioned. The framework 60 consists firstly of bridge struts 66 which are fixed on the adapters 4' of the sixth variant and are mounted on the connectors 3' of the second variant in a manner raised from the floor. The front ends of the bridge struts 66 are connected to individual longitudinal struts 68, and legs 67 support the longitudinal struts 68 against the floor. Seat bench 6 and supporting surfaces 5 are fastened on said framework 60, preferably with screws. Socket inserts 53 can be provided in the supporting surfaces 5.

FIG. 24

In each case a plurality of supporting surfaces 5 are installed in two horizontal levels located one above the other within the booth of the ninth variant, which is usable, for example, as a kitchen. The supporting surfaces 5 are held in turn on the rear side by adapters 4' of the fourth variant which are mounted on the connectors 3' and on the front side by means of supports 7' and holding plates 56 according to the principle of the sequence of FIGS. 22A to 22C. Socket inserts 53 for the operation of electrical appliances can be provided at suitable positions in the supporting surfaces 5. A plurality of cupboard units 54, for example, for accommodating kitchen utensils and supplies are installed between the two levels of supporting surfaces 5. The lower level of the supporting surfaces 5 can be used as a storage space while the upper level is available as a work surface.

FIG. 25

Within the booth of the tenth variant, which is useable, for example, as a wardrobe, again in each case a plurality of supporting surfaces 5 are installed in two horizontal levels located one above the other, namely again close to the floor and at a man's height distance therefrom. The supporting surfaces 5 are held according to the principle of the sequence of FIGS. 22A to 22C, namely on the rear side by adapters 4' of the fourth variant that are mounted on the connectors 3' and on the front side by means of supports 7' and holding plates 56. Socket inserts 53 for operating electrical appliances have been provided in the supporting surfaces 5.

A multiplicity of preferably closeable cupboard units 54, for example, for the secure accommodating of personal items, such as bags, are installed between the two levels of supporting surfaces 5. The lower level of the supporting surfaces 5 can be used as a storage space while, for example, wardrobe rails are arranged below the upper level.

The invention claimed is:

1. A construction kit comprising wall elements and connectors to be inserted therebetween in order to erect room dividers, wherein
   a) the wall elements are produced by compressing fiber material whereby the wall elements consist exclusively of compressed fiber material, which is a compressed polyester nonwoven fabric or a mixture of natural and synthetic fibers, and have at least one connecting flank including contours;
   b) the connectors are profiled rails on which there is at least one connection including mating contours;
   c) the contours on the wall elements can be brought into form-fitting engagement with the mating contours on the connectors;
   d) fixable adapters which serve for bearing supporting surfaces and/or seats are provided on the connectors; and
   e) supports which are placed in front of the wall elements from which the room divider can be erected, wherein the individual support has:
      1) a profiled tube section with a rear side and a front side that are connected to each other by a central web;
      2) a double-row slot grid on the rear side, wherein in each case two slots of a pair are located at the same height;
      3) in the central web a screw channel which runs through the support, and can be used for fastening a floor assembly; and wherein
      4) a floor assembly comprises a floor element which can be leveled in height on a bolt, and a cuboidal joining part which is placed onto the lower end of the support, wherein a threaded part of the bolt is determined for engaging in the screw channel.

2. The construction kit as claimed in claim 1, wherein the connector is an extruded profile.

3. The construction kit as claimed in claim 1 wherein
a) in one of the wall elements which are to be installed within a room divider, all vertical outer edges are the connecting flanks with the contours, wherein an inner wall extends between the connecting flanks; and
b) a separate type of the wall elements is determined for the outer termination on room dividers, said termination being formed only on an outer edge as the connecting flank with the contours, wherein the connecting flank is adjoined by a wing section with a lateral free end.

4. The construction kit as claimed in claim 2, wherein the fiber material used can be penetrated by dye.

5. The construction kit as claimed in claim 1 wherein
a) the contours on the connecting flanks of the wall elements are arranged congruently on the front side and rear side thereof and are designed as raised webs which run on a vertical line with alternating intermediate spaces; and
b) the connectors each have a connection to the systematic mating contours on two opposite outer edges, wherein
c) the mating contours are designed as raised webs in pairs which run on a vertical line with alternating intermediate spaces and constrict the lateral mouth of a vertical groove;
d) the contours rise from a lip which extends from the connecting flank, and the width of the lip finds space in the mouth gap of the mating contours; and
e) the dimensioning of the contours allows inserting the contours through the intermediate spaces on the connector.

6. The construction kit as claimed in claim 1, wherein the wall elements comprise:
a) a first wall element with a rectilinear extent with respect to the vertical plane;
b) a second wall element with a first curvature with respect to the vertical plane;
c) a third wall element with a second curvature with respect to the vertical plane; and
d) a fourth three-winged wall element with three connecting flanks;
e) wherein the wall elements end with an upper edge.

7. The construction kit as claimed in claim 6, wherein the fourth wall element:
a) consists of three partial elements which are joined to one another, which result from the theoretical vertical bisection of the thickness of the remaining wall elements and end at the top with a partial edge;
b) on each of its three wings thereof, a complete flank with the contours on both sides and a complete inner wall section extending to a center of the fourth wall element; wherein
c) a contoured complete upper edge is formed on the inner wall section and a triangular free space is formed in the center of the fourth wall element.

8. The construction kit as claimed in claim 6, wherein the upper edges on the first to third wall elements and the upper edge joined together from two partial edges on the fourth wall element are produced without a finishing step during the pressing operation.

9. The construction kit as claimed in claim 6 wherein, on the fourth wall element a wing which is formed by the associated connecting flank and an inner wall section continuing therefrom, together with each of adjacent wings forms a first angle of identical size the two adjacent wings together form a second angle different from the first angle.

10. The construction kit as claimed in 1, wherein
a) the wall elements and the partial element contain reinforcing means acting in particular in the horizontal plane; wherein
b) the reinforcing means are produced by material-densified pressing resulting in grooves running linearly and horizontally over the inner wall or partial inner wall;
c) the reinforcing means on the wall elements are congruent to one another on the front side and on the rear side and are fitted in the same grid as the contours; while
d) the reinforcing means on the partial element are provided only on one side and in the same grid as partial contours.

11. The construction kit as claimed in claim 1, wherein with the wall elements and connectors the following can be erected:
a) room dividers which are rectilinear, or are curved once or more than once; and/or
b) individual booths; and/or
c) interconnecting booths; and
d) combinations of room dividers and booths.

12. The construction kit as claimed in claim 1, wherein
a) one of the adapters consists of a base part with a first hook contour and a separate counterpart with a second hook contour; and
b) in the fitted state, base part and counterpart are connected to each other and the first hook contour and the second hook contour thereof are determined for engaging in an intermediate space on the connector.

13. The construction kit as claimed in claim 12, wherein
a) one of the adapters is connectable to a bridge strut, and a longitudinal strut can be inserted between two bridge struts, thus producing a framework which serves for bearing supporting surfaces and/or seats;
b) the first hook contour and the second hook contour of an adapter are determined for engaging in the two slots of a pair of slots, which is selected for the desired height, on a slot grid of a support and, in the mounted state, grip therein in the form of claws; and
c) the adapters which are docked on the supports serve for holding supporting surfaces, wherein said supporting surfaces can be used as a working surface and/or as a tray or for the attachment of cupboard units.

14. The construction kit as claimed in claim 1, wherein
a) the adapter is connectable to a bridge strut, and a longitudinal strut can be inserted between two bridge struts, thus producing a framework which serves for bearing supporting surfaces and/or seats;
b) the first hook contour and the second hook contour of an adapter are determined for engaging in the two slots of a pair of slots, which is selected for the desired height, on the slot grid of the support and, in the mounted state, grip therein in the form of claws; and
c) the adapters which are docked on the supports serve for holding supporting surfaces, wherein said supporting surfaces can be used as a working surface and/or as a tray or for the attachment of cupboard units.

* * * * *